US012620531B2

(12) United States Patent 
Gu et al.

(10) Patent No.: US 12,620,531 B2 
(45) Date of Patent: May 5, 2026

(54) MULTILAYER ELECTRONIC COMPONENT

(71) Applicant: SAMSUNG ELECTRO-MECHANICS CO., LTD., Suwon-si (KR)

(72) Inventors: Sin Il Gu, Suwon-si (KR); Jin Hyung Lim, Suwon-si (KR); Kang Ha Lee, Suwon-si (KR); Jung Won Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/961,844

(22) Filed: Oct. 7, 2022

(65) Prior Publication Data

US 2023/0215642 A1 Jul. 6, 2023

(30) Foreign Application Priority Data

Dec. 31, 2021 (KR) .......................... 10-2021-0193639

(51) Int. Cl.
*H01G 4/232* (2006.01)
*H01G 4/30* (2006.01)

(52) U.S. Cl.
CPC ............. *H01G 4/2325* (2013.01); *H01G 4/30* (2013.01)

(58) Field of Classification Search
CPC ........ H01G 4/30; H01G 4/2325; H01G 4/232; H01G 4/248; H01G 4/1236
(Continued)

(56) References Cited

U.S. PATENT DOCUMENTS

2004/0064940 A1* 4/2004 Furukawa .............. H01C 7/008
361/708
2004/0240146 A1* 12/2004 Kayatani ................ H01G 2/103
361/306.3
(Continued)

FOREIGN PATENT DOCUMENTS

JP 2016-178219 A 10/2016
KR 10-2019-0121214 A 10/2019
(Continued)

OTHER PUBLICATIONS

Office Action issued in corresponding Korean Patent Application No. 10-2025-0006199 on Jul. 29, 2025, with English translation.

*Primary Examiner* — Arun Ramaswamy
(74) *Attorney, Agent, or Firm* — MORGAN, LEWIS & BOCKIUS LLP

(57) ABSTRACT

A multilayer electronic component includes a body including first and second surfaces opposing each other in a first direction, and third and fourth surfaces connected to the first and second surfaces and opposing each other in a second direction; a first external electrode including a first connection portion disposed on the third surface and a first band portion extending from the first connection portion to a first portion of the first surface; a second external electrode including a second connection portion disposed on the fourth surface and a second band portion extending from the second connection portion to a first portion of the first surface; an insulating layer disposed on the second surface and extending to the first and second connection portions, the insulating layer including a first glass and a first oxide including aluminum (Al).

35 Claims, 21 Drawing Sheets

1000

(58) Field of Classification Search
USPC ..................... 361/301.4, 321.1, 321.3, 306.3
See application file for complete search history.

(56) References Cited

U.S. PATENT DOCUMENTS

| | | | | |
|---|---|---|---|---|
| 2012/0250217 A1* | 10/2012 | Fukunaga | .............. | H01G 4/012 |
| | | | | 361/301.4 |
| 2015/0053471 A1* | 2/2015 | Lee | .......................... | H01G 4/01 |
| | | | | 361/301.4 |
| 2015/0070817 A1* | 3/2015 | Morita | .................. | C04B 35/465 |
| | | | | 361/301.4 |
| 2015/0223340 A1* | 8/2015 | Jung | ...................... | H01G 4/008 |
| | | | | 156/89.12 |
| 2015/0364253 A1* | 12/2015 | Arnold | ................... | H05K 1/111 |
| | | | | 228/180.22 |
| 2016/0276104 A1* | 9/2016 | Nishisaka | ............ | H01G 4/2325 |
| 2017/0367187 A1* | 12/2017 | Chae | ...................... | H01G 4/248 |
| 2018/0108479 A1* | 4/2018 | Sato | .......................... | H01G 4/12 |
| 2018/0166219 A1* | 6/2018 | Noda | ................... | C03C 14/006 |
| 2019/0096583 A1* | 3/2019 | Sasaki | .................... | H01G 4/232 |
| 2019/0131076 A1* | 5/2019 | Fukumura | .............. | H01G 4/232 |
| 2019/0341190 A1* | 11/2019 | Lee | ...................... | H01G 4/2325 |
| 2020/0066444 A1* | 2/2020 | Yang | ...................... | H01G 4/232 |
| 2020/0135403 A1 | 4/2020 | Lee et al. | | |
| 2020/0161051 A1 | 5/2020 | Tanaka et al. | | |
| 2020/0365326 A1* | 11/2020 | Masunari | ............... | H01G 2/065 |
| 2021/0166878 A1* | 6/2021 | Yoon | ........................ | H01G 2/22 |

FOREIGN PATENT DOCUMENTS

| | | |
|---|---|---|
| KR | 10-2020-0022268 A | 3/2020 |
| KR | 10-2020-0049659 A | 5/2020 |

* cited by examiner

1000

FIRST
DIRECTION
SECOND
DIRECTION
THIRD
DIRECTION

110

FIRST
DIRECTION
SECOND
DIRECTION
THIRD
DIRECTION

Figure 3:
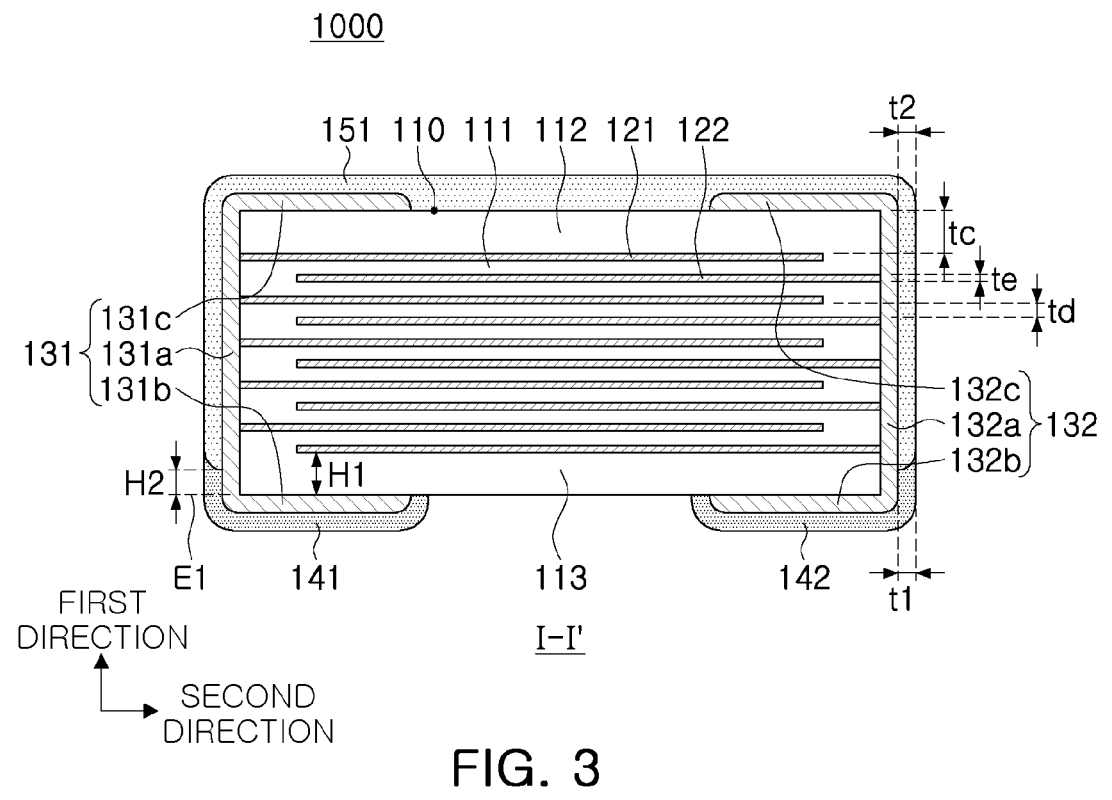

1000

151  110  111  112  121  122 t2 tc te td

131 { 131c
131 { 131a
131 { 131b

132c }
132a } 132
132b }

H2    H1

E1    141         113         142    t1

FIRST
DIRECTION

SECOND
DIRECTION

FIRST
DIRECTION

SECOND
DIRECTION

THIRD
DIRECTION

1100

FIRST
DIRECTION

SECOND
DIRECTION

THIRD
DIRECTION

1001

151-1

II'

142-1

FIRST
DIRECTION

II

SECOND
DIRECTION

THIRD
DIRECTION 141-1

1001

151-1  110  111  112  121  122

131 { 131c
      131a
      131b }

132c
132a } 132
132b

E1

H1

141-1    113    142-1

FIRST
DIRECTION

SECOND
DIRECTION

II-II'

1002

151

III'

III

FIRST
DIRECTION

SECOND
DIRECTION

THIRD
DIRECTION

142

161

141

1002

151 110 111 112 121 122

131 { 131c
131a
131b 132c
132a
132b } 132

141          113 161          142

FIRST
DIRECTION

SECOND
DIRECTION

III-III'

1003

151-3

IV'

IV

FIRST
DIRECTION

SECOND
DIRECTION

THIRD
DIRECTION 142-3

110

141-3

1003

151-3  110  111  112  121  122

131 { 131c
      131a
      131b

H2

H1

E1

132c
132a } 132
132b 141-3    113    142-3

FIRST
DIRECTION

SECOND
DIRECTION

IV-IV'

1004

FIRST DIRECTION

SECOND DIRECTION

THIRD DIRECTION

1004

FIRST DIRECTION

SECOND DIRECTION

V–V'

1005

151-5

VI'

VI

FIRST
DIRECTION

SECOND
DIRECTION

THIRD
DIRECTION 142-5

110

141-5

1005

151-5 110 111 112 121 122

E2

131-5 { 131a-5

131b-5

H2

H1

E1

141-5

113

142-5

132-5 { 132a-5

132b-5

FIRST
DIRECTION

SECOND
DIRECTION

VI-VI'

1007

FIRST
DIRECTION

SECOND
DIRECTION

VII–VII'

2000

FIRST
DIRECTION

SECOND
DIRECTION

THIRD
DIRECTION

FIRST
DIRECTION

SECOND
DIRECTION

THIRD
DIRECTION

FIRST
DIRECTION

SECOND
DIRECTION

IX-IX'

2004

X-X'

FIRST
DIRECTION

SECOND
DIRECTION

2005

FIRST
DIRECTION

SECOND
DIRECTION

THIRD
DIRECTION

FIRST
DIRECTION

SECOND
DIRECTION

THIRD
DIRECTION

FIRST
DIRECTION

SECOND
DIRECTION

THIRD
DIRECTION

2008

253-8 110 111 112 121 122

231 { 231a
231b

232 { 232a
232b

FIRST
DIRECTION

SECOND
DIRECTION 241-6 113 242-6

XII-XII'

2009

252-9

110

251-9

XIII'

242-9

FIRST
DIRECTION

SECOND
DIRECTION

THIRD
DIRECTION

XIII 241-9

3000

MULTILAYER ELECTRONIC COMPONENT

CROSS-REFERENCE TO RELATED APPLICATION(S)

This application claims benefit of priority to Korean Patent Application No. 10-2021-0193639 filed on Dec. 31, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type capacitor which may be mounted on the printed circuit boards of various electronic products including an imaging device such as a liquid crystal display (LCD) and a plasma display panel (PDP), a computer, and the like, smartphones and mobile phones and may charge or discharge electricity.

Such a multilayer ceramic capacitor may be used as a component of various electronic devices as a multilayer ceramic capacitor may have a relatively small size and high capacitance and may be easily mounted. As various electronic devices such as a computer and a mobile device have been miniaturized and have been designed to have high output, demand for miniaturization and high capacitance of a multilayer ceramic capacitor has increased.

Also, as interest in electronic components for a vehicle has recently increased, a multilayer ceramic capacitor has also been required to have high reliability properties to be used in automobiles or an infotainment system.

For miniaturization and high capacitance of the multilayer ceramic capacitor, it may be necessary to increase the number of laminated layers by reducing thicknesses of internal electrodes and dielectric layers, and by reducing the volume of the portion not affecting capacitance formation, an effective volume fraction required to implement capacitance may need to be increased.

Also, it may be necessary to reduce a mounting space to mount a greater number of components within a limited area of a substrate.

Also, as a thickness of a margin decreases with miniaturization and high capacitance of a multilayer ceramic capacitor, external moisture and a plating solution may easily permeate thereinto, and accordingly, reliability may degrade. Accordingly, a method for protecting a multilayer ceramic capacitor from permeation of external moisture or a plating solution may be necessary.

SUMMARY

An aspect of the present disclosure is to provide a multilayer electronic component having improved capacitance per unit volume.

An aspect of the present disclosure is to provide a multilayer electronic component having improved reliability.

An aspect of the present disclosure is to provide a multilayer electronic component having a reduced mounting space.

According to an aspect of the present disclosure, a multilayer electronic component includes a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface, a first band portion extending from the first connection portion to a first portion of the first surface, and a third band portion extending from the first connection portion to a first portion of the second surface; a second external electrode including a second connection portion disposed on the fourth surface, a second band portion extending from the second connection portion to a second portion of the first surface, and a fourth band portion extending from the second connection portion to a second portion of the second surface; an insulating layer disposed on the first and second connection portions and covering the second surface and the third and fourth band portions, the insulating layer including a first glass and a first oxide including aluminum (Al); a first plating layer disposed on the first band portion; and a second plating layer disposed on the second band portion.

According to another aspect of the present disclosure, a multilayer electronic component includes a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction, a first external electrode including a first connection portion disposed on the third surface and a first band portion extending from the first connection portion to a first portion of the first surface; a second external electrode including a second connection portion disposed on the fourth surface and a second band portion extending from the second connection portion to a second portion of the first surface; an insulating layer disposed on the second surface and extending to the first and second connection portions, the insulating layer including a first glass and a first oxide including aluminum (Al); a first plating layer disposed on the first band portion; and a second plating layer disposed on the second band portion.

According to another aspect of the present disclosure, a multilayer electronic component includes a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface, a first band portion extending from the first connection portion to a first portion of the first surface, and a first corner portion extending from the first connection portion to a corner connecting the second surface to the third surface; a second external electrode including a second connection portion disposed on the fourth surface, a second band portion extending from the second connection portion to a second portion of the first surface, and a second corner portion extending from the second connection portion to a corner connecting the second surface to the fourth surface; an insulating layer disposed on the first and second connection portions and covering the second surface and the first and second corner portions, the insulating layer including a first glass and a first oxide including aluminum (Al); a first plating layer disposed on the first band portion; and a second plating layer disposed on the second band portion, wherein, an average distance in the second direction from an extension line of the third surface to an end of the first corner portion is defined as B3, an average distance in the second direction from an extension line of the fourth surface to an end of the second corner portion is defined as B4, an average size of a region in which the third surface and the second internal electrode are spaced apart from each other, taken in the second direction, is defined as G1, and an average size of a region in which the fourth surface and the first internal electrode are spaced apart from each other, taken in the second direction, is defined as G2, and B3≤G1 and B4≤G2 are satisfied.

According to another aspect of the present disclosure, a multilayer electronic component includes a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection electrode disposed on the third surface and a first band electrode extending from the first connection electrode to a first portion of the first surface; a second external electrode including a second connection electrode disposed on the fourth surface and a second band electrode extending from the second connection electrode to a second portion of the first surface; a first insulating layer disposed on the first connection electrode; a second insulating layer disposed on the second connection electrode; a first plating layer disposed on the first band electrode; and a second plating layer disposed on the second band electrode, wherein the first and second insulating layers include a first glass and a first oxide including aluminum (Al).

BRIEF DESCRIPTION OF DRAWINGS

The above and other aspects, features, and advantages of the present disclosure will be more clearly understood from the following detailed description, taken in conjunction with the accompanying drawings, in which:

FIG. 3 is a cross-sectional diagram taken along line I-I' in FIG. 1;

DETAILED DESCRIPTION

Figure 1:
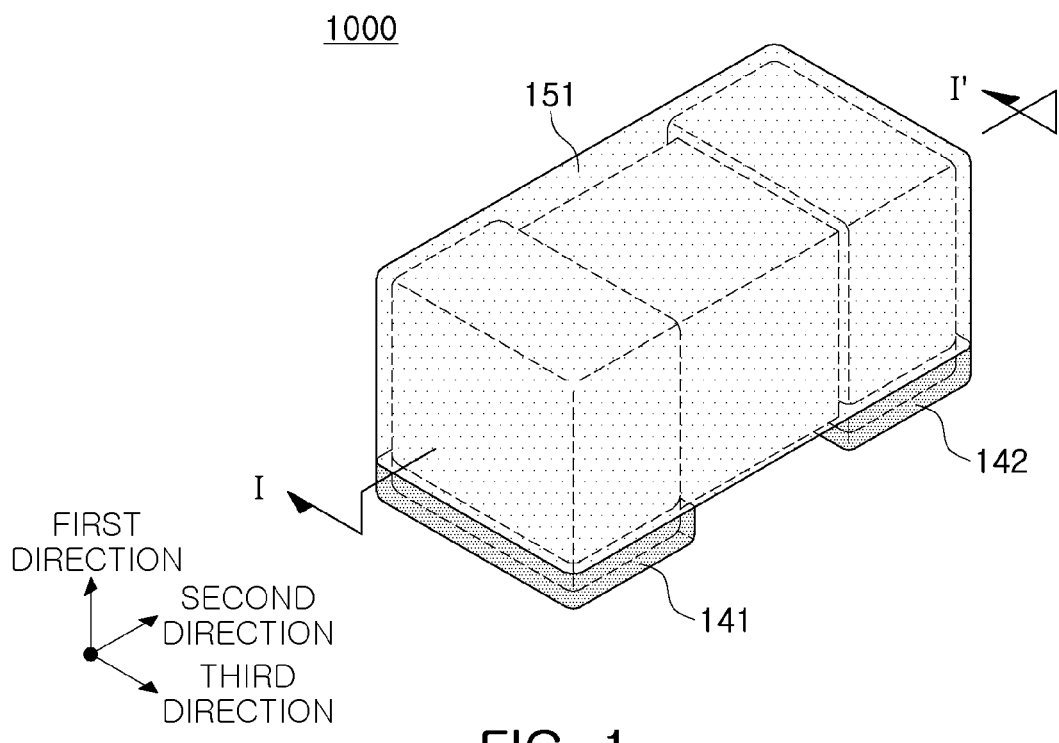
FIG. 1 is a perspective diagram illustrating a multilayer electronic component according to an example embodiment of the present disclosure.

Hereinafter, embodiments of the present disclosure will be described as below with reference to the attached drawings.

The present disclosure may, however, be exemplified in many different forms and should not be construed as being limited to the specific embodiments set forth herein. Rather, these embodiments are provided such that this disclosure will be thorough and complete, and will fully convey the scope of the disclosure to those skilled in the art. Accordingly, shapes and sizes of the elements in the drawings may be exaggerated for clarity of description. Also, elements having the same function within the scope of the same concept represented in the drawing of each example embodiment will be described using the same reference numeral.

In the drawings, the same elements will be indicated by the same reference numerals. Also, redundant descriptions and detailed descriptions of known functions and elements that may unnecessarily make the gist of the present disclosure obscure will not be provided. In the accompanying drawings, some elements may be exaggerated, omitted or briefly illustrated, and the sizes of the elements do not necessarily reflect the actual sizes of these elements. Also, it will be understood that when a portion "includes" an element, it may further include another element, not excluding another element, unless otherwise indicated.

In the drawings, a first direction may be defined as a lamination direction or a thickness (T) direction, a second direction may be defined as a length (L) direction, and a third direction may be defined as a width (W) direction.

FIG. 1 is a perspective diagram illustrating a multilayer electronic component according to an example embodiment.

Figure 2:
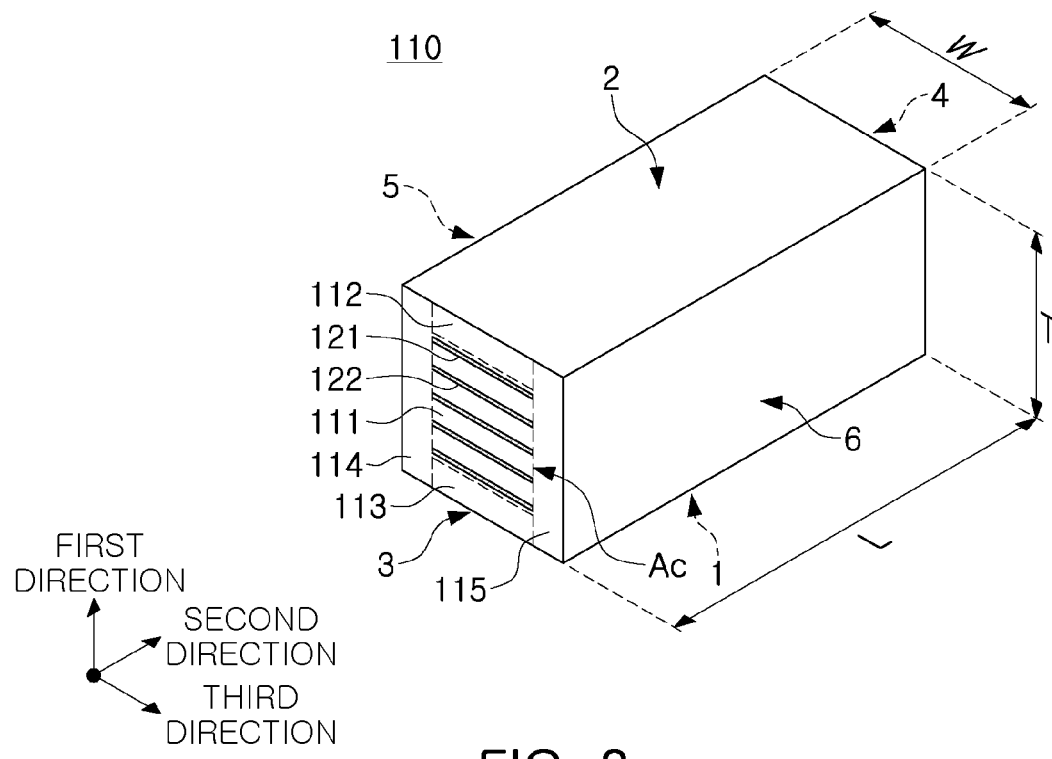
FIG. 2 is a perspective diagram illustrating a body of the multilayer electronic component in FIG. 1.

FIG. 2 is a perspective diagram illustrating a body of the multilayer electronic component in FIG. 1.

FIG. 3 is a cross-sectional diagram taken along line I-I' in FIG. 1.

Figure 4:
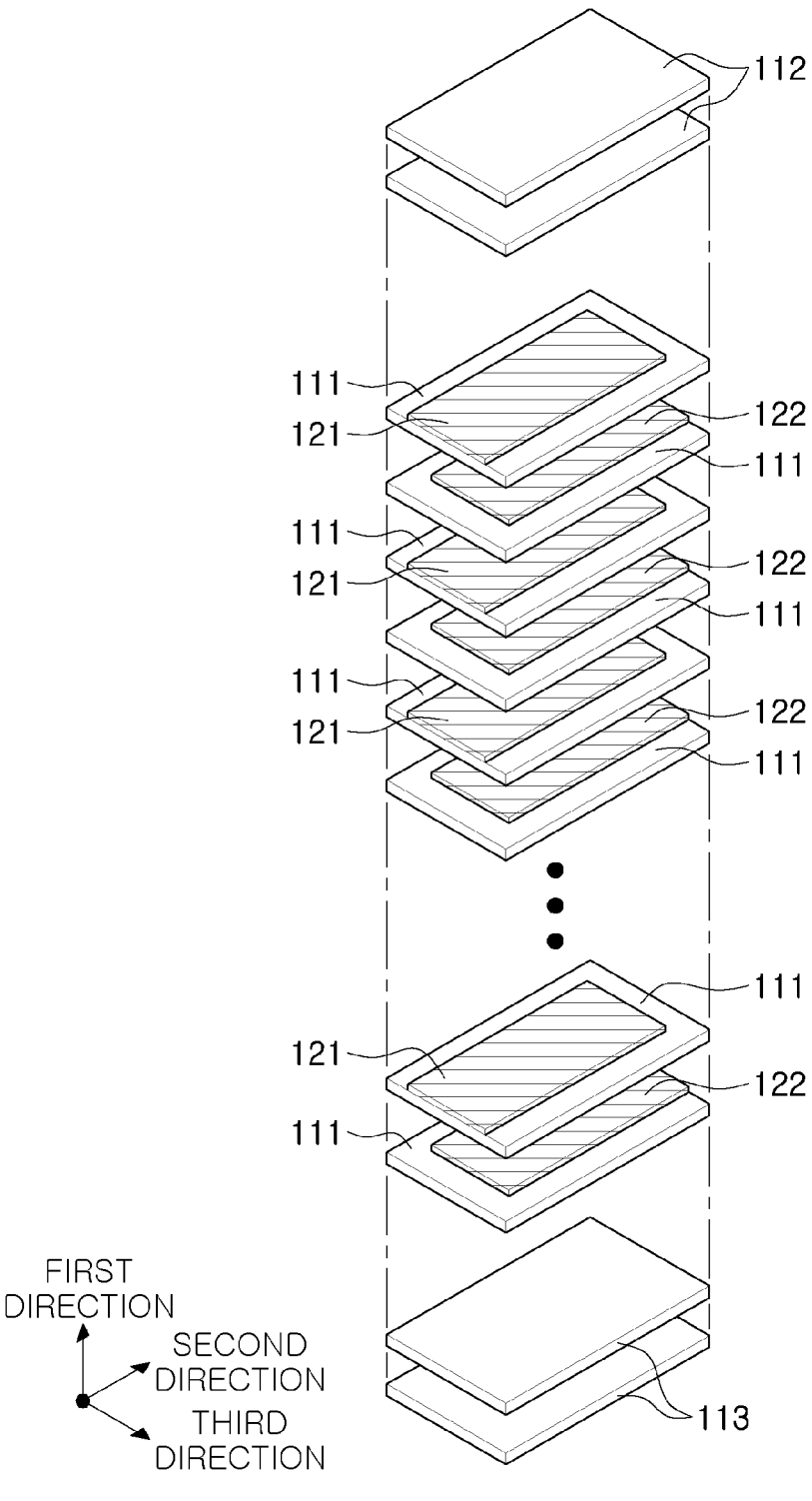
FIG. 4 is an exploded perspective diagram illustrating a body in FIG. 2.

FIG. 4 is an exploded perspective diagram illustrating a body in FIG. 2.

Figure 5:
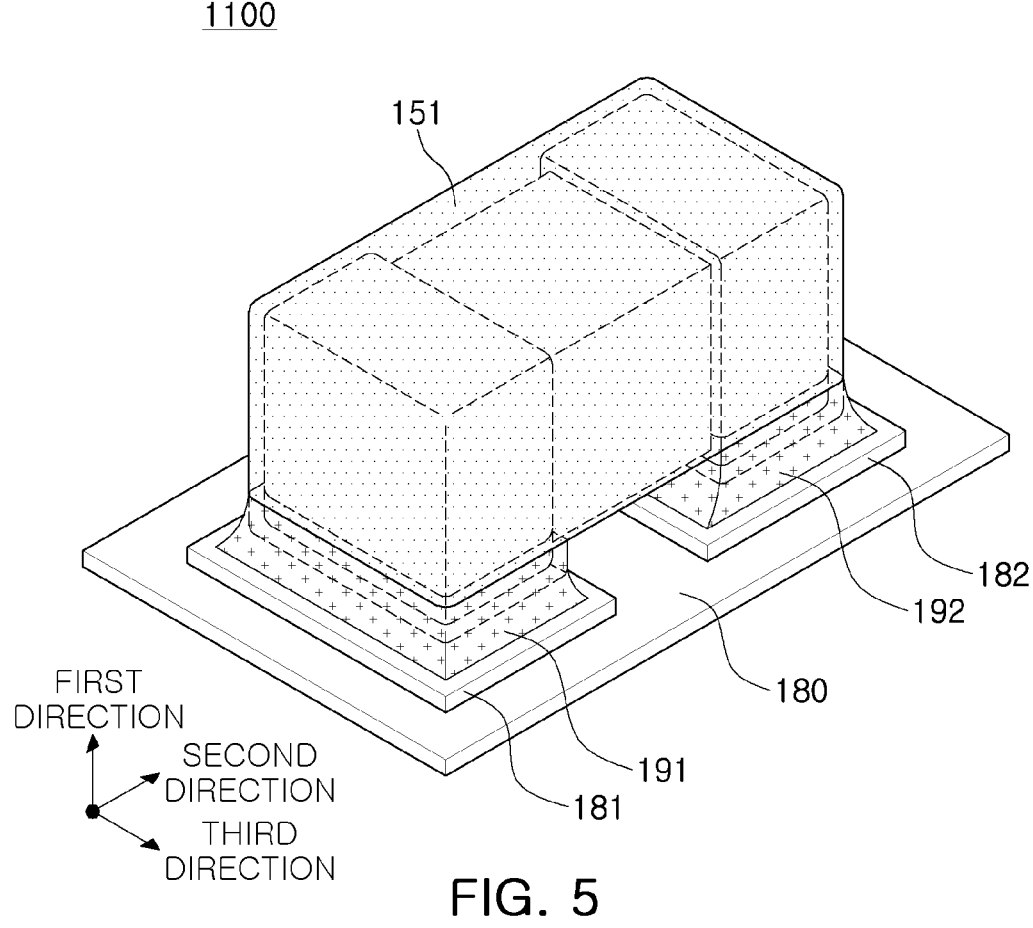
FIG. 5 is a perspective diagram illustrating a substrate on which a multilayer electronic component in FIG. 1 is mounted.

FIG. 5 is a perspective diagram illustrating a substrate on which a multilayer electronic component in FIG. 1 is mounted.

Hereinafter, a multilayer electronic component 1000 in an example embodiment will be described with reference to FIGS. 1 to 5.

The multilayer electronic component 1000 in an example embodiment may include a dielectric layer 111 and first and second internal electrodes 121 and 122 alternately disposed with the dielectric layer 111 interposed therebetween, and may further include a body 110 including first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction; a first external electrode including a first connection portion 131*a* disposed on the third surface, a first band portion 131*b* extending from the first connection portion to a portion of the first surface, and a third band portion 131*c* extending from the first connection portion to a portion of the second surface; a second external electrode 132 including a second connection portion 132*a* disposed on the fourth surface, a second band portion 132*b* extending from the second connection portion to a portion of the first surface, and a fourth band portion 132*c* extending from the second connection portion to a portion of the second surface; an insulating layer 151 disposed on the first and second connection portions and covering the second surface and the third and fourth band portions 131*c* and 132*c*; a first plating layer 141 disposed on the first band portion 131*b*; and a second plating layer 142 disposed on the second band portion 132*b*, and the insulating layer 151 may include a first glass, glass, and a first oxide, an oxide including aluminum (Al).

In the body 110, the dielectric layer 111 and the internal electrodes 121 and 122 may be alternately laminated.

The shape of the body 110 may not be limited to any particular shape, but as illustrated, the body 110 may have a hexahedral shape or a shape similar to a hexahedral shape. Due to reduction of ceramic powder included in the body 110 during a firing process, the body 110 may not have an exact hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

In an example embodiment, the body 110 may have a first 1-3 corner connecting the first surface to the third surface, a 1-4 corner connecting the first surface to the fourth surface, a 2-3 corner connecting the second surface to the third surface and a 2-4 corner connecting the second surface to the fourth surface. The 1-3 corner and the 2-3 corner may have a form reduced (contracted) in a direction of a center of the body taken in the first direction toward the third surface, and the 1-4 corner and the corner 2-4 may have a form reduced (contracted) in a direction of a center of the body taken in the first direction toward the fourth face.

As a margin region in which the internal electrodes 121 and 122 are not disposed may overlap the dielectric layer 111, a step difference may be formed due to the thickness of the internal electrodes 121 and 122, and accordingly, the corner connecting the first surface to the third to fifth surfaces and/or the corner connecting the second surface to the third to fifth surface may have a form reduced (contracted) in a direction of a center of the body taken in the first direction with respect to the first surface or the second surface. Alternatively, a corner connecting the first surface 1 to the third to sixth surfaces 3, 4, 5, and 6 and/or a corner connecting the second surface 2 to the third to sixth surfaces 3, 4, 5, and 6 may have a form reduced (contracted) in a direction of a center of the body taken in the first direction with respect to the first surface or the second surface. Alternatively, as the corners connecting the surfaces of the body 110 are rounded by performing a separate process to prevent chipping defects, or the like, the corners connecting the first and third to sixth surfaces and/or the corner connecting the second surface to the third to sixth surfaces may have a rounded shape.

The corner may include a first 1-3 corner connecting the first surface to the third surface, a 1-4 corner connecting the first surface to the fourth surface, a 2-3 corner connecting the second surface to the third surface and a 2-4 corner connecting the second surface to the fourth surface. Also, the corners may include a 1-5 corner connecting the first surface to the fifth surface, a 1-6 corner connecting the first surface to the sixth surfaces, a 2-5 corner connecting the second surface to the fifth surface, and a 2-6 corner connecting the second surface to the sixth surface. The first to sixth surfaces of the body 110 may be almost flat surfaces, and non-flat regions may be configured as corners. Hereinafter, an extension line of each surface may refer to a line extended with respect to a flat portion of each surface.

In this case, the region disposed on the corner of the body 110 in the external electrodes 131 and 132 may be a corner portion, the region disposed on the third and fourth surfaces of the body 110 may be a connection portion, and the region disposed on the first and second surfaces of the body may be a band portion.

To prevent a step difference caused by the internal electrodes 121 and 122, after lamination, when the internal electrodes are cut to be exposed to the fifth and sixth surfaces 5 and 6 of the body, a single dielectric layer or two or more dielectric layers may be laminated on both side surfaces of the capacitance formation portion Ac in the third direction (width direction) to form margin portions 114 and 115, the portion connecting the first surface to the fifth and sixth surfaces and the portion connecting the second surface to the fifth and sixth surfaces may not have a reduced form.

The plurality of dielectric layers 111 forming the body 110 may be in a fired state, and a boundary between the adjacent dielectric layers 111 may be integrated with each other such that the boundary may not be distinct without using a scanning electron microscope (SEM).

In an example embodiment, a raw material for forming the dielectric layer 111 is not limited to any particular example as long as sufficient capacitance may be obtained. For example, a barium titanate material, a lead composite perovskite material, or a strontium titanate material may be used. The barium titanate material may include $BaTiO_3$ ceramic powder, and an example of the ceramic powder may include $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1) in which Ca (calcium), Zr (zirconium) is partially solid-solute.

Also, various ceramic additives, organic solvents, binders, dispersants, or the like, may be added to a raw material for forming the dielectric layer 111 in the example embodiment to powder such as barium titanate ($BaTiO_3$).

The average thickness td of the dielectric layer 111 is not limited to any particular example.

However, generally, when the dielectric layer has a thickness of less than 0.6 μm, which is relatively thin, in particular, when the thickness of the dielectric layer is 0.35 μm or less, reliability may decrease.

In an example embodiment, by disposing an insulating layer on the connection portion of the external electrode, and disposing the plating layer on the band portion of the external electrode, permeation of external moisture and the plating solution may be prevented, such that reliability may improve. Accordingly, excellent reliability may be ensured even when the average thickness of the dielectric layer 111 is 0.35 μm or less.

Accordingly, when the average thickness of the dielectric layer 111 is 0.35 μm or less, the effect of improving reliability in the example embodiment may improve.

The average thickness td of the dielectric layer 111 may refer to an average thickness of the dielectric layer 111 disposed between the first and second internal electrodes 121 and 122.

The average thickness of the dielectric layer 111 may be measured by scanning a cross-sectional surface of the body 110 taken in the length and thickness direction (L-T) using a scanning electron microscope (SEM) at 10,000× magnification. More specifically, an average value may be measured by measuring thicknesses of 30 points of the dielectric layer, spaced apart by an equal distance, on the scanned image in the length direction. The 30 points spaced apart by an equal distance may be designated in the capacitance formation portion Ac. Also, when the measuring of the average value is extended to 10 dielectric layers and measuring an average value thereof, the average thickness of the dielectric layers may be further generalized.

The body 110 may include the capacitance formation portion Ac disposed in the body 110 and including the first internal electrode 121 and the second internal electrode 122 opposing each other with the dielectric layer 111 interposed therebetween, and cover portions 112 and 113 formed on upper and lower portions of the capacitance formation portion Ac in the first direction.

Also, the capacitance formation portion Ac may contribute to the formation of capacitance of the capacitor, and may be formed by alternately laminating the plurality of first and second internal electrodes 121 and 122 with the dielectric layer 111 interposed therebetween.

The cover portions 112 and 113 may include an upper cover portion 112 disposed on the capacitance formation portion Ac in the first direction and a lower cover portion 113 disposed below the capacitance formation portion Ac in the first direction.

The upper cover portion 112 and the lower cover portion 113 may be formed by laminating a single dielectric layer or two or more dielectric layers on the upper and lower surfaces of the capacitance formation portion Ac in the thickness direction, respectively, and may prevent damages to the internal electrodes caused by physical or chemical stress.

The upper cover portion 112 and the lower cover portion 113 may not include an internal electrode, and may include the same material as that of the dielectric layer 111.

That is, the upper cover portion 112 and the lower cover portion 113 may include a ceramic material, such as, for example, a barium titanate ($BaTiO_3$) ceramic material.

The average thickness of the cover portions 112 and 113 is not limited to any particular example. However, to easily implement miniaturization and high capacitance of the multilayer electronic component, the average thickness tc of the cover portions 112 and 113 may be 15 μm or less. Also, in an example embodiment, by disposing the insulating layer on the connection portion of the external electrode and the plating layer on the band portion of the external electrode, permeation of external moisture and a plating solution may be prevented such that reliability may improve. Accordingly, excellent reliability may be ensured even when the average thickness tc of the cover portions 112 and 113 is 15 μm or less.

The average thickness tc of the cover portions 112 and 113 may refer to a size in the first direction, and may be an average value of thicknesses of five points of the cover portions 112 and 113, spaced apart by an equal distance, in the first direction above or below the capacitance formation portion Ac. For example, the measurements may be taken by scanning the cross-section of the body 110 using a scanning electron microscope (SEM). Other methods and/or tools appreciated by one of ordinary skill in the art, even if not described in the present disclosure, may also be used.

Also, margin portions 114 and 115 may be disposed on a side surface of the capacitance formation portion Ac.

The margin portions 114 and 115 may include the first margin portion 114 disposed on the fifth surface 5 of the body 110 and the second margin portion 115 disposed on the sixth surface 6 of the body 110. That is, the margin portions 114 and 115 may be disposed on both end surfaces of the ceramic body 110 in the width direction.

The margin portions 114 and 115 may refer to a region of a boundary surface between both ends of the first and second internal electrodes 121 and 122 and the body on the cross-section of the body 110 taken in the width-thickness (W-T) direction.

The margin portions 114 and 115 may prevent damage to the internal electrodes caused by physical or chemical stress.

The margin portions 114 and 115 may be formed by forming internal electrodes by applying a conductive paste on a ceramic green sheet other than the region in which the margin portion is formed.

Also, to prevent the step difference due to the internal electrodes 121 and 122, after lamination, the internal electrodes may be cut to be exposed to the fifth and sixth surfaces 5 and 6 of the body, and a single dielectric layer or two or more dielectric layers may be laminated on both side surfaces of the capacitance formation portion Ac in the third direction (width direction), thereby forming the margin portions 114 and 115.

The width of the margin portion 114 and 115 is not limited to any particular example. However, an average width of the margin portions 114 and 115 may be 15 μm or less to easily obtain miniaturization and high capacitance of the multi-layer electronic component. Also, in an example embodiment, by disposing the insulating layer on the connection portion of the external electrode and disposing the plating layer on the band portion of the external electrode, perme-ation of external moisture and a plating solution may be prevented such that reliability may improve. Accordingly, excellent reliability may be ensured even when the average width of the margin portions 114 and 115 is 15 μm or less.

The average width of the margin portions 114 and 115 may refer to the average size of the margin portions 114 and 115 in the third direction, and may be an average value of thicknesses of five points of the margin portions 114 and 115, spaced apart by an equal distance, in the third direction on the side surface of the capacitance formation portion Ac. For example, the measurements may be taken by scanning the cross-section of the body 110 using a scanning electron microscope (SEM). Other methods and/or tools appreciated by one of ordinary skill in the art, even if not described in the present disclosure, may also be used.

The internal electrodes 121 and 122 may be alternately laminated with the dielectric layer 111.

The internal electrodes 121 and 122 may include first and second internal electrodes 121 and 122. The first and second internal electrodes 121 and 122 may be alternately disposed to oppose each other with the dielectric layer 111 included in the body 110 interposed therebetween, and may be exposed to the third and fourth surfaces 3 and 4 of the body 110, respectively.

Referring to FIG. 3, the first internal electrode 121 may be spaced apart from the fourth surface 4 and may be exposed through the third surface 3, and the second internal electrode 122 may be spaced apart from the third surface 3 and may be exposed through the fourth surface 4. The first external electrode 131 may be disposed on the third surface 3 of the body and may be connected to the first internal electrode 121, and the second external electrode 132 may be disposed on the fourth surface 4 of the body and may be connected to the second internal electrode 122.

That is, the first internal electrode 121 may not be connected to the second external electrode 132, and may be connected to the first external electrode 131, and the second internal electrode 122 may not be connected to the first external electrode 131 and may be connected to the second external electrode 132. Accordingly, the first internal elec-trode 121 may be spaced apart from the fourth surface 4 by a predetermined distance, and the second internal electrode 122 may be spaced apart from the third surface 3 by a predetermined distance.

In this case, the first and second internal electrodes 121 and 122 may be electrically separated from each other by the dielectric layer 111 disposed therebetween.

The body 110 may be formed by alternately laminating a ceramic green sheet on which the first internal electrode 121 is printed and a ceramic green sheet on which the second internal electrode 122 is printed, and firing the sheets.

The material for forming the internal electrodes 121 and 122 is not limited to any particular example, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), or tungsten (W), titanium (Ti), and alloys thereof.

Also, the internal electrodes 121 and 122 may be formed by printing a conductive paste for internal electrodes includ-ing one or more of nickel (Ni), copper (Cu), palladium (Pd), silver (Ag), gold (Au), platinum (Pt), tin (Sn), tungsten (W), titanium (Ti), and alloys thereof. As the method of printing the conductive paste for internal electrodes, a screen printing method or a gravure printing method may be used, but an example embodiment thereof is not limited thereto.

The average thickness to of the internal electrodes 121 and 122 is not limited to any particular example.

However, generally, when the internal electrode is formed to have a thickness of less than 0.6 μm, which is relatively thin, in particular, when the thickness of the internal elec-trode is 0.35 μm or less, reliability may be deteriorated.

In an example embodiment, by disposing an insulating layer on the connection portion of the external electrode, and disposing the plating layer on the band portion of the external electrode, permeation of external moisture and a plating solution may be prevented such that reliability may improve. Accordingly, excellent reliability may be secured even when the average thickness of the internal electrodes 121 and 122 is 0.35 μm or less.

Accordingly, when the thickness of the internal electrodes 121 and 122 is 0.35 μm or less on average, the effect in the example embodiment may improve, and miniaturization and high capacitance of the ceramic electronic component may be easily obtained.

The average thickness to of the internal electrodes 121 and 122 may refer to the average thickness of the internal electrodes 121 and 122.

The average thickness of the internal electrodes 121 and 122 may be measured by scanning a cross-sectional surface of the body 110 taken in the length and thickness direction (L-T) using a scanning electron microscope (SEM) at 10,000 magnification. More specifically, an average value may be measured by measuring thicknesses of 30 points of one internal electrode, spaced apart by an equal distance, from the scanned image in the length direction. The 30 points spaced apart by an equal distance may be designated in the capacitance formation portion Ac. Also, when the measuring of the average value is extended to 10 internal electrodes and an average value thereof is measured, the average thickness of the internal electrode may be further generalized.

The external electrodes 131 and 132 may be disposed on the third surface 3 and the fourth surface 4 of the body 110. The external electrodes 131 and 132 may include first and second external electrodes 131 and 132 disposed on the third and fourth surfaces 3 and 4 of the body 110, respectively, and connected to the first and second internal electrodes 121 and 122, respectively.

The external electrodes 131 and 132 may include the first external electrode 131 including a first connection portion 131a disposed on the third surface and a first band portion 131b extending from the first connection portion to a portion of the first surface, and the second external electrode 132 including a second connection portion 132a disposed on the fourth surface, and a second band portion 132b extending from the second connection portion to a portion of the first surface. The first connection portion 131a may be connected to the first internal electrode 121 on the third surface, and the second connection portion 132a may be connected to the second internal electrode 122 on the fourth surface.

Also, the first external electrode 131 may include a third band portion 131c extending from the first connection portion 131a to a portion of the second surface, and the second external electrode 132 may include a fourth band portion 132c extending from the connection portion 132a to a portion of the second surface. Further, the first external electrode 131 may include a first side band portion extending from the first connection portion 131a to portions of the fifth and sixth surfaces, and the second external electrode 132 may include a second side band portion extending from the second connection portion 132a to portions of the fifth and sixth surfaces.

However, the third band portion, the fourth band portion, the first side band portion and the second side band portion may not be provided in the example embodiment. The first and second external electrodes 131 and 132 may not be disposed on the second surface and may not be disposed on the fifth and sixth surfaces. As the first and second external electrodes 131 and 132 are not disposed on the second surface, the first and second external electrodes 131 and 132 may be disposed below an extension line of the second surface of the body. Also, the first and second connection portions 131a and 132a may be spaced apart from the fifth and sixth surfaces, and the first and second connection portions 131a and 132a may be spaced apart from the second surface. Also, the first and second band portions 131b and 132b may also be spaced apart from the fifth and sixth surfaces.

When the first and second external electrodes 131 and 132 include the third and fourth band portions 131c and 132c, an insulating layer may be formed on the third and fourth band portions 131c and 132c in the example embodiment, but an example embodiment thereof is not limited thereto. A plating layer may be disposed on the third and fourth band portions 131c and 132c to improve mounting convenience. Also, the first and second external electrodes 131 and 132 may include the third and fourth band portions 131c and 132c and may not include the side band portions, and in this case, the first and second connection portions 131a and 132a and the first to fourth band portions 131b, 132b, 131c, and 132c may be spaced apart from the fifth and sixth surfaces.

In the example embodiment, the ceramic electronic component 100 may have two external electrodes 131 and 132.

However, the number of the external electrodes 131 and 132 and the shape thereof may vary depending on the shapes of the internal electrodes 121 and 122 or other purposes.

The external electrodes 131 and 132 may be formed using any material having electrical conductivity, such as metal, and a specific material may be determined in consideration of electrical properties and structural stability, and may have a multilayer structure.

The external electrodes 131 and 132 may be a fired electrode including a conductive metal and glass, or a resin-based electrode including a conductive metal and a resin.

Also, the external electrodes 131 and 132 may have a shape in which a plastic electrode and a resin-based electrode are formed in order on a body. Also, the external electrodes 131 and 132 may be formed by transferring a sheet including a conductive metal onto the body or by transferring a sheet including a conductive metal to the fired electrode.

As the conductive metal included in the external electrodes 131 and 132, a material having excellent electrical conductivity may be used, and the material is not limited to any particular example. For example, the conductive metal may be one or more of Cu, Ni, Pd, Ag, Sn, Cr, and alloys thereof. Preferably, the external electrodes 131 and 132 may include at least one of Ni and a Ni alloy, and accordingly, connectivity with the internal electrodes 121 and 122 including Ni may improve.

The insulating layer 151 may be disposed on the first and second connection portions 131a and 132a.

Since the first and second connection portions 131a and 132a are connected to the internal electrodes 121 and 122, the first and second connection portions 131a and 132a may become paths through which a plating solution may permeate in a plating process or moisture may permeate during actual use. In the example embodiment, since the insulating layer 151 is disposed on the connection portions 131a and 132a, permeation of external moisture or a plating solution may be prevented.

The insulating layer 151 may be in contact with the first and second plating layers 141 and 142. In this case, the insulating layer 151 may be in contact with and may partially cover ends of the first and second plating layers 141 and 142, or the first and second plating layers 141 and 142 be in contact with and may partially cover ends of the insulating layer 151.

The insulating layer 151 may be disposed on the first and second connection portions 131a and 132a, and may be disposed to cover the second surface and the third and fourth band portions 131c and 132c. In this case, the insulating layer 151 may cover the third and fourth band portions 131c and 132c, and regions in which the third and fourth band portions 131c and 132c are not disposed on the second surface. Accordingly, the insulating layer 151 may cover the region in which the ends of the third and fourth band portions 131c and 132c are in contact with the body 110 and may block the moisture permeation path, thereby improving moisture resistance reliability.

The insulating layer 151 may be disposed on the second surface and may extend to the first and second connection portions 131a and 132a. Also, when the external electrodes 131 and 132 are not disposed on the second surface, the insulating layer may be disposed to entirely cover the second surface. The insulating layer 151 may not necessarily be disposed on the second surface, and the insulating layer may not be disposed on a portion or an entirety of the second surface, and also, the insulating layer may be divided into two portions and the two portions may be disposed on the first and second connection portions 131a and 132a, respectively. When the insulating layer is not disposed on an entirety of the second surface, the insulating layer may be disposed below an extension line of the second surface. Also, the insulating layer may not be disposed on the second surface, and the insulating layer may extend from the first and second connection portions 131a and 132a to the fifth and sixth surfaces and may form an insulating layer.

Further, the insulating layer 151 may be disposed to cover portions of the first and second side band portions, the fifth surface, and the sixth surface. In this case, portions of the fifth and sixth surfaces not covered by the insulating layer 151 may be exposed.

Also, the insulating layer 151 may be disposed to cover the first and second side band portions and the fifth and sixth surfaces, and in this case, the fifth and sixth surfaces may not be exposed, such that moisture resistance reliability may improve. The connection portions 131a and 132a may not also be directly exposed, thereby improving reliability of the multilayer electronic component 1000. In greater detail, the insulating layer may cover both the first and second side band portions, and may cover entire regions of the fifth and sixth surfaces other than the region in which the first and second side band portions are formed.

The insulating layer 151 may prevent the plating layers 141 and 142 from being formed on the external electrodes 131 and 132 on which the insulating layer 151 is disposed, and may improve sealing properties, such that permeation of moisture or a plating solution may be reduced.

The insulating layer may include a first glass, glass, and a first oxide, an oxide including aluminum (Al).

Generally, a glass-based material may be used for an insulating layer, but due to the nature of the glass-based material, it may be difficult to form a uniform film because agglomeration may occur severely during sintering, and as heat is necessary during sintering, stress may be generated in the body, which may cause cracks or delamination. Also, when an insulating layer including a glass-based material is used, a method of firing an insulating layer including a glass-based material after firing the external electrode may be used, but, in the process of sintering the insulating layer, the metal material of the external electrode may diffuse into the internal electrode, which may cause radiation cracks. Further, generally, glass materials may have hardness, such that glass materials may be broken even by a small impact.

In the example, glass and an oxide including aluminum (Al) may be applied to the insulating layer instead of the glass-based insulating layer, thereby addressing the issue of the glass-based insulating layer. When glass and an oxide including aluminum (Al) are applied simultaneously, insulating properties may be obtained, and also strength and corrosion resistance of the insulating layer may further improve than when a glass-based material is used alone.

Specifically, in the case of forming the insulating layer using a general glass-based material including Si, the insulating layer may need to be separately fired after forming the external electrode, such that, due to a difference in thermal expansion and thermal reduction, stresses may be applied to the multilayer electronic component, which may cause cracks. Differently from the above example, in the example embodiment in which an insulating layer including glass and an oxide including aluminum (Al) is formed, the insulating layer may be simultaneously fired along with the external electrode or the body, such that stress applied to the multilayer electronic component may be prevented.

Also, when the insulating layer is formed of a glass-based material including Si, aggregation may occur during firing, such that it may be difficult to form a uniform insulating layer. In the example embodiment, since the insulating layer includes glass and an oxide including aluminum (Al), agglomeration may occur less during firing and a uniform insulating layer may be formed.

The oxide including aluminum (Al) may be excellent in electrical insulation, mechanical strength, compressive strength, hardness, corrosion resistance and wear resistance. When the insulating layer 151 is formed of an oxide including aluminum (Al), a physically and chemically stable insulating layer 151 may be formed. However, when the insulating layer is formed by sintering, abnormal grain growth may occur during reduction depending on the Al content, dispersion degree of powder, and the type of binder, such that it may be difficult to form a uniform insulating layer 151. Accordingly, in an example embodiment, the insulating layer 151 may include an oxide and glass including aluminum (Al) such that the sintering temperature may be lowered, and the insulating layer 151 may be simultaneously fired with the body 110 or the external electrodes 131 and 132, such that reliability of the multilayer electronic component may improve through densification of the insulating layer by melting glass.

In an example embodiment, the content of aluminum (Al) included in the insulating layer 151 may be 40 at % or more and 60 at % or less based on the total content of materials included in the insulating layer.

When the content of aluminum (Al) is less than 40 at % based on the total content of materials included in the insulating layer, it may be difficult to have excellent insulation, strength, hardness, corrosion resistance and abrasion resistance. When the content of aluminum (Al) exceeds 60 at % based on the total content of materials included in the insulating layer, the content of Al may increase, such that abnormal grain growth may occur and aggregation of the insulating layer may easily occur.

Accordingly, in an example embodiment, the aluminum (Al) content in the insulating layer 151 may be adjusted to 40 at % or more and 60 at % or less based on the total content of the materials included in the insulating layer, such that excellent properties of the oxide including aluminum (Al) may be maintained and aggregation of the insulating layer may be prevented.

In an example embodiment, the glass of the insulating layer may include at least one of an anorthite-based crystalline phase and a diopside-based crystalline phase.

A low temperature co-fired ceramics (LTCC) material may refer to a ceramic material which may be sintered at a low temperature of about 900° C. or less, and may be simultaneously fired with Cu or Ag metal electrodes attached thereto due to such low sintering temperature. Accordingly, when the insulating layer 151 in the example embodiment is formed using such an LTCC material, since the insulating layer 151 may be simultaneously fired with the external electrodes 131 and 132 or the body 110, such that cracks caused by excessive stress transmitted to the multilayer electronic component may be prevented.

However, such a composition of glass melted at a low temperature may have weak strength against physical impacts. Accordingly, when a physical impact is applied to the multilayer electronic component, cracks or delamination may easily occur, such that sealing against external moisture and plating solution may degrade, and it may be difficult to secure reliability of the multilayer electronic component.

Accordingly, a method for facilitating sintering of the insulating layer at low temperature and increasing strength after sintering may be necessary.

Glass may include various elements such that a crystalline phase of glass, which will be described later, may be included in the insulating layer 151. For example, one or more of Ca, Al, Si, Mg, and oxides thereof may be included.

Anosite-based glass ($CaO \cdot Al_2O_3 \cdot 2SiO_2$) may be known to have relatively excellent strength properties among crystalline phases of glass, and the insulating layer in the example embodiment is obtained by mixing the anositic glass with an oxide including aluminum (Al), strength of about 320 MPa may be obtained.

Diopside-based glass ($CaO \cdot MgO \cdot 2SiO_2$) may be known to have excellent thermal conductivity among crystal phases of glass, and when the insulating layer in the example embodiment is formed by mixing the diopside-based glass with an oxide including aluminum (Al), heat generated from the multilayer electronic component may be rapidly dissipated through high heat conduction, thereby securing excellent heat resistance of the multilayer electronic component.

Accordingly, in an example embodiment, by allowing the glass included in the insulating layer 151 to include at least one of an anosite-based crystalline phase and a diopside-based crystalline phase, an insulating layer having excellent properties obtained by including an oxide including aluminum (Al), excellent strength, and excellent thermal conductivity may be obtained. Accordingly, the multilayer electronic component may secure reliability against external mechanical, thermal, and chemical impacts.

In addition, when the insulating layer 151 includes the anosite-based crystalline phase, the diopside-based crystalline phase, and an oxide including aluminum (Al), high strength properties, high thermal conductivity properties, and chemical resistance properties may be simultaneously secured. Accordingly, reliability of the multilayer electronic component may further improve.

The type of oxide including aluminum (Al) included in the insulating layer 151 is not limited to any particular example, but may be, for example, alumina ($Al_2O_3$), and when the insulating layer is formed, and the oxide may be added in the form of a filler together with a glass forming a crystalline phase or a diopside crystalline phase.

The components included in the insulating layer 151 and the presence or absence of the anosite-based crystal phase and the diopside-based crystal phase may be confirmed by qualitative analysis through an X-ray diffraction analyzer (XRD). Specifically, an incident angle of the insulating layer disposed on the third and fourth surfaces of the multilayer electronic component may be fixed to 2°, and the crystal phase may be confirmed by observing a peak appearing at the diffraction angle (2θ) in the range of 20° to 80° using Cu K-α series line.

In addition, the components may be calculated from an image observed using scanning electron microscope-energy dispersive x-ray spectroscopy (SEM-EDS). Specifically, the multilayer electronic component may be polished to a central position in the width direction (third direction) and a cross-section (L-T cross-section) taken in a length and thickness direction may be exposed, and the type and number of moles or at % of each element included in the insulating layer may be measured using EDS in the region among regions obtained by dividing the insulating layer into 5 regions in the thickness direction.

In an example embodiment, the average thickness t2 of the insulating layer may be 500 nm or more and 1000 nm or less.

When the average thickness of the insulating layer is less than 500 nm, the insulating layer may not block moisture and moisture resistance reliability of the multilayer electronic component may not be secured.

When the average thickness of the insulating layer exceeds 1000 nm, the volume of the insulating layer may be excessive, such that capacitance per unit volume of the multilayer electronic component may not be reduced.

Accordingly, in an example embodiment, by adjusting the average thickness t2 of the insulating layer to be 500 nm or more and 1000 nm or less, reliability of the multilayer electronic component may be secured and capacity per unit volume may be reduced.

In this case, the average thickness t2 of the insulating layer 151 may be obtained by averaging the thicknesses of the insulating layer measured in a central portion of the insulating layer 151 disposed on the first and second connecting portions 131a and 132a in the first direction, two points spaced apart from each other by 5 µm and two points spaced apart from each other by 10 µm from the central point in the first direction. For example, the measurements may be taken by scanning the cross-section of the body 110 using a scanning electron microscope (SEM). Other methods and/or tools appreciated by one of ordinary skill in the art, even if not described in the present disclosure, may also be used.

In an example embodiment, the insulating layer 151 may be disposed to be in direct contact with the first and second external electrodes 131 and 132, and the first and second external electrodes 131 and 132 may include a conductive metal and glass. Accordingly, since the plating layers 141 and 142 may not be disposed in the region in which the insulating layer 151 is disposed among the external surfaces of the first and second external electrodes 131 and 132, erosion of the external electrodes caused by the plating solution may be effectively prevented.

In this case, the first plating layer 141 may be disposed to cover an end disposed on the first external electrode 131 of the insulating layer 151, and the second plating layer 142 may be disposed to an end disposed on the external electrode 132. By forming the insulating layer 151 before forming the plating layers 141 and 142 on the external electrodes 131 and 132, permeation of the plating solution during the process of forming the plating layer may be reliably prevented. As the insulating layer is formed before the plating layer, the plating layers 141 and 142 may cover ends of the insulating layer 151.

The first and second plating layers 141 and 142 may be disposed on the first and second band portions 131b and 132b, respectively. The plating layers 141 and 142 may improve mounting properties, and as the plating layers 141 and 142 are disposed on the band portions 131b and 132b, the mounting space may be reduced, and also, permeation of the plating solution into an internal electrode may be reduced, such that reliability may improve. One ends of the first and second plating layers 141 and 142 may be in contact with the first surface, and the other end may be in contact with the insulating layer 151.

The type of the plating layers 141 and 142 is not limited to any particular example, and may be a plating layer including at least one of Cu, Ni, Sn, Ag, Au, Pd, and alloys thereof, and may include a plurality of layers.

As a more specific example of the plating layers 141 and 142, the plating layers 141 and 142 may be a Ni plating layer or a Sn plating layer, and a Ni plating layer and a Sn plating layer may be formed in sequence on the first and second band portions 131b and 132b.

In an example embodiment, the first and second plating layers 341 and 342 may be extended to partially cover the first and second connection portions 331*a* and 332*a*, respectively. When an average distance in the first direction from the first surface 1 to an internal electrode disposed most adjacent (closest) to the first surface 1 among the internal electrodes 121 and 122 is defined as H1, and an average distance in the first direction from an extension line of the first surface 1 to ends of the plating layers 141 and 142 disposed on the first and second connection portions 131*a* and 132*a* is defined as H2, H1>H2 may be satisfied. Accordingly, permeation of the plating solution into the internal electrode during the plating process may be prevented, thereby improving reliability. In some embodiments, an average distance in the first direction from an extension line of the first surface 1 to an end of the first plating layer 141 disposed on the first connection portion 131*a* or to an end of the second plating layer 142 disposed on the second connection portion 132*a* is defined as H2.

H1 and H2 may be average values of values measured at five points spaced apart by an equal distance in the third direction on a cross-section (L-T cross-section) obtained by cutting the body 110 in the first and second directions. H1 may be an average value of values measured at the point at which the internal electrode disposed most adjacent (closest) to the first surface 1 is connected to the external electrode in each cross-section, H2 is an average value of values measured with reference to an end of the plating layer in contact with the external electrode in each cross-section, and the extension lines of the first surface which may be a reference of where H1 and H2 are measured may be the same. For example, the measurements may be taken by scanning the cross-section of the body 110 using a scanning electron microscope (SEM). Other methods and/or tools appreciated by one of ordinary skill in the art, even if not described in the present disclosure, may also be used.

In an example embodiment, the first plating layer 141 may be disposed to cover the end disposed on the first external electrode 131 of the insulating layer 151, and the second plating layer 142 may be disposed to cover the end disposed on the second external electrode 132 of the insulating layer 151. Accordingly, cohesion force between the insulating layer 151 and the plating layers 141 and 142 may be strengthened, such that reliability of the multilayer electronic component 1000 may improve.

In an example embodiment, the insulating layer 151 may be disposed to cover the end disposed on the first external electrode 131 of the insulating layer 151, and the insulating layer 151 may be disposed to cover the end disposed on the second external electrode 132 of the insulating layer 151. Accordingly, cohesion force between the insulating layer 151 and the plating layers 141 and 142 may be strengthened, such that reliability of the multilayer electronic component 1000 may improve.

In an example embodiment, the average size of the body in the second direction is defined as L, the average distance in the second direction from an extension line of the third surface to an end of the first band portion is defined as B1, and the average size of the body in the second direction from an extension line of the fourth surface to an end of the second band portion is defined as B2, 0.2≤B1/L≤0.4 and 0.2≤B2/L≤0.4 may be satisfied.

When B1/L and B2/L are less than 0.2, it may be difficult to secure sufficient fixing strength. When B2/L is greater than 0.4, a leakage current may be generated between the first band portion 331*b* and the second band portion 332*b* under a high-voltage current, and the first band portion 331*b* and the second band portion 332*b* may be electrically connected due to plating spread.

B1, B2, and L may be averages of values measured at five points spaced apart by an equal distance in the third direction on a cross-section (L-T cross-section) obtained by cutting the body 110 in the first and second directions. For example, the measurements may be taken by scanning the cross-section of the body 110 using a scanning electron microscope (SEM). Other methods and/or tools appreciated by one of ordinary skill in the art, even if not described in the present disclosure, may also be used.

Referring to FIG. 5 illustrating a mounting substrate 1100 on which the multilayer electronic component 1000 is mounted, the plating layers 141 and 142 of the multilayer electronic component 1000 may be bonded to each other by electrode pads 181 and 182 and solders 191 and 192 disposed on the substrate 180.

When the internal electrodes 121 and 122 are laminated in the first direction, the multilayer electronic component 1000 may be horizontally mounted on the substrate 180 such that the internal electrodes 121 and 122 are parallel to the mounting surface. However, the example embodiment is not limited to the example of horizontal mounting, and when the internal electrodes 121 and 122 are laminated in the third direction, the multilayer electronic component may be vertically mounted on the substrate such that the internal electrodes 121 and 122 may be perpendicular to the mounting surface.

The size of the multilayer electronic component 1000 is not limited to any particular example.

However, to obtain both miniaturization and high capacitance, it may be necessary to increase the number of laminated layers by reducing the thicknesses of the dielectric layer and the internal electrode. Accordingly, the effect of improving reliability and capacitance per unit volume in the example embodiment may be significant in a multilayer electronic component having a size of 1005 (length×width to be 1.0 mm×0.5 mm) or less.

Accordingly, when manufacturing errors, external electrode sizes, or the like are considered, when the length of the ceramic electronic component 100 is 1.1 mm or less and the width is 0.55 mm or less, the effect of improving reliability in the example embodiment may improve. Here, the length of the multilayer electronic component 1000 may refer to a maximum size of the multilayer electronic component 1000 in the second direction, and the width of the multilayer electronic component 1000 may refer to a maximum size of the multilayer electronic component 1000 in the third direction. For example, the measurements may be taken by characterizing the multilayer electronic component 1000 using an optical microscope. Other methods and/or tools appreciated by one of ordinary skill in the art, even if not described in the present disclosure, may also be used.

Embodiment

Table 1 below evaluates moisture resistance reliability depending on an average thickness of the insulating layer including glass and an oxide including aluminum (Al).

Specifically, insulating layers having different average thicknesses were formed on Polyimide (PI) films for test numbers, respectively, and transmittance of moisture was measured at 100% relative humidity and a temperature of 37.8° C.

The moisture-resistance reliability was evaluated by forming an insulating layer on the PI Film, but the effect confirmed from the moisture-resistance reliability evaluation may also be applied to the multilayer electronic components 1000, 2000, and 3000 according to the example embodiments.

TABLE 1

| Test No. | Average thickness of insulating layer (nm) | Moisture permeability $(mg/[m^2 \cdot day])$ |
|---|---|---|
| 1 | 200 | 845 |
| 2 | 400 | 400 |
| 3 | 500 | 0 |
| 4 | 800 | 0 |
| 5 | 1000 | 0 |

In test Nos. 1 and 2, the average thickness of the insulating layer was less than 500 nm, and it is indicated that the effect of preventing moisture permeation was insufficient.

In test Nos. 3 to 5, the average thickness of the insulating layer was 500 nm or more, and it is indicated that moisture transmittance was 0 mg/m² day, and the effect of preventing moisture permeation was remarkable.

Accordingly, by configuring the average thickness t2 of the insulating layer of the multilayer electronic component according to an example embodiment to 500 nm or more, moisture permeation may be prevented and excellent moisture resistance reliability may be secured.

Figure 6:
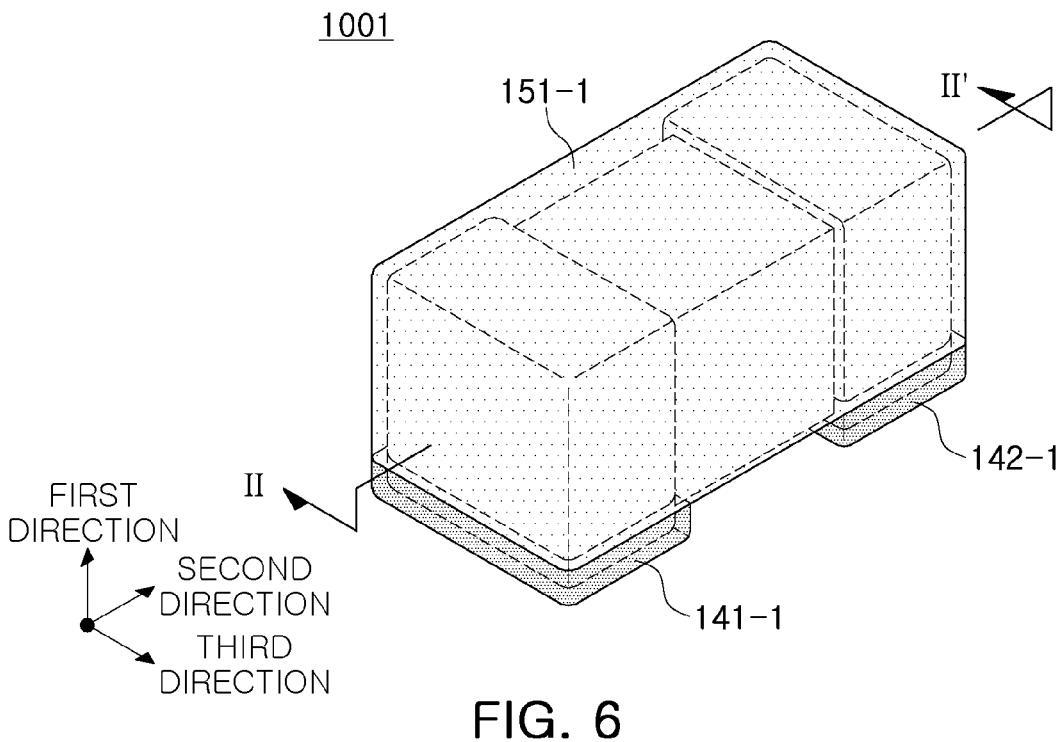
FIG. 6 is a perspective diagram illustrating a multilayer electronic component according to an example embodiment of the present disclosure.
Figure 7:
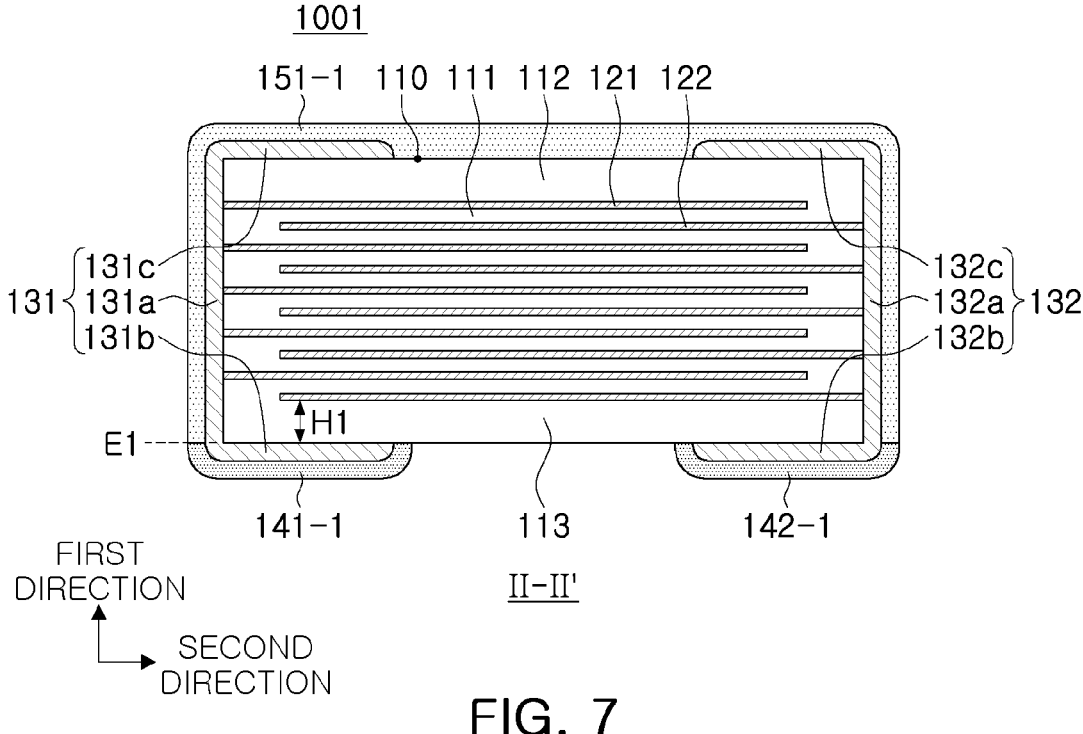
FIG. 7 is a cross-sectional diagram taken along line II-II' in FIG. 6.

FIG. 6 is a perspective diagram illustrating a multilayer electronic component according to an example embodiment. FIG. 7 is a cross-sectional diagram taken along line II-II' in FIG. 6.

Referring to FIGS. 6 and 7, in the multilayer electronic component 1001 in an example embodiment, the first and second plating layers 141-1 and 142-1 may be disposed below the extension line E1 of the first surface. Accordingly, the height of the solder may be reduced during mounting, and the mounting space may be reduced.

Also, the insulating layer 151-1 may extend to a region below the extension line of the first surface and may be in contact with the first and second plating layers 141-1 and 142-1.

Figure 8:
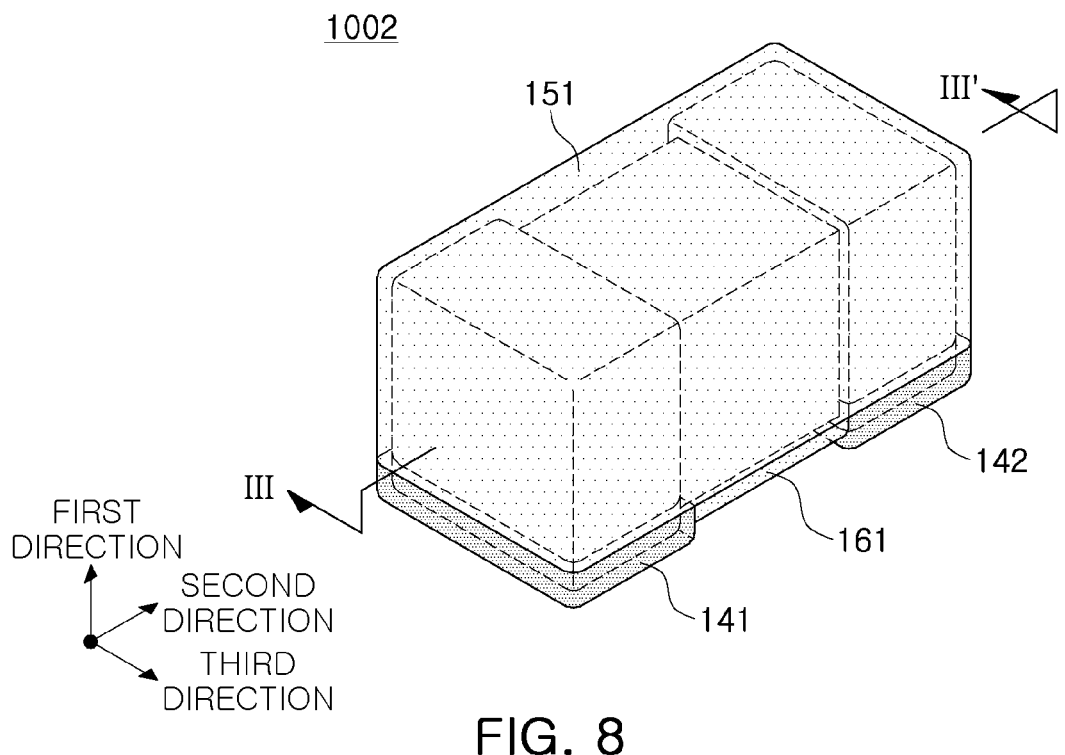
FIG. 8 is a perspective diagram illustrating a multilayer electronic component according to an example embodiment of the present disclosure.
Figure 9:
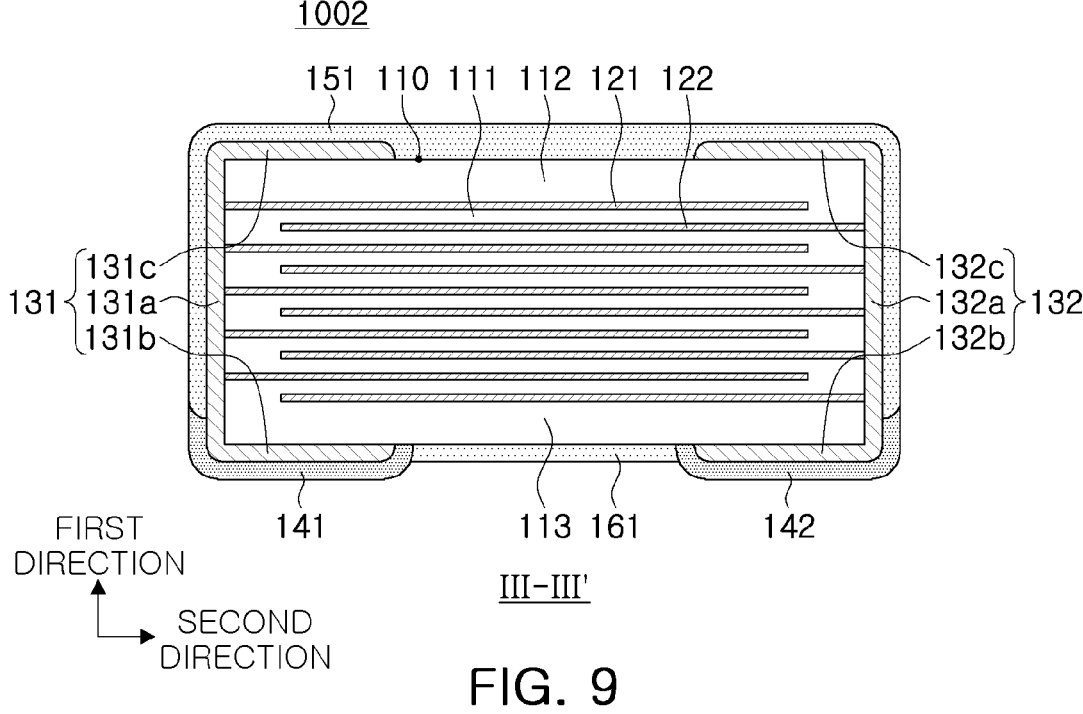
FIG. 9 is a cross-sectional diagram taken along line III-III' in FIG. 8.

FIG. 8 is a perspective diagram illustrating a multilayer electronic component according to an example embodiment. FIG. 9 is a cross-sectional diagram taken along line III-III' in FIG. 8.

Referring to FIGS. 8 and 9, the multilayer electronic component 1002 in an example embodiment may further include an additional insulating layer 161 disposed on the first surface 1 and disposed between a first band portion 131*b* and a second band portion 132*b*. Accordingly, a leakage current which may occur between the first band portion 131*b* and the second band portion 132*b* under a high voltage current may be prevented.

The type of the additional insulating layer 161 is not limited to any particular example. For example, the additional insulating layer 161 may include a second glass, glass, and a second oxide, an oxide including aluminum (Al) similarly to the insulating layer 151. The first and second glass may be the same. The second and second oxides may be the same. However, it may not be necessary to limit the additional insulating layer 161 and the insulating layer 151 to the same material, and the additional insulating layer 161 and the insulating layer 151 may be formed of different materials. For example, the additional insulating layer 161 and the insulating layer 151 may include one or more selected from epoxy resin, acrylic resin, ethyl cellulose, or the like, or may include glass.

Figure 10:
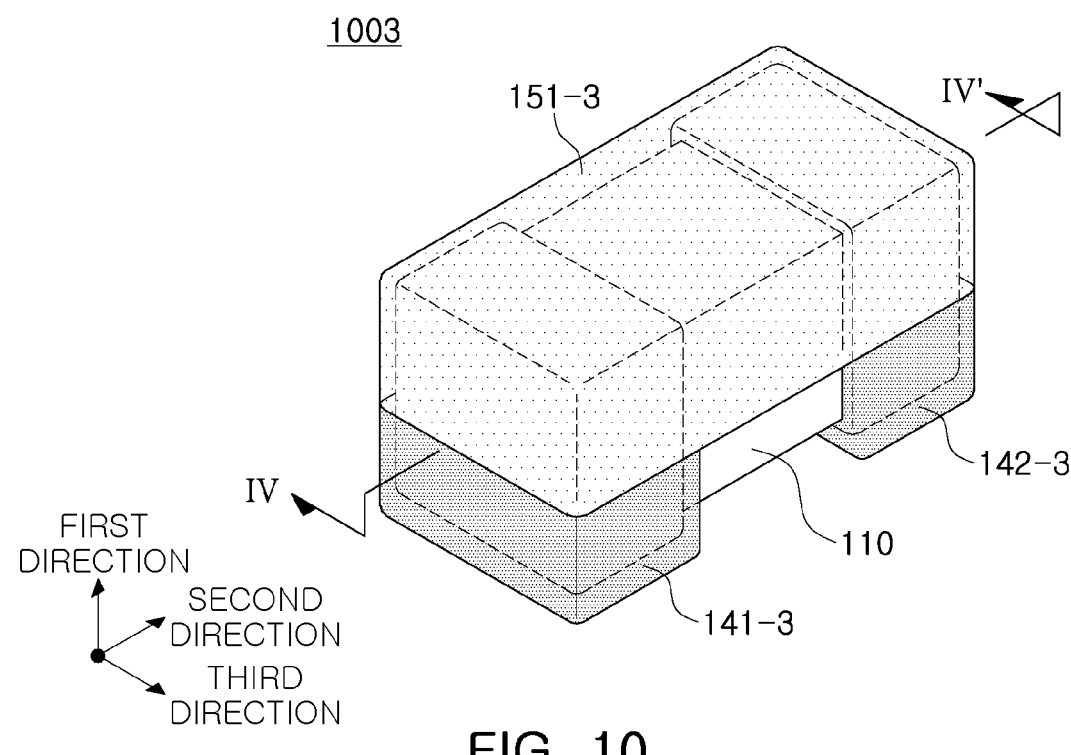
FIG. 10 is a perspective diagram illustrating a multilayer electronic component according to an example embodiment of the present disclosure.
Figure 11:
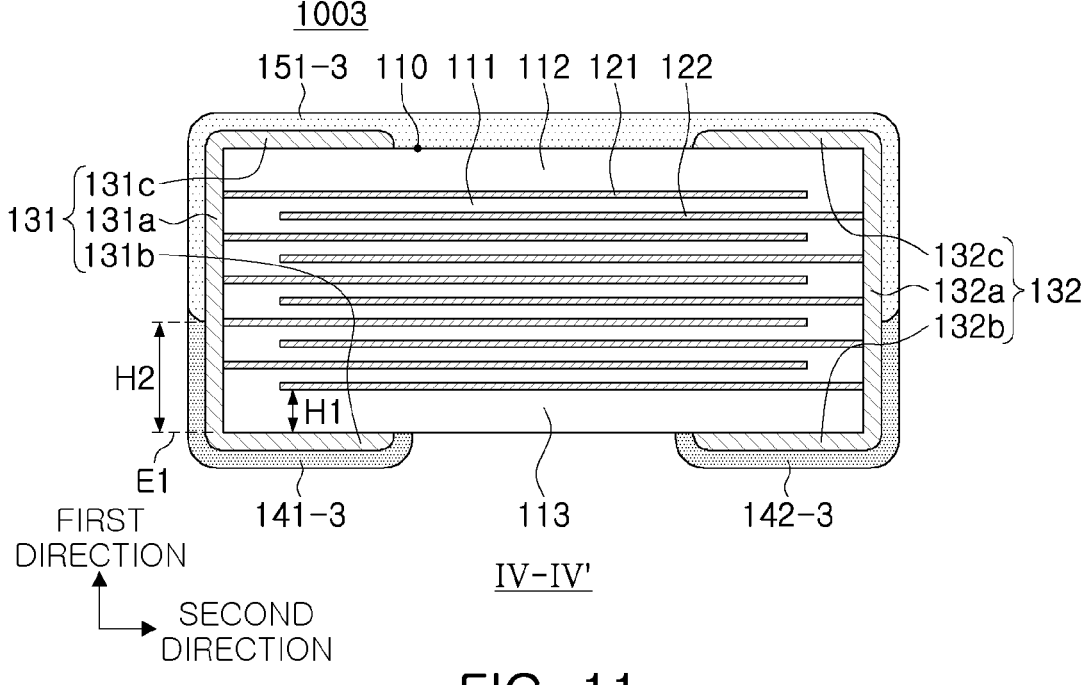
FIG. 11 is a cross-sectional diagram taken along line IV-IV' in FIG. 10.

FIG. 10 is a perspective diagram illustrating a multilayer electronic component according to an example embodiment. FIG. 11 is a cross-sectional diagram taken along line IV-IV' in FIG. 10.

Referring to FIGS. 10 and 11, in the multilayer electronic component 1003 according to an example embodiment, when an average distance in the first direction from the first surface 1 to an internal electrode disposed most adjacent (closest) to the first surface 1 among the internal electrodes 121 and 122 is defined as H1, and an average distance in the first direction from an extension line of the first surface 1 to ends of the plating layers 141-3 and 142-3 disposed on the first and second connection portions 131*a* and 132*a* is defined as H2, H1<H2 may be satisfied. Accordingly, the region in contact with solder during mounting may increase, such that cohesion strength may improve. In some embodiments, an average distance in the first direction from an extension line of the first surface 1 to an end of the first plating layer 141-3 disposed on the first connection portion 131*a* or to an end of the second plating layer 142-3 disposed on the second connection portion 132*a* is defined as H2.

More preferably, when an average size of the body 110 in the first direction is defined as T, H2<T/2 may be satisfied. That is, H1<H2<T/2 may be satisfied, which may be because, when H2 is T/2 or more, the effect of improving moisture resistance reliability by the insulating layer may degrade.

H1, H2, and T may be averages of values measured at five points spaced apart by an equal distance in the third direction on a cross-section (L-T cross-section) obtained by cutting the body 110 in the first and second directions. H1 may be an average value of values measured at the point at which the internal electrode disposed most adjacent (closest) to the first surface 1 is connected to the external electrode in each cross-section, H2 is an average value of values measured with reference to an end of the plating layer in contact with the external electrode in each cross-section, and the extension lines of the first surface which may be a reference of where H1 and H2 are measured may be the same. Also, T may be an average value obtained by measuring maximum sizes of the body 110 in the first direction in respective cross-section. For example, the measurements may be taken by scanning the cross-section of the body 110 using a scanning electron microscope (SEM). Other methods and/or tools appreciated by one of ordinary skill in the art, even if not described in the present disclosure, may also be used.

Figure 12:
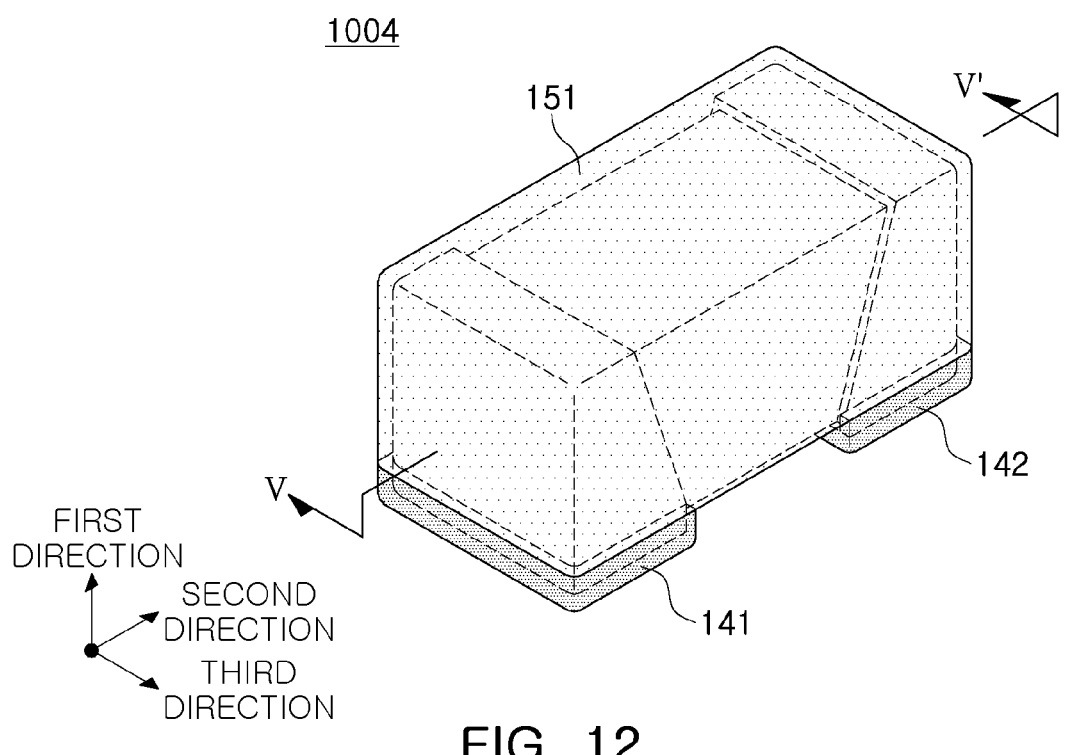
FIG. 12 is a perspective diagram illustrating a multilayer electronic component according to an example embodiment of the present disclosure.
Figure 13:
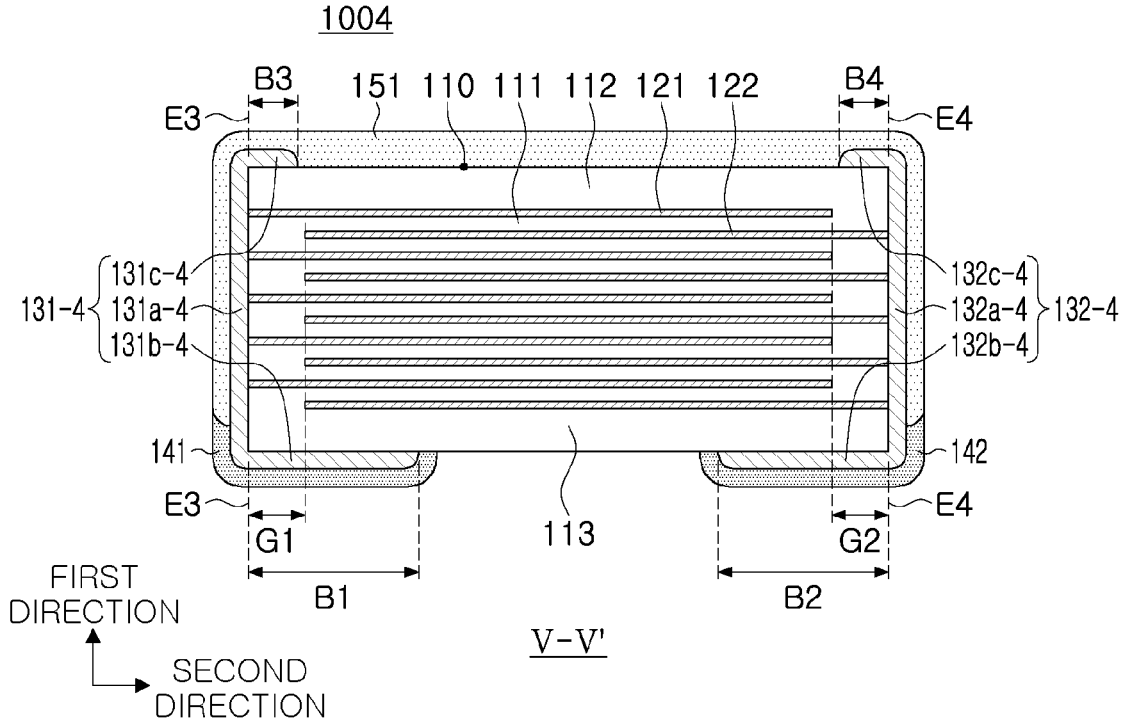
FIG. 13 is a cross-sectional diagram taken along line V-V' in FIG. 12.

FIG. 12 is a perspective diagram illustrating a multilayer electronic component 1004 according to an example embodiment. FIG. 13 is a cross-sectional diagram taken along line V-V' in FIG. 12.

Referring to FIGS. 12 and 13, in the multilayer electronic component 1004 in an example embodiment, an average length B1 of the first band portion 131*b*-4 may be greater than an average length B3 of the third band portion 131*c*-4, and an average length of the second band portion 132*b*-4 may be greater than an average length B4 of the fourth band portion 132*c*-4. Accordingly, the region in contact with the solder during mounting may increase, such that cohesion strength may improve.

In greater detail, the average distance in the second direction from an extension line of the third surface 3 to an end of the first band portion 131*b*-4 is defined as B1, an average distance in the second direction from an extension line of the fourth surface 4 to an end of the second band portion 132*b*-4 is defined as B2, an average distance in the second direction from an extension line of the third surface 3 to an end of the third band portion 131*c*-4 is defined as B3, and an average distance in the second direction from an extension line of the fourth surface 4 to an end of the fourth band portion 132*c*-4 is defined as B4, B3<B1 and B4<B2 may be may be satisfied.

In this case, when an average size of the body 110 in the second direction is defined as L, 0.2≤B1/L≤0.4 and 0.2≤B2/L≤0.4 may be satisfied.

B1, B2, B3, B4 and L may be averages of values measured at five points spaced apart by an equal distance in the third direction on a cross-section (L-T cross-section) obtained by cutting the body 110 in the first and second directions. For example, the measurements may be taken by scanning the cross-section of the body 110 using a scanning electron microscope (SEM). Other methods and/or tools appreciated by one of ordinary skill in the art, even if not described in the present disclosure, may also be used.

Also, the first external electrode 131-4 may include a first side band portion extending from the first connection portion 131*a*-4 to portions of the fifth and sixth surfaces, and the second external electrode 132-4 may include a second side band portion extending from the second connection portion 132*a*-4 to portions of the fifth and sixth surfaces. In this case, the sizes of the first and second side band portions in the second direction may gradually increase toward the first surface. That is, the first and second side band portions may be disposed in a tapered shape or a trapezoidal shape.

Further, when an average distance in the second direction from an extension line of the third surface to an end of the third band portion 131*c*-4 is defined as B3, an average distance in the second direction from an extension line of the fourth surface to an end of the fourth band portion 132*c*-4 is defined as B4, an average size of a region, taken in the second direction, in which the third surface and the second internal electrode 122 are spaced apart from each other is defined as G1, and an average size of a region, taken in the second direction, in which the fourth surface and the second internal electrode 122 are spaced apart from each other is defined as G2, B3≤G1 and B4≤G2 may be satisfied. Accordingly, the volume occupied by the external electrode may be reduced, such that capacitance per unit volume of the multilayer electronic component 1004 may be increased.

As for G1 and G2, an average value of sizes in the second direction, spaced apart from the third surface, measured with respect to arbitrary five second internal electrodes disposed in a central portion taken in the first direction on a cross-section obtained by cutting the body in the first and second directions in a center taken in the third direction may be G1, and an average values of sizes in the second direction, spaced apart from the fourth surface, measured with respect to arbitrary five second internal electrodes disposed in a central portion taken in the first direction in a central portion taken in the first direction may be G2. For example, the measurements may be taken by scanning the cross-section of the body 110 using a scanning electron microscope (SEM). Other methods and/or tools appreciated by one of ordinary skill in the art, even if not described in the present disclosure, may also be used.

Further, G1 and G2 may be obtained from the cross section (L-T cross-section) obtained by cutting the body 110 in the first and second directions at five points spaced apart by an equal distance in the third direction, and the average values thereof may be G1 and G2, such that the values may be further generalized.

However, an example embodiment thereof is not limited to B3≤G1 and B4≤G2, and the example in which B3≥G1 and B4≥G2 are satisfied may be included as an example embodiment. Accordingly, in an example embodiment, when an average distance in the second direction from an extension line of the third surface to an end of the third band portion is defined as B3, an average distance in the second direction from an extension line of the fourth surface to an end of the fourth band portion is defined as B4, an average size of the region in which the third surface and the second internal electrode are spaced apart from each other, taken in the second direction, is defined as G1, and an average size of the region in which the fourth surface and the first internal electrode are spaced apart from each other, taken in the second direction, is defined as G2, B3≥G1 and B4≥G2 may be satisfied.

In an example embodiment, when an average distance in the second direction from an extension line of the third surface E3 to an end of the first band portion is defined as B1, and an average distance in the second direction from an extension line of the fourth surface to an end of the second band portion is defined as B2, B1≥G1 and B2≥G2 may be satisfied. Cohesion strength of the multilayer electronic component 1004 with the substrate 180 may improve.

Figure 14:
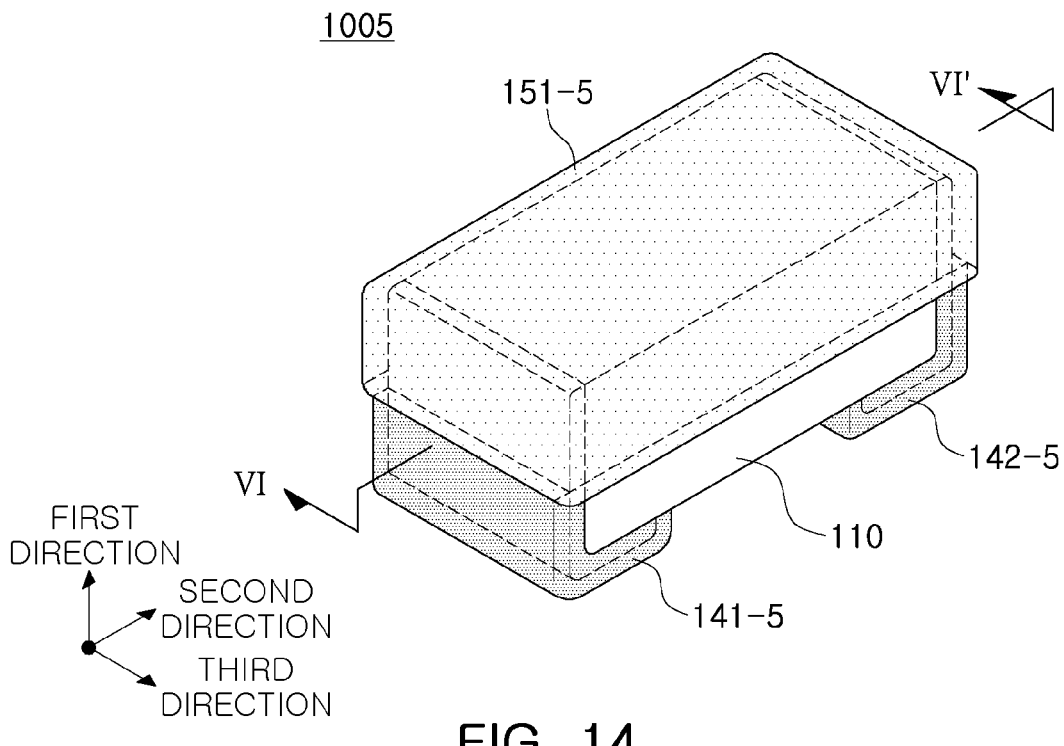
FIG. 14 is a perspective diagram illustrating a multilayer electronic component according to an example embodiment of the present disclosure.
Figure 15:
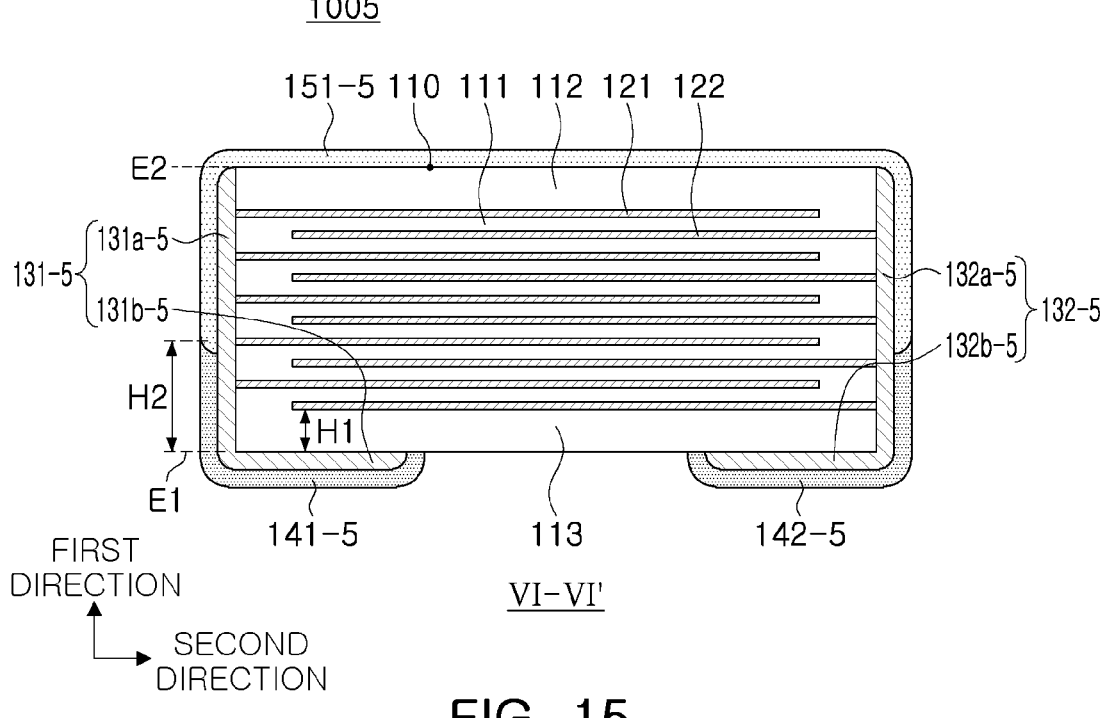
FIG. 15 is a cross-sectional diagram taken along line VI-VI' in FIG. 14.

FIG. 14 is a perspective diagram illustrating a multilayer electronic component 1005 according to an example embodiment. FIG. 15 is a cross-sectional diagram taken along line VI-VI' in FIG. 14.

Referring to FIGS. 14 and 15, the first and second external electrodes 131-5 and 132-5 of the multilayer electronic component 1005 in an example embodiment may not be disposed on the second surface, and may be disposed on the third, fourth, and first surfaces and may have an L-shape. That is, the first and second external electrodes 131-5 and 132-5 may be disposed below an extension line of the second surface.

The first external electrode 131-5 may include a first connection portion 131*a*-5 disposed on the third surface 3, and a first band portion 131*b*-5 extending from the first connection portion 131*a*-5 to a portion of the first surface 1. The second external electrodes 131-5 and 132-5 may include a second connection portion 132*a*-5 disposed on the fourth surface 4, and a second band portion 132*b*-5 extending from the second connection portion 132*a*-5 to a portion of the first surface 1. The external electrodes 131-5 and 132-5 may not be disposed on the second surface 2, such that the insulating layer 151-5 may be disposed to cover the entire second surface 2. Accordingly the volume occupied by the external electrodes 131-5 and 132-5 may be reduced, such that capacitance per unit volume of the multilayer electronic component 1005 may improve. However, an example embodiment thereof is not limited to the example in which the insulating layer 151-5 cover an entirety of the second surface 2, and the insulating layer may not cover a portion or an entirety of the second surface 2, and may be separated therefrom and may cover the first and second connection portions 131*a*-5 and 132*a*-5.

Also, the insulating layer 151-5 may be disposed to cover portions of the fifth and sixth surfaces, thereby improving reliability. In this case, portions of the fifth and sixth surfaces not covered by the insulating layer 151-5 may be exposed.

Further, the insulating layer 151-5 may be disposed to cover an entirety of the fifth and sixth surfaces, and in this case, the fifth and sixth surfaces may not be exposed, such that moisture resistance reliability may improve.

A first plating layer 141-5 may be disposed on the first band portion 131*b*-5, a second plating layer 142-5 may be disposed on the second band portion 132*b*-5, and the first and second plating layers 141-5 and 142-5 may extend to a portion on the first and second connection portions 132*a*-5 and 132*a*-5.

In this case, the external electrodes 131-5 and 132-5 may not be disposed on the fifth and sixth surfaces 5 and 6 as well. That is, the external electrodes 131-5 and 132-5 may be disposed only on the third, fourth, and first surfaces.

An average distance in the first direction from the first surface 1 to an internal electrode disposed most adjacent (closest) to the first surface 1 among the first and second internal electrodes 121 and 122 is defined as H1, and an average distance in the first direction from an extension line of the first surface 1 to ends of the plating layers 141-5 and 142-5 disposed on the first and second connection portions 131a-5 and 132a-5 is defined as H2, H1<H2 may be satisfied. Accordingly, the region in contact with solder during mounting may increase such that cohesion strength may improve, and the area in which the external electrodes 131-5 and 132-5 and the plating layers 141-5 and 142-5 are in contact with each other may increase such that an increase in equivalent series resistance (ESR) may be prevented. In some embodiments, an average distance in the first direction from an extension line of the first surface 1 to an end of the first plating layer 141-5 disposed on the first connection portion 131a-5 or to an end of the second plating layer 142-5 disposed on the second connection portion 132a-5 is defined as H2.

More preferably, when the average size of the body 110 in the first direction is defined as T, H2<T/2 may be satisfied. That is, H1<H2<T/2 may be satisfied, which may be because, when H2 is T/2 or more, the effect of improving moisture resistance reliability by the insulating layer may decrease.

Also, the first and second plating layers 141-5 and 142-5 may be disposed to cover a portion of the insulating layer 151-1 on the third and fourth surfaces. That is, the plating layers 141-5 and 142-5 may be disposed to cover ends of the insulating layer 151-5 on the third and fourth surfaces. Accordingly, bonding force between the insulating layer 151-5 and the plating layers 141-5 and 142-5 may be strengthened such that reliability of the multilayer electronic component 1005 may improve.

Also, the insulating layer 151-5 may be disposed to cover a portion of the first and second plating layers 141-5 and 142-5 on the third and fourth surfaces. That is, the insulating layer 151-5 may be disposed to cover ends of the plating layers 141-5 and 142-5 on the third and fourth surfaces. Accordingly, bonding force between the insulating layer 151-5 and the plating layers 141-5 and 142-5 may be strengthened such that reliability of the multilayer electronic component 1005 may improve.

Figure 16:
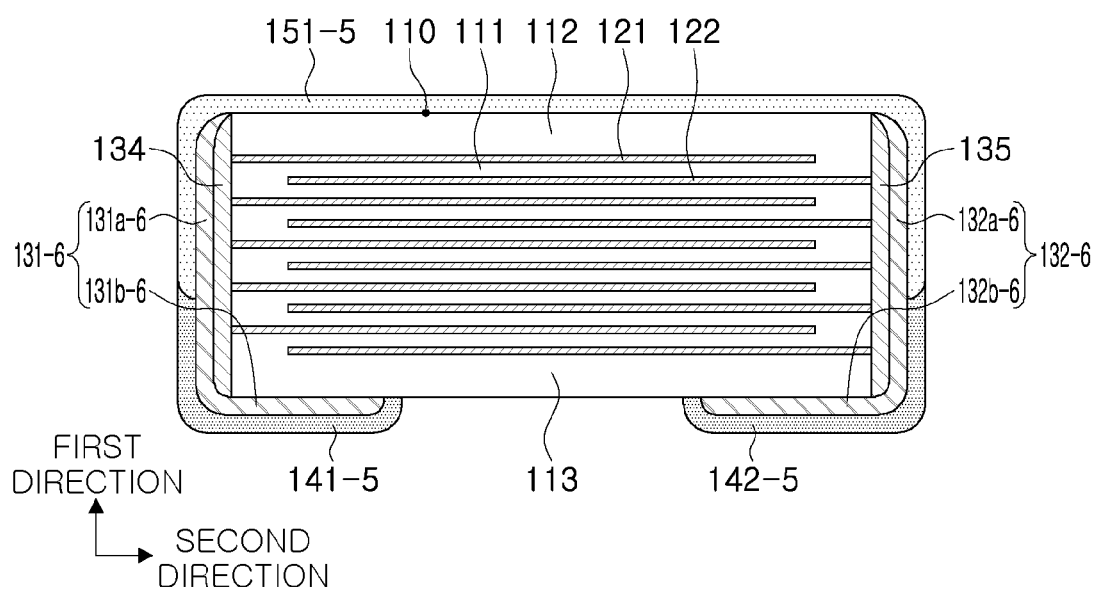
FIG. 16 is a diagram illustrating a modified example of the example in FIG. 14.

FIG. 16 is a diagram illustrating a modified example of the example in FIG. 14. Referring to FIG. 16, in the modified example 1006 of the multilayer electronic component 1005 in an example embodiment, a first additional electrode layer 134 may be disposed between the first connection portion 131a-6 and the third surface. A second additional electrode layer 135 may be disposed between the second connection portion 132a-6 and the fourth surface. The first additional electrode layer 134 may be disposed within a range not deviating from the third surface, and the second additional electrode layer 135 may be disposed within a range not deviating from the fourth surface. The first and second additional electrode layers 134 and 135 may improve electrical connectivity between the internal electrodes 121 and 122 and the external electrodes 131-6 and 132-6, and bonding strength with the external electrodes 131-6 and 132-6 may be excellent, such that mechanical bonding strength of the external electrodes 131-6 and 132-6 may further improve.

The first and second external electrodes 131-6 and 132-6 may have an L-shape in which the first and second external electrodes are not disposed on the second surface.

The first external electrode 131-6 may include a first connection portion 131a-6 disposed on the first additional electrode layer 134, and a first band portion 131b-6 extending from the first connection portion 131a-6 to a portion of the first surface 1. The second external electrode 132-6 may include a second connecting portion 132a-6 disposed on the second additional electrode layer 135 and a second band portion 132b-6 extending from the second connection portion 132a-6 to a portion of the first surface 1.

The first and second additional electrode layers 134 and 135 may be formed of any material having electrical conductivity, such as a metal, and specific materials may be determined in consideration of electrical properties, structural stability, or the like. Also, the first and second additional electrode layers 134 and 135 may be fired electrodes including a conductive metal and glass, or resin-based electrodes including a conductive metal and resin. Also, the first and second additional electrode layers 134 and 135 may be formed by transferring a sheet including a conductive metal to the body.

As the conductive metal included in the first and second additional electrode layers 134 and 135, a material having excellent electrical conductivity may be used, and the material is not limited to any particular example. For example, the conductive metal may be one or more of Cu, Ni, Pd, Ag, Sn, Cr, and alloys thereof. Preferably, the first and second additional electrode layers 134 and 135 may include at least one of Ni and a Ni alloy, and accordingly, connectivity with the internal electrodes 121 and 122 including Ni may further improve.

Figure 17:
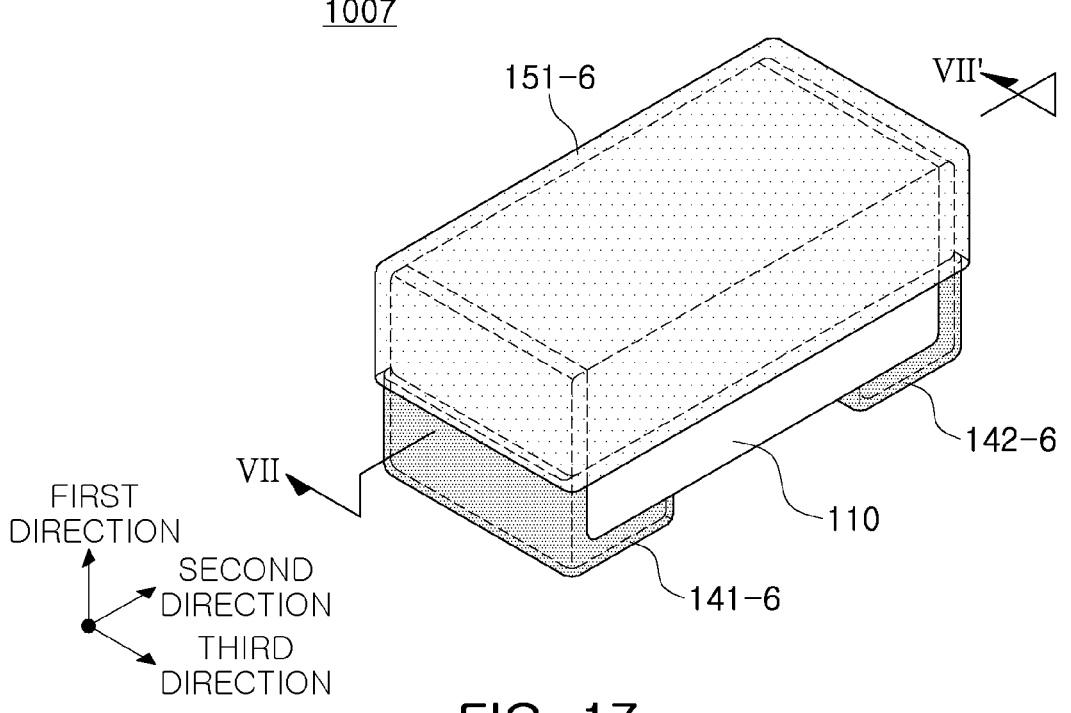
FIG. 17 is a perspective diagram illustrating a multilayer electronic component according to an example embodiment of the present disclosure.
Figure 18:
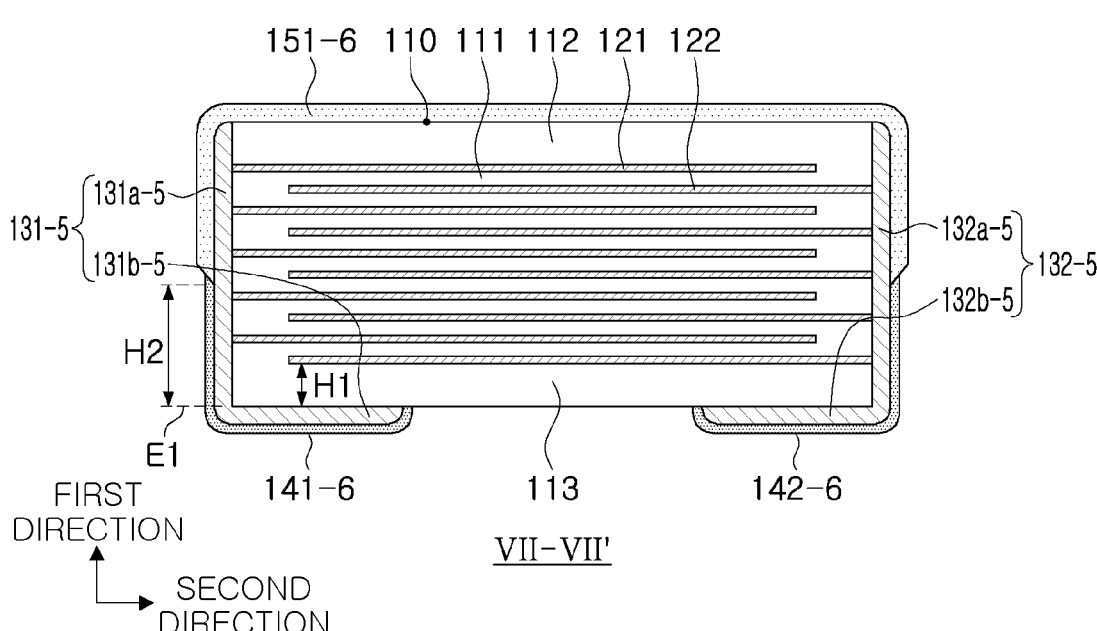
FIG. 18 is a cross-sectional diagram taken along line VII-VII' in FIG. 17.

FIG. 17 is a perspective diagram illustrating a multilayer electronic component 1007 according to an example embodiment. FIG. 18 is a cross-sectional diagram taken along line VII-VII' in FIG. 17.

Referring to FIGS. 17 and 18, an average thickness t1 of the first and second plating layers 141-6 and 142-6 of the multilayer electronic component 1006 in an example embodiment may be less than an average thickness t2 of the insulating layer 151-6.

The insulating layer 351 may prevent permeation of external moisture or the plating solution, but connectivity with the plating layers 341 and 342 may be relatively weak, which may cause delamination of the plating layer. When the plating layer is delaminated, cohesion strength with the substrate may be reduced. Here, the delamination of the plating layer may refer to separation of a portion of the plating layer or physical separation of the plating layer from the external electrodes 331 and 332. Since the connection between the plated layer and the insulating layer is relatively weak, it may be highly likely that a gap between the insulating layer and the plated layer may be widened or foreign substances may enter, and the possibility of delamination may increase due to vulnerability to external impacts.

In an example embodiment, by reducing the average thickness of the plated layer to be less than the average thickness of the insulating layer, the contact area between the plated layer and the insulating layer may be reduced, thereby preventing delamination and improving cohesion strength of the multilayer electronic component 1000 with the substrate 180.

The thickness t1 of the first and second plating layers 141-6 and 142-6 may be an average value of thicknesses at 5 points of the first and second connection portions 131a-5 and 132a-5 or the first and second band portions 131b-5 and 132b-5, spaced apart by an equal distance, and the thickness t2 of the insulating layer 151-6 may be an average value of thicknesses at 5 points of the first and second connection portions 131a-5 and 132a-5, spaced apart by an equal distance.

Figure 19:
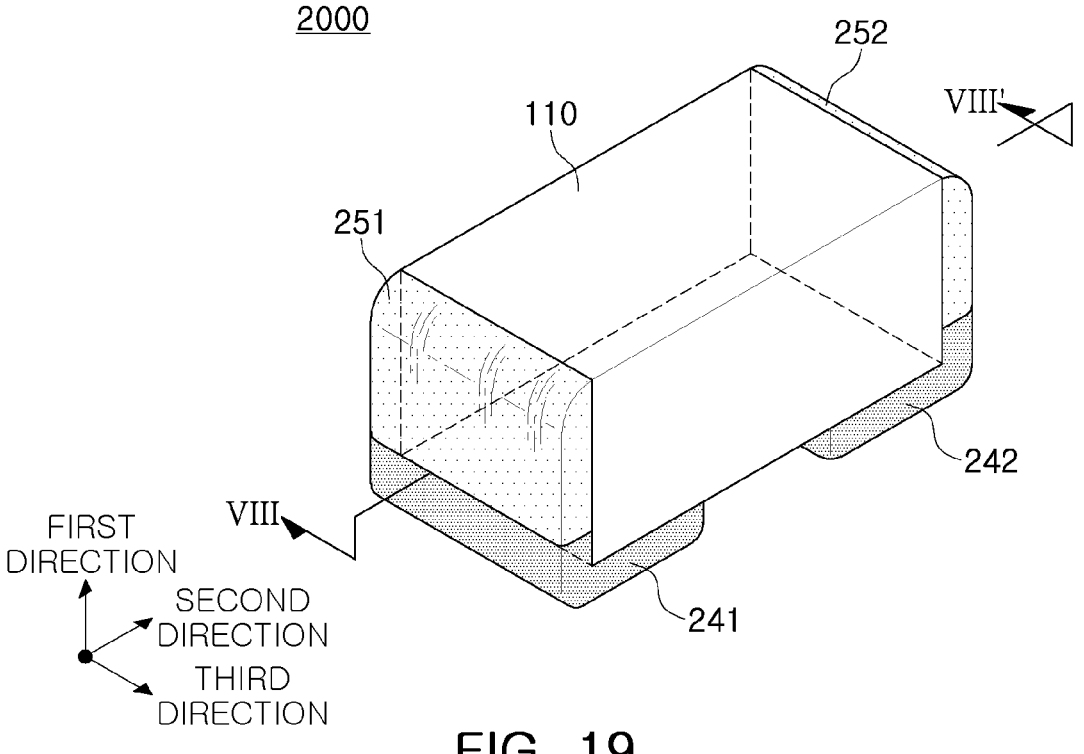
FIG. 19 is a perspective diagram illustrating a multilayer electronic component according to an example embodiment of the present disclosure.
Figure 20:
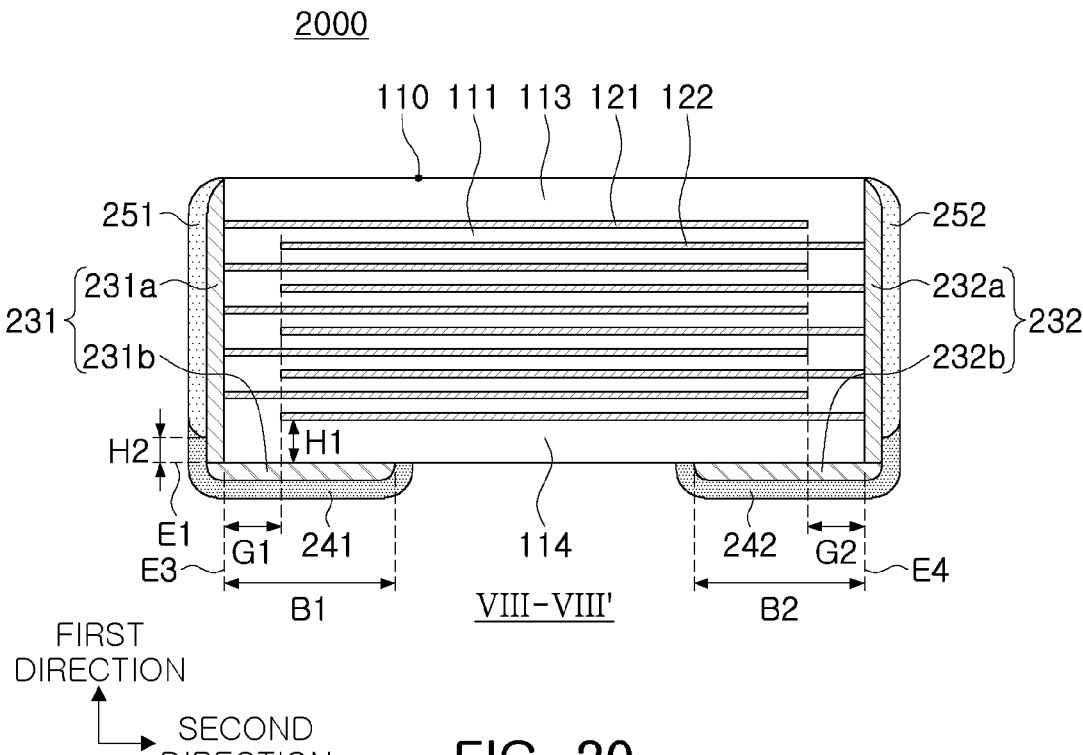
FIG. 20 is a cross-sectional diagram taken along line VIII-VIII' in FIG. 19.

FIG. 19 is a perspective diagram illustrating a multilayer electronic component 2000 according to an example embodiment. FIG. 20 is a cross-sectional diagram taken along line VIII-VIII' in FIG. 19.

Hereinafter, a multilayer electronic component 2000 according to an example embodiment will be described, and the description overlapping the aforementioned example embodiment will not be provided.

The multilayer electronic component 1000 in an example embodiment may include a dielectric layer 111 and first and second internal electrodes 121 and 122 alternately disposed with the dielectric layer 111 interposed therebetween, and may further include a body 110 including first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction; a first external electrode 231 including a first connection electrode 231a disposed on the third surface and a first band electrode 231b disposed on the first surface and connected to the first connection electrode; a second external electrode 232 including a second connection electrode 232a disposed on the fourth surface and a second band electrode 232b disposed on the first surface and connected to the second connection electrode; a first insulating layer 251 disposed on the first connection electrode; a second insulating layer 252 disposed on the second connection electrode; a first plating layer 241 disposed on the first band electrode; and a second plating layer 242 disposed on the second band electrode, wherein the first and second insulating layers 251 and 252 may include a first glass, glass, and a first oxide, an oxide including aluminum (Al).

The first connection electrode 231a may be disposed on the third surface 3 and may be connected to the first internal electrode 121, and the second connection electrode 231a may be disposed on the fourth surface 4 and may be connected to the second internal electrode 122. Also, a first insulating layer 251 may be disposed on the first connection electrode 231a', and a second insulating layer 252 may be disposed on the second connection electrode 232a.

Generally, when an external electrode is formed, a method of dipping the exposed surface of the internal electrode of the body into paste including a conductive metal using paste including a conductive metal may be mainly used. However, a thickness of the external electrode formed by the dipping method may be excessively increased in a central portion thereof in the thickness direction. Also, in addition to the thickness imbalance of the external electrode by using the dipping method, since the internal electrode is exposed to the third and fourth surfaces, to prevent permeation of moisture and plating solution through the external electrode, the thickness of the external electrode disposed on the third and fourth surfaces may be equal to or greater than a predetermined thickness.

Differently from the above example, in the example embodiment, since the insulating layers 251 and 252 are disposed on the connection electrodes 231a and 232a, even when a thickness of the connection electrodes 231a and 232a on the third and fourth surfaces is reduced, sufficient reliability may be secured.

The first and second connection electrodes 231a and 232a may have a shape corresponding to the third and fourth surfaces, respectively, and the surface of the first and second connection electrodes 231a and 232a facing the body 110 may have the same area as the third and fourth surfaces of the body 110. The first and second connection electrodes 231a and 232a may be disposed within a range not deviating from the third and fourth surfaces 3 and 4, respectively. The connection electrodes 231a and 232a may be disposed to not extend to the first, second, fifth, and sixth surfaces 1, 2, 5, and 6 of the body 110. Specifically, in an example embodiment, the first and second connection electrodes 231a and 232a may be spaced apart from the fifth and sixth surfaces, and accordingly, sufficient connectivity between the internal electrodes 121 and 122 and the external electrodes 231 and 232 may be secured, and the volume occupied by the external electrode may be reduced, such that per unit volume of the multilayer electronic component 2000 may increase.

In this regard, the first and second connection electrodes 231a and 232a may be spaced apart from the second surface 2. That is, since the external electrodes 231 and 232 are not disposed on the second surface, the volume occupied by the external electrodes 231 and 232 may be further reduced such that capacitance per unit volume of the multilayer electronic component 2000 may increase.

The connection electrodes 231a and 232a may extend to a corner of the body 110 and may include a corner portion disposed on the corner. That is, in an example embodiment, the first connection electrode may include a corner portion (not illustrated) extending to the 1-3 corner and the 2-3 corner, and the second connection electrode may include a corner portion (not illustrated) extending to the 1-4 corner and the 2-4 corner.

Also, the connection electrodes 231a and 232a may have a uniform and reduced thickness as compared to the external electrodes formed by a general dipping method.

The method of forming the connection electrodes 231a and 232a is not limited to any particular example, and for example, the connection electrodes 231a and 232a may be formed by a method of transferring a sheet including a conductive metal or an organic material such as a binder to the third and fourth surfaces, but an example embodiment thereof is not limited thereto, and connection electrodes 231a and 232a may be formed by plating a conductive metal on the third and fourth surfaces. That is, the connection electrodes 231a and 232a may be a fired layer formed by firing a conductive metal or a plating layer.

The thickness of the connection electrodes 231a and 232a is not limited to any particular example, and may be, for example, 2 to 7 μm. Here, the thickness of the connection electrodes 231a and 232a may indicate the maximum thickness, and may indicate the size of the connection electrodes 231a and 232a in the second direction.

In an example embodiment, the first and second connection electrodes 231a and 232a may include a metal and glass the same as those included in the internal electrodes 121 and 122. As the first and second connection electrodes 231a and 232a include the same metal as the metal included in the internal electrodes 121 and 122, electrical connectivity with the internal electrodes 121 and 122 may improve, and as the first and second connection electrodes 231a and 232a include glass, bonding strength with the body 110 and/or the insulating layers 251 and 252 may improve. In this case, the same metal as the metal included in the internal electrodes 121 and 122 may be Ni.

The first and second insulating layers 251 and 252 may be disposed on the first and second connection electrodes 231a and 232*a* and may prevent a plating layer from being formed on the first and second connection electrodes 231*a* and 232*a*. Also, the first and second insulating layers 251 and 252 may improve sealing properties, thereby reducing permeation of moisture or a plating solution.

The first and second insulating layers 251 and 252 may include a first glass, glass, and a first oxide, an oxide including aluminum (Al).

Accordingly, moisture resistance reliability may improve, and cracks caused by thermal reduction, radiation cracks caused by metal diffusion, and the like, may be prevented.

The first and second band electrodes 231*b* and 232*b* may be disposed on the first surface 1 of the body 110. The first and second band electrodes 231*b* and 232*b* may be electrically connected to the first and second internal electrodes 121 and 122 by being in contact with the first and second connection electrodes 231*a* and 232*a*, respectively.

A thickness of the external electrode formed by a general dipping method may be formed to be relatively great on the third and fourth surfaces and may partially extend to the first, second, fifth and sixth surfaces, such that it may be difficult to secure a high effective volume ratio.

In an example embodiment, the first and second connection electrodes 231*a* and 232*a* may be disposed on the surface on which the internal electrode is exposed, and the first and second band 231*b* and 232*b* may be disposed on the surface of the substrate, such that a high effective volume ratio may be secured.

When the internal electrodes 121 and 122 are laminated in the first direction, the multilayer electronic component 2000 may be horizontally mounted on a substrate such that the internal electrodes 121 and 122 may be parallel to the mounting surface. However, an example embodiment thereof is not limited to the horizontal mounting, and when the internal electrodes 121 and 122 are laminated in the third direction, the multilayer electronic component may be vertically mounted on the substrate such that the internal electrodes 121 and 122 may be perpendicular to the mounting surface.

The first and second band electrodes 231*b* and 232*b* may be formed of any material having electrical conductivity, such as metal, and a specific material may be determined in consideration of electrical properties and structural stability. For example, the first and second band electrodes 231*b* and 232*b* may be fired electrodes including conductive metal and glass, and may be formed by applying paste including conductive metal and glass to the first surface of the body, but an example embodiment thereof is not limited thereto, and the first and second band electrodes 231*b* and 232*b* may be plating layers formed by plating a conductive metal on the first surface of the body.

A material having excellent electrical conductivity may be used as the conductive metal included in the first and second band electrodes 231*b* and 232*b*, and the material is not limited to any particular example. For example, the conductive metal may be one or more of nickel (Ni), copper (Cu), and alloys thereof, and may include the same metal as the metal included in the internal electrodes 121 and 122.

In an example embodiment, to secure sealing properties and high strength, the first external electrode 231 may include a third band electrode (not illustrated) disposed on the second surface 2 and connected to the first connection electrode 231*a*, and the second external electrode 232 may include a fourth band electrode (not illustrated) disposed on the second surface 2 and connected to the second connection electrode 232*a*.

In an example embodiment, the average distance from an extension line E3 of the third surface to an end of the first band electrode 231*b* is defined as B1, the average distance from an extension line E4 of the fourth surface 4 to an end of the second band electrode 232*b* is defined as B2, an average distance from an extension line of the third surface to an end of the third band electrode (not illustrated) is defined as B3, an average distance from an extension line of the fourth surface to an end of the fourth band electrode (not illustrated) is defined as B4, an average size of the region in which the third surface and the second internal electrode 122 are spaced apart from each other, taken in the second direction, is defined as G1, and an average size of the region in which the fourth surface and the first internal electrode 121 are spaced apart from each other, taken in the second direction, is defined as G2, $B1 \geq G1$, $B3 \leq G1$, $B2 \geq G2$ and $B4 \leq G2$ may be satisfied. Accordingly, the volume occupied by the external electrode may be reduced, such that capacitance per unit volume of the multilayer electronic component 2000 may increase and the area in contact with solder during mounting may increase, thereby improving cohesion strength.

However, an example embodiment thereof is not limited to $B1 \geq G1$, $B3 \leq G1$, $B2 \geq G2$ and $B4 \leq G2$, and the example in which $B1 \geq G1$, $B3 \geq G1$, $B2 \geq G2$ and $B4 \geq G2$ are satisfied may be included in the example embodiment. Accordingly, in an example embodiment, the average distance B1 from an extension line E3 of the third surface to an end of the first band electrode 231*b* is defined as B1, the average distance from the extension line E4 of the fourth surface to the end of the second band electrode 232*b* is defined as B2, the average distance from the extension line of the third surface to the end of the third band electrode (not illustrated) is defined as B3, the average distance from the extension line of the fourth surface to the end of the fourth band electrode (not illustrated) is defined as B4, and the average size of the region in which the third surface and the second internal electrode 122 are spaced apart from each other, taken in the second direction, is defined as G1, and the average size of the region in which the fourth surface and the first internal electrode 121 are spaced apart from each other, taken in the second direction, is defined as G2, $B1 \geq G1$, $B3 \geq G1$, $B2 \geq G2$ and $B4 \geq G2$ may be satisfied.

The first and second plating layers 241 and 242 may be disposed on the first and second band electrodes 231*b* and 232*b*. The first and second plating layers 241 and 242 may improve mounting properties. The types of the first and second plating layers 241 and 242 are not limited to any particular example, and may be a plating layer including at least one of Ni, Sn, Pd, and alloys thereof, and may include a plurality of layers.

For example, the first and second plating layers 241 and 242 may be a Ni plating layer or a Sn plating layer, and the Ni plating layer and the Sn plating layer may be formed in order on the first and second band electrodes 231*b* and 232*b*.

In an example embodiment, the first and second plating layers 241 and 242 may extend to partially cover the first and second connection electrodes 231*a* and 232*a*, respectively.

When an average distance in the first direction from the first surface 1 to the internal electrode disposed most adjacent (closest) to the first surface 1 among the first and second internal electrodes 121 and 122 is defined as H1, and an average distance in the first direction from an extension line of the first surface 1 to an ends of the first and second plating layers 241 and 242 disposed on the first and second connection electrodes 231*a* and 232*a* is defined as H2, $H1 > H2$ may be satisfied. Accordingly, permeation of the plating solution into the internal electrode during the plating process may be prevented, thereby improving reliability. In some embodiments, an average distance in the first direction from an extension line of the first surface 1 to an end of the first plating layer 241 disposed on the first connection electrode 231a or to an end of the second plating layer 42 disposed on the second connection electrode 232a is defined as H2.

In an example embodiment, the first and second insulating layers 251 and 252 may be disposed to be in direct contact with the first and second connection electrodes 231a and 232a, respectively, and the first and second connection electrodes 231a and 232a may include a conductive metal and glass. Accordingly, since the plating layers 241 and 242 may not be disposed on the regions in which the insulating layers 251 and 252 are disposed among the exterior surfaces of the first and second connection electrodes 231a and 232a, erosion of the external electrodes caused by the plating solution may be effectively prevented.

In an example embodiment, the first and second insulating layers 251 and 252 may be disposed to be in direct contact with the first and second connection electrodes 231a and 232a, respectively, and the first and second connection electrodes 231a and 232a may include a conductive metal and glass. Accordingly, since the plating layers 241 and 242 may not be disposed on the regions in which the insulating layers 251 and 252 are disposed among the exterior surfaces of the first and second connection electrodes 231a and 232a, erosion of the external electrodes caused by the plating solution may be effectively prevented.

In an example embodiment, the first plating layer 241 may be disposed to cover an end of the first insulating layer 251 disposed on the first external electrode 231, and the second plating layer 242 may be disposed to cover an end of the second insulating layer 252 disposed on the second external electrode 232. Accordingly, bonding force between the insulating layers 251 and 252 and the plating layers 241 and 242 may be strengthened, such that reliability of the multilayer electronic component 2000 may improve. Also, by first forming the first and second insulating layers 251 and 252 before forming the plating layers 241 and 242 on the external electrodes 231 and 232, permeation of the plating solution in the process of forming a plating layer may be reliably prevented. As the insulating layer is formed before the plating layer, the plating layers 241 and 242 may have a shape covering the ends of the insulating layers 251 and 252.

In an example embodiment, the first insulating layer 251 is disposed to cover the end of the first plating layer 241 disposed on the first external electrode 231, and the second insulating layer 252 may be disposed to cover an end of the second plating layer 242 disposed on the second external electrode 232. Accordingly, bonding force between the insulating layer 351 and the plating layers 241 and 242 may be strengthened, such that reliability of the multilayer electronic component 2000 may improve.

Figure 21:
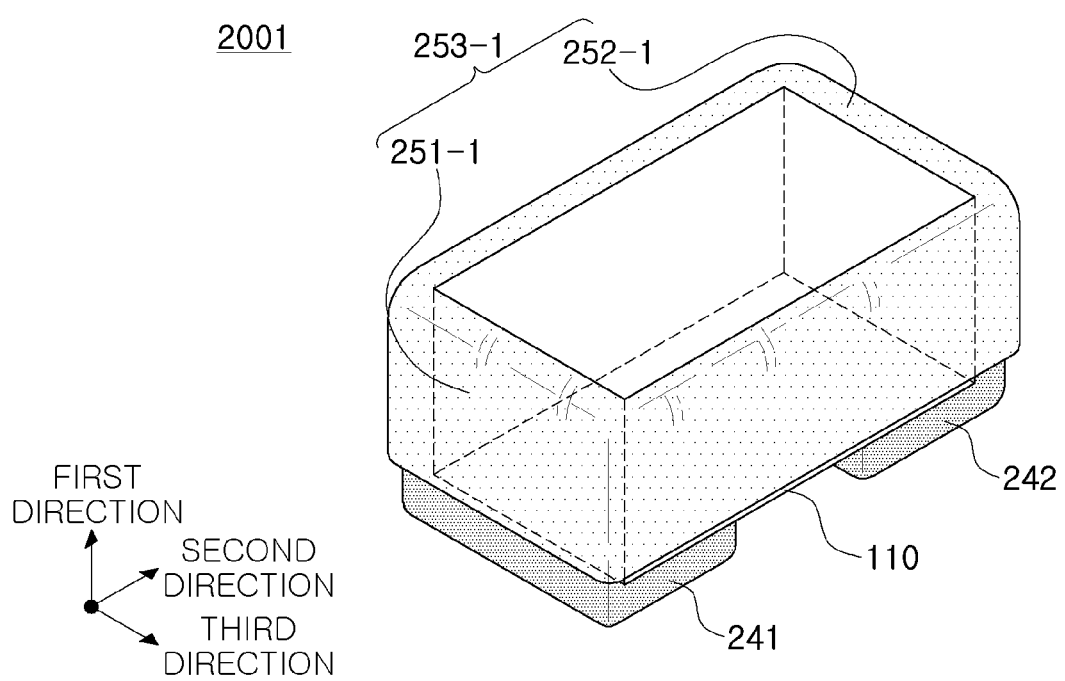
FIG. 21 is a diagram illustrating a modified example of the example in FIG. 19.

FIG. 21 is a diagram illustrating a modified example of the example in FIG. 19. Referring to FIG. 21, in the modified example 2001 of the multilayer electronic component 2000, the first and second insulating layers 251-1 and 252-1 may extend to the fifth and sixth surfaces 5 and 6 and may be connected to each other such that the insulating layers may be connected as an integrated insulating layer 253-1. In this case, the connected first and second insulating layers 253-1 may be disposed to cover portions of the fifth and sixth surfaces.

Figure 22:
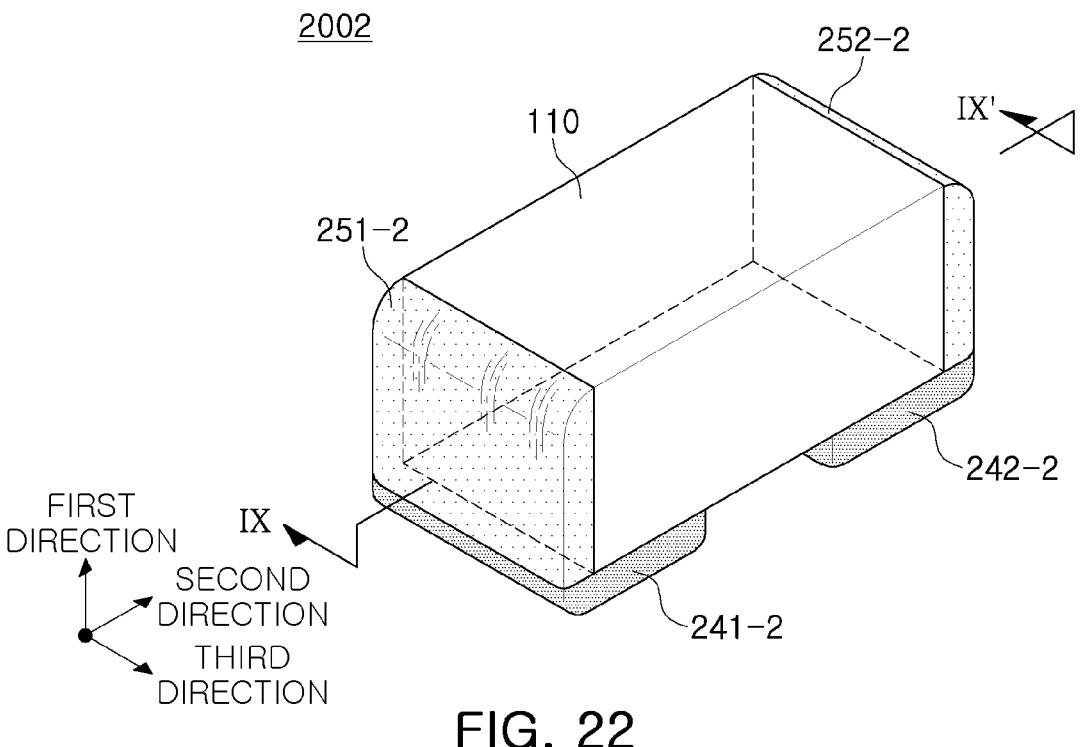
FIG. 22 is a perspective diagram illustrating a multilayer electronic component according to an example embodiment of the present disclosure.
Figure 23:
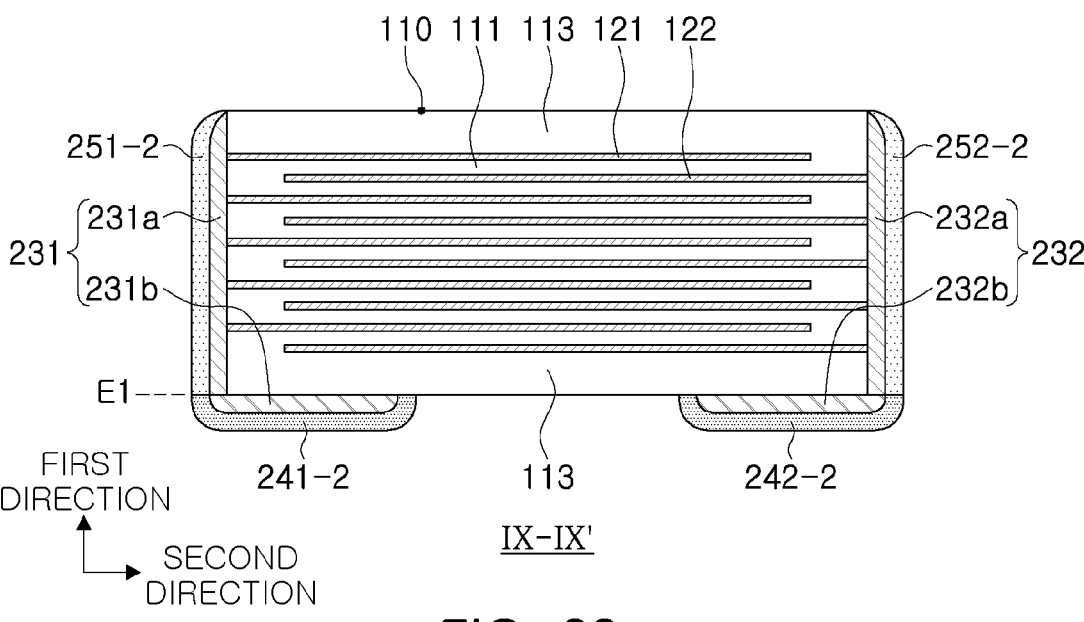
FIG. 23 is a cross-sectional diagram taken along line IX-IX' in FIG. 22.

FIG. 22 is a perspective diagram illustrating a multilayer electronic component 2002 according to an example embodiment. FIG. 23 is a cross-sectional diagram taken along line IX-IX' in FIG. 2.

Referring to FIGS. 22 and 23, in the multilayer electronic component 2002 in an example embodiment, the first and second plating layers 241-2 and 242-2 may be disposed to a region below the extension line of the first surface. Accordingly, a height of solder may be reduced during mounting and a mounting space may be reduced.

Also, the first and second insulating layers 251-2 and 252-2 may extend to a region below the extension line of the first surface and may be in contact with the first and second plating layers 241-2 and 242-2.

Figure 24:
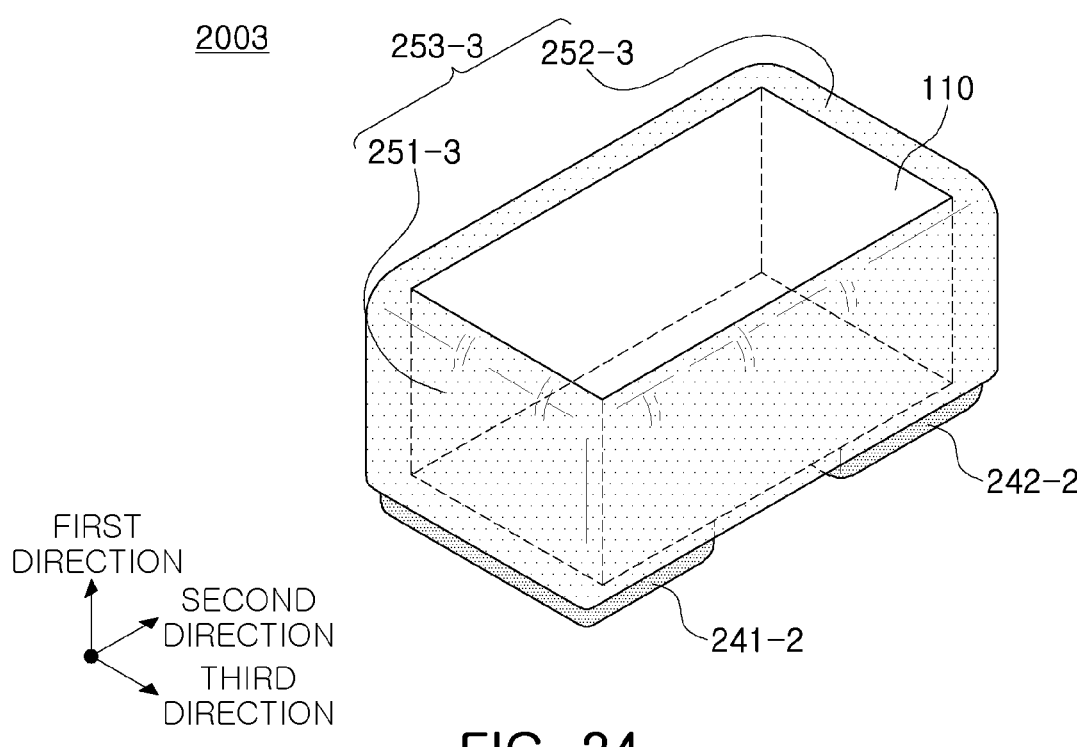
FIG. 24 is a diagram illustrating a modified example of the example in FIG. 22.

FIG. 24 is a diagram illustrating a modified example of the example in FIG. 22. Referring to FIG. 24, in the modified example 2003 of the multilayer electronic component 2002 in an example embodiment, the first and second insulating layers 251-3 and 252-3 may extend to the fifth and sixth surfaces 5 and 6 and may be connected to each other such that the insulating layers may be connected as an integrated insulating layer 253-3.

Figure 25:
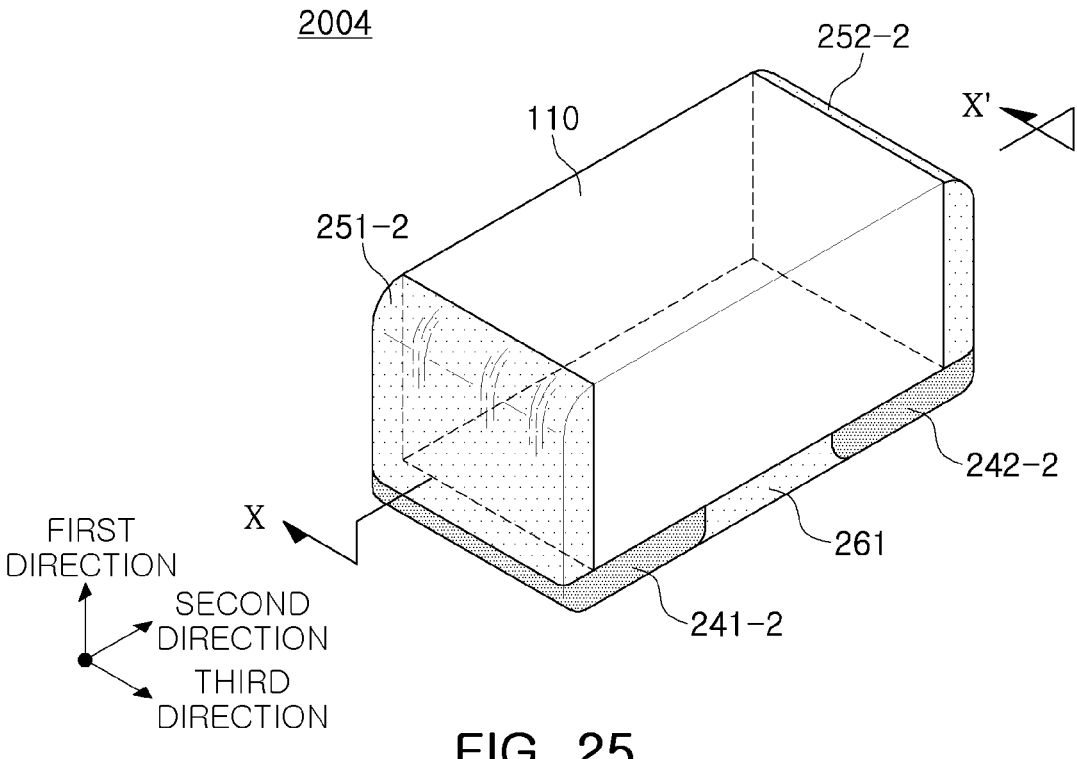
FIG. 25 is a perspective diagram illustrating a multilayer electronic component according to an example embodiment of the present disclosure.
Figure 26:
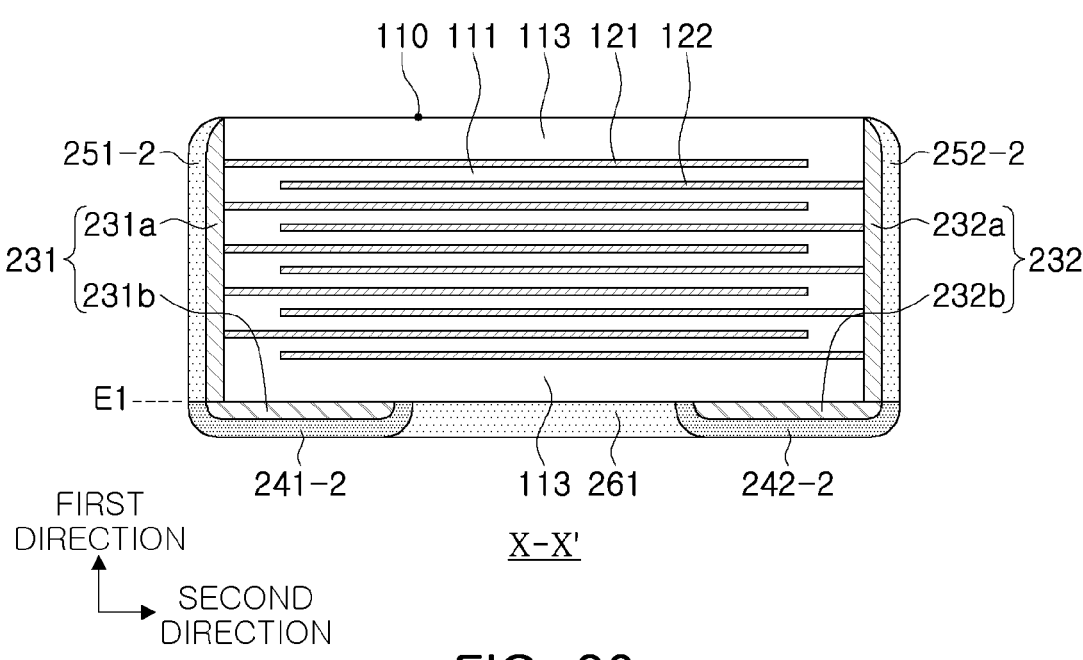
FIG. 26 is a cross-sectional diagram taken along line X-X' in FIG. 25.

FIG. 25 is a perspective diagram illustrating a multilayer electronic component 2004 according to an example embodiment. FIG. 26 is a cross-sectional diagram taken along line X-X' in FIG. 25.

Referring to FIGS. 25 and 26, the multilayer electronic component 2004 in an example embodiment may further include an additional insulating layer 261 disposed on the first surface 1 and disposed between the first band electrode 231b and the second band electrode 232b. Accordingly, a leakage current that may occur between the first band electrode 231b and the second band electrode 232b under a high voltage current may be prevented.

The type of the additional insulating layer 261 is not limited to any particular example. For example, the additional insulating layer 261 may include the same components as those of the insulating layers 251-2 and 252-2. The additional insulating layer 261 and the insulating layers 251-2 and 252-2 is not formed of the same material, and may be formed of different materials. For example, the additional insulating layer 261 may include at least one selected from an epoxy resin, an acrylic resin, ethyl cellulose, and the like, or glass.

Figure 27:
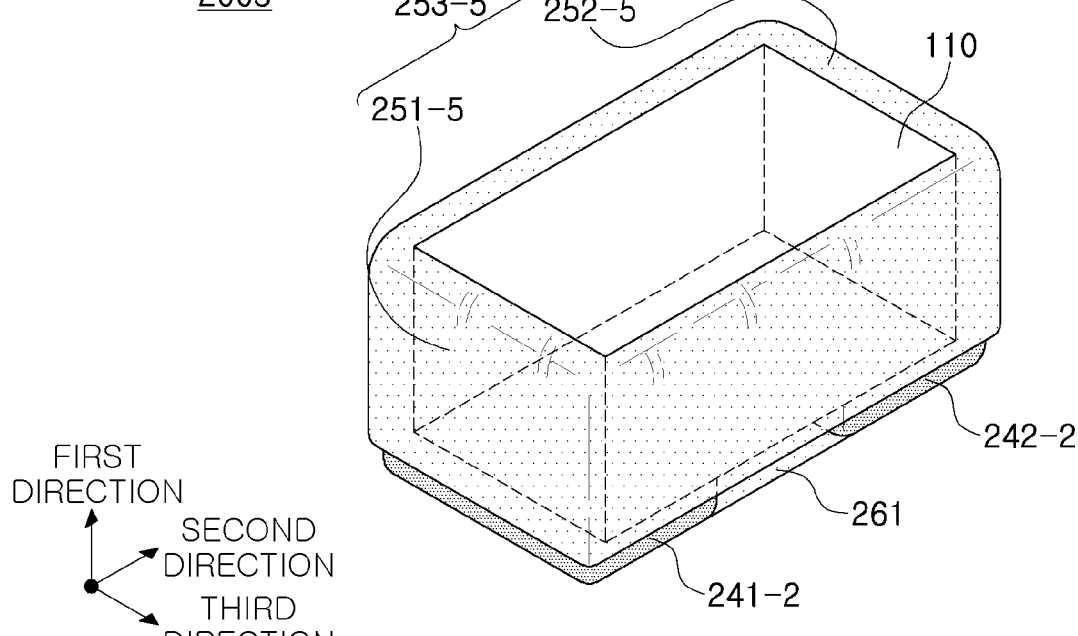
FIG. 27 is a diagram illustrating a modified example of the example in FIG. 25.

FIG. 27 is a diagram illustrating a modified example of the example in FIG. 25. Referring to FIG. 27, in the modified example 2005 of the multilayer electronic component 2004, the first and second insulating layers 251-5 and 252-5 may extend to the fifth and sixth surfaces 5 and 6 and may be connected to each other such that the insulating layers may be connected as an integrated insulating layer 253-5.

Figure 28:
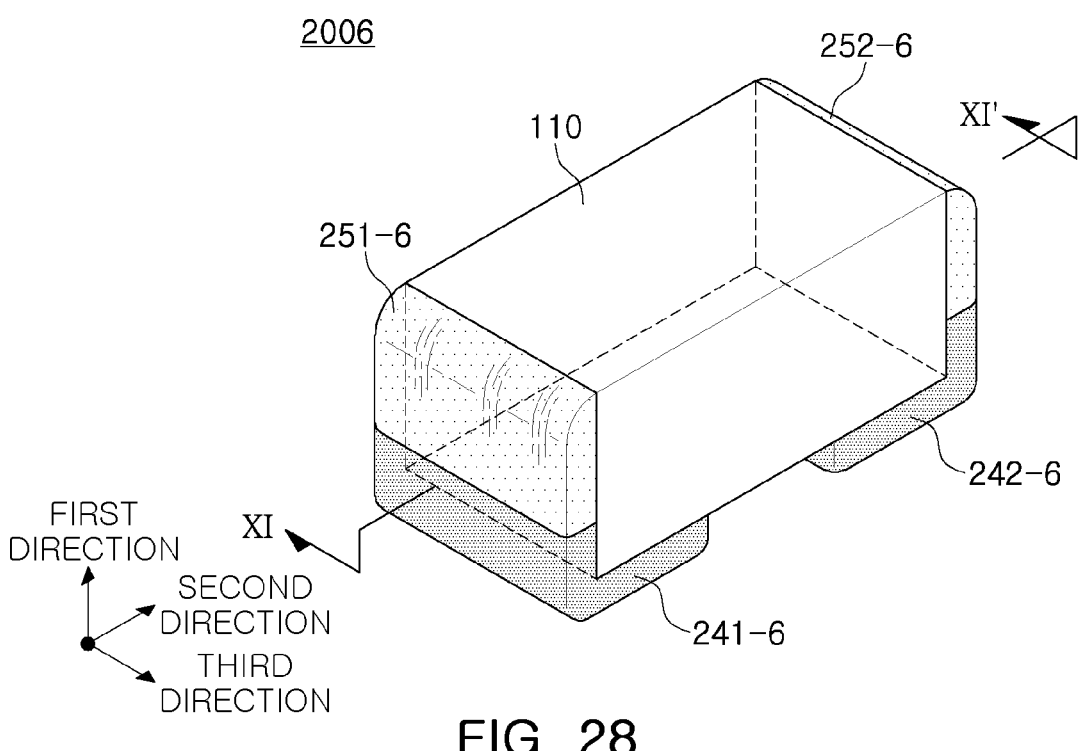
FIG. 28 is a perspective diagram illustrating a multilayer electronic component according to an example embodiment of the present disclosure.
Figure 29:
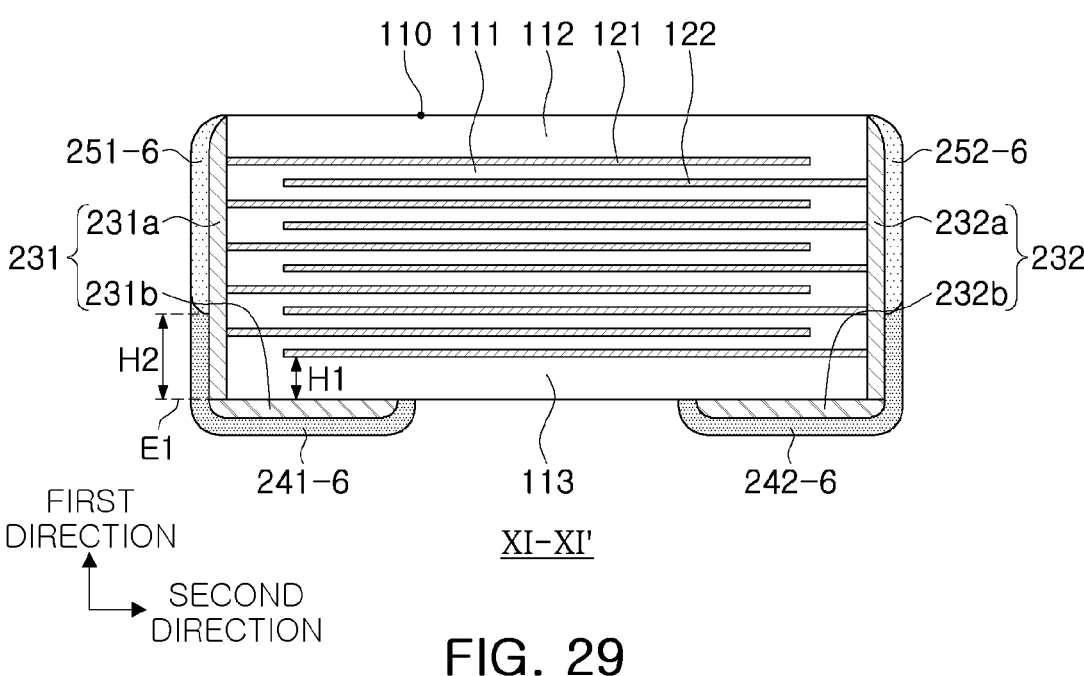
FIG. 29 is a cross-sectional diagram taken along line XI-XI' in FIG. 28.

FIG. 28 is a perspective diagram illustrating a multilayer electronic component 2006 according to an example embodiment. FIG. 29 is a cross-sectional diagram taken along line XI-XI' in FIG. 28.

Referring to FIGS. 28 and 29, the multilayer electronic component 2006 according to an example embodiment may include a first insulating layer 251-6 disposed on a first connection electrode 231a and a second insulating layer 252-6 disposed on a second connection electrode 232a. When an average distance in the first direction from the first surface 1 to an internal electrode disposed most adjacent (closest) to the first surface 1 among the first and second internal electrodes 121 and 122 is defined as H1, and an average distance in the first direction from an extension line of the first surface 1 to ends of the first and second plating layers 241-6 and 242-6 disposed on the first and second connection electrodes 231a and 232a is defined as H2, H1<H2 may be satisfied. Accordingly, the area in contact with the solder during mounting may increase, thereby improving cohesion strength. In some embodiments, an average distance in the first direction from an extension line of the first surface 1 to an end of the first plating layer 241-6 disposed on the first connection electrode 231a or to an end of the second plating layer 242-6 disposed on the second connection electrode 232a is defined as H2.

More preferably, when the average size of the body 110 in the first direction is defined as T, H2<T/2 may be satisfied. That is, H1<H2<T/2 may be satisfied, which may be because the effect of improving moisture resistance reliability by an insulating layer may degrade when H2 is T/2 or more.

Figure 30:
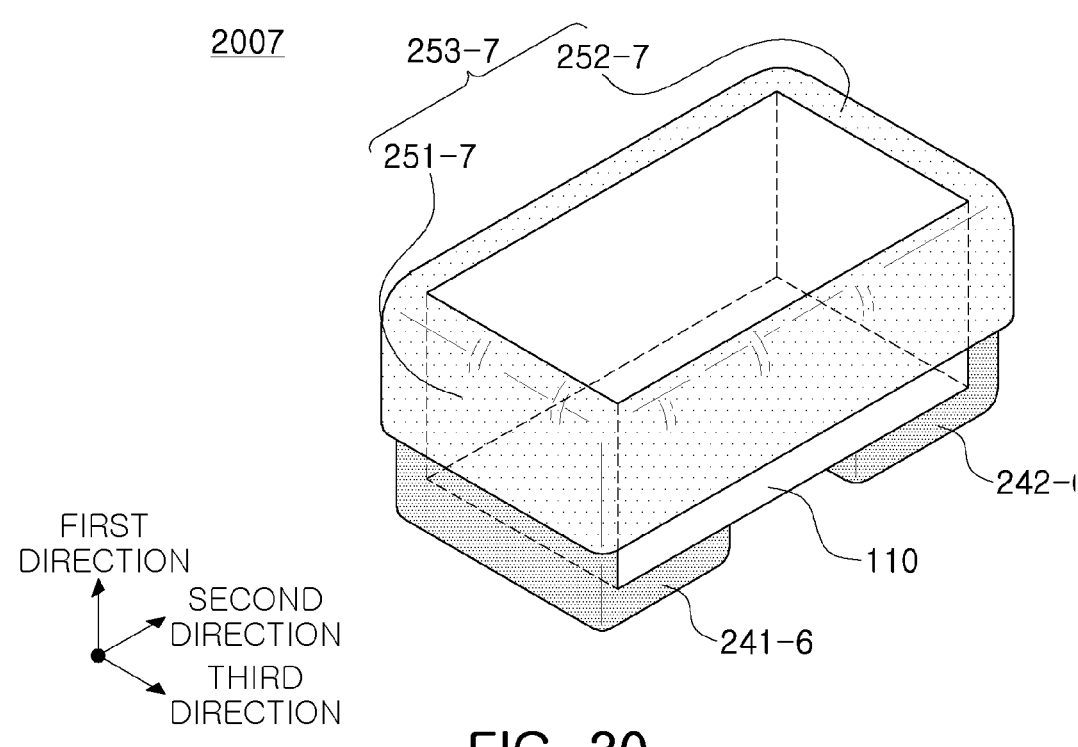
FIG. 30 is a diagram illustrating a modified example of the example in FIG. 28.

FIG. 30 is a diagram illustrating a modified example of the example in FIG. 28. Referring to FIG. 30, in the modified example 2007 of the multilayer electronic component 2006, the first and second insulating layers 251-7 and 252-7 may extend to the fifth and sixth surfaces 5 and 6 and may be connected to each other such that the insulating layers may be connected as an integrated insulating layer 253-7.

Figure 31:
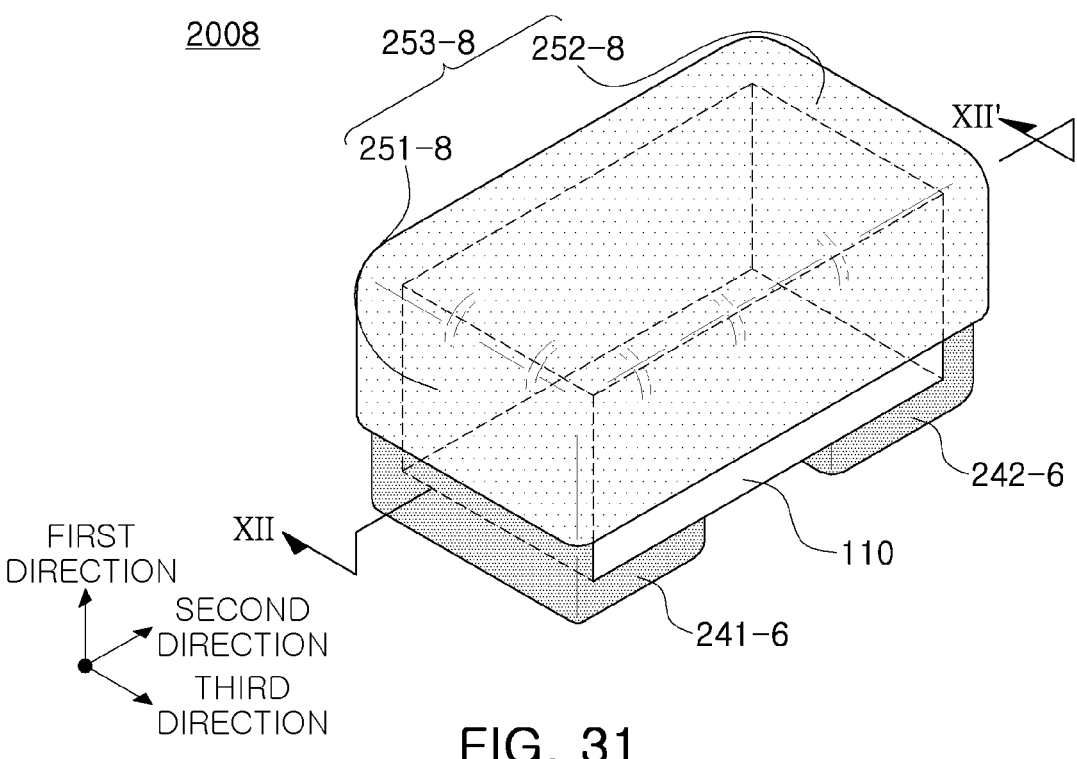
FIG. 31 is a perspective diagram illustrating a multilayer electronic component according to an example embodiment of the present disclosure.
Figure 32:
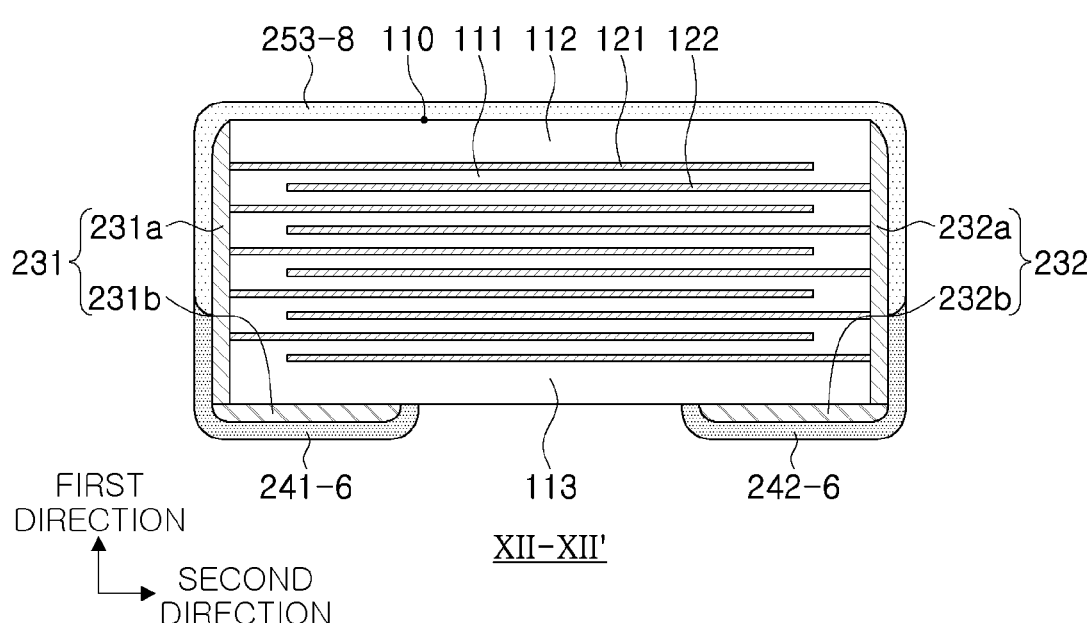
FIG. 32 is a cross-sectional diagram taken along line XII-XII' in FIG. 31.

FIG. 31 is a perspective diagram illustrating a multilayer electronic component 2008 according to an example embodiment. FIG. 32 is a cross-sectional diagram taken along line XII-XII' in FIG. 31.

In the multilayer electronic component 2008 in an example embodiment, the first and second insulating layers 251-8 and 252-8 may extend to the second, fifth and sixth surfaces 2, 5 and 6 and may be connected to each other such that the insulating layers may be connected as an integrated insulating layer 253-8. As illustrated in FIG. 30, the insulating layer 253-8 may cover an entirety of the second surface, and the fifth and sixth surfaces may partially cover the second surface.

Figure 33:
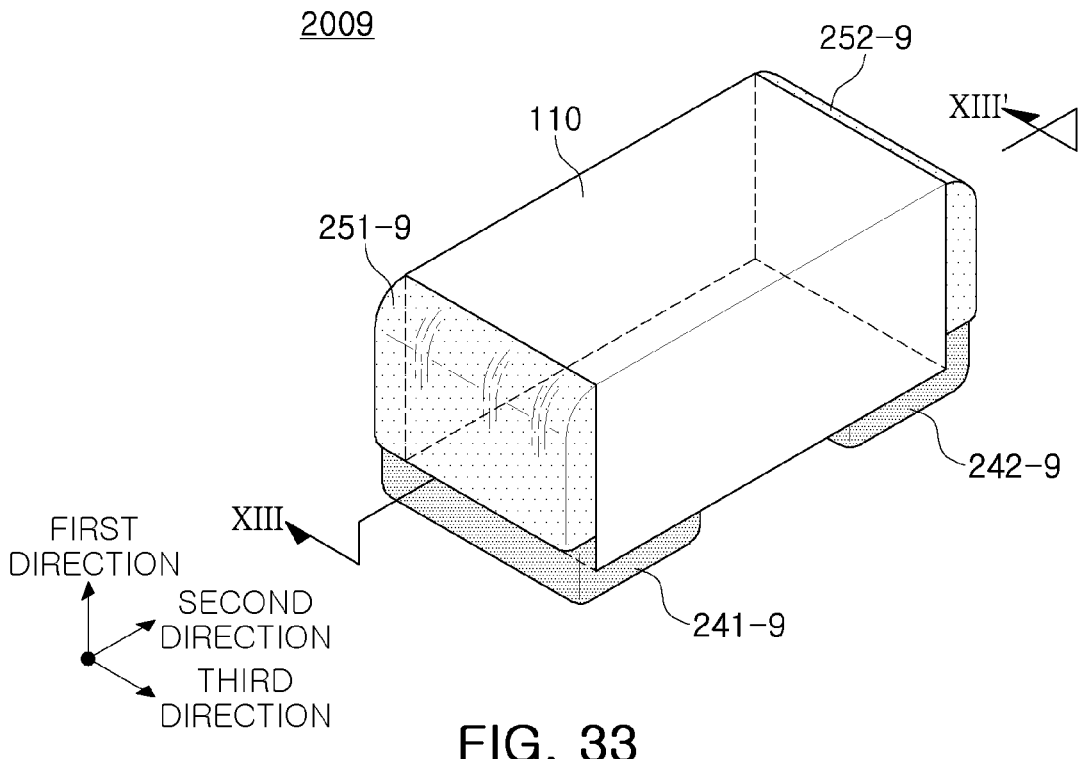
FIG. 33 is a perspective diagram illustrating a multilayer electronic component according to an example embodiment of the present disclosure.
Figure 34:
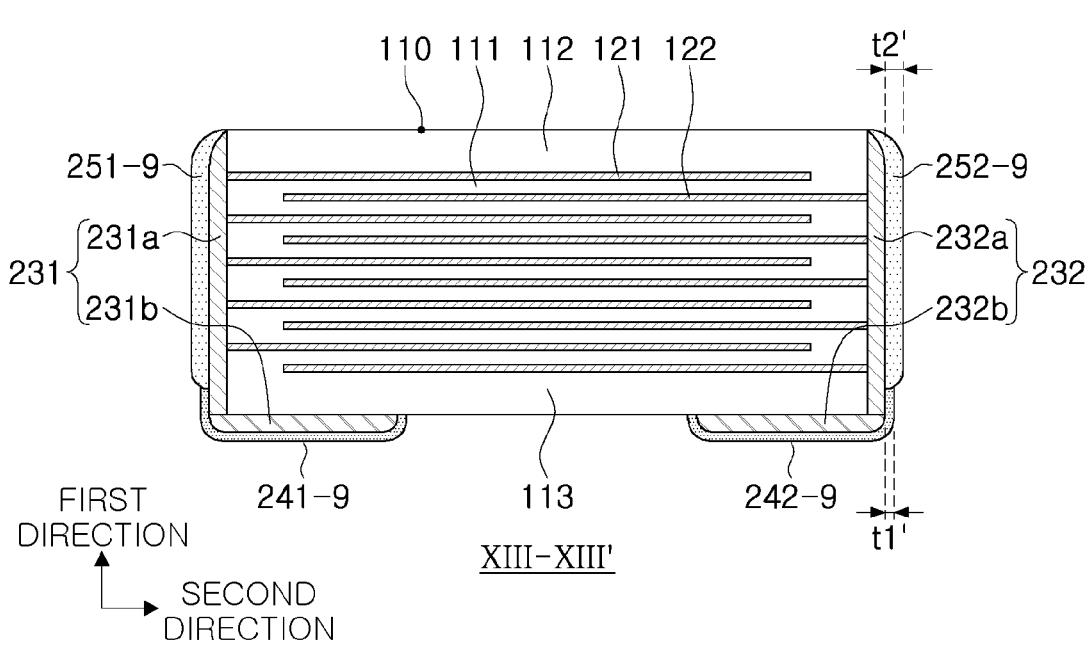
FIG. 34 is a cross-sectional diagram taken along line XIII-XIII' in FIG. 33.

FIG. 33 is a perspective diagram illustrating a multilayer electronic component 2009 according to an example embodiment. FIG. 34 is a cross-sectional diagram taken along line XIII-XIII' in FIG. 33.

Referring to FIGS. 33 and 34, an average thickness t1 of the first and second plating layers 241-9 and 242-9 of the multilayer electronic component 2009 in an example embodiment may be less than an average thickness t2 of the first and second insulating layers 251-9 and 252-9.

In an example embodiment, the average thickness t1 of the first and second plating layers 241-9 and 242-9 may be reduced to be less than the average thickness t2 of the first and second insulating layers 251-9 and 252-9 such that the contact area between the plating layer and the insulating layer may be reduced. Accordingly, delamination may be prevented and cohesion strength of the multilayer electronic component 2009 with the substrate 180 may improve.

The average thickness t1 of the first and second plating layers 241-9 and 242-9 may be an average value of thicknesses measured at five points, spaced apart by an equal distance, on the first and second plating layers 241-9 and 242-9 disposed on the first and second connection electrodes 231a and 232a, respectively, or on the first and second band electrodes 231b and 232b, respectively. The average thickness t2 of the insulating layers 251-9 and 252-9 may be an average value of thicknesses measured at five points, spaced apart by an equal distance, on the first and second connection electrodes 231a and 232a. For example, the measurements may be taken by scanning the cross-section of the body 110 using a scanning electron microscope (SEM). Other methods and/or tools appreciated by one of ordinary skill in the art, even if not described in the present disclosure, may also be used.

Figure 35:
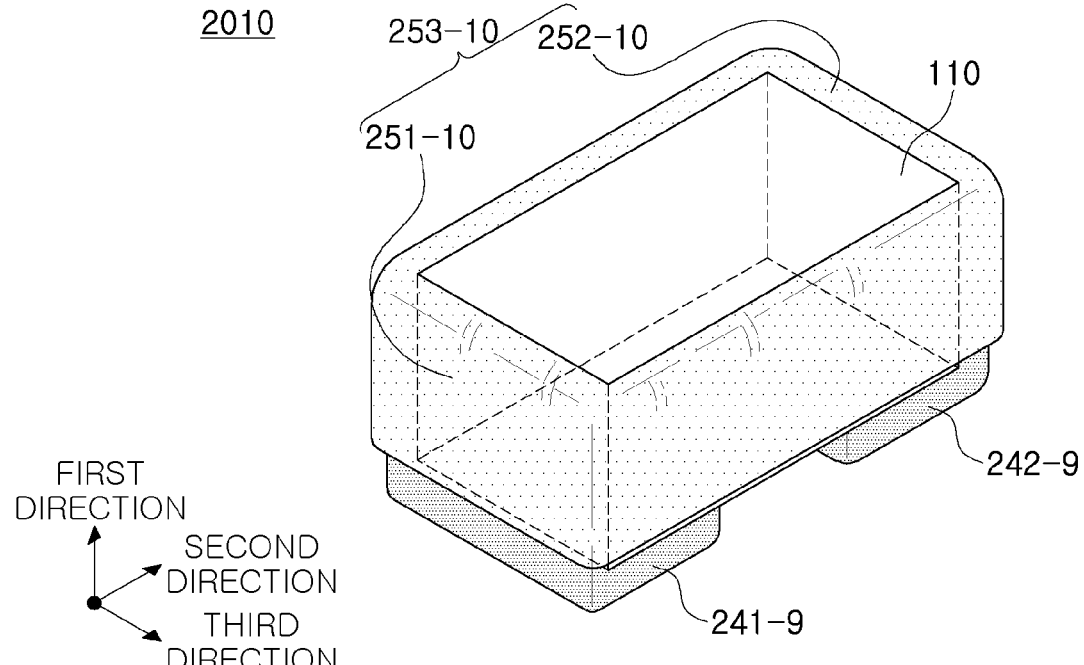
FIG. 35 is a diagram illustrating a modified example of the example in FIG. 33.

FIG. 35 is a diagram illustrating a modified example of the example in FIG. 33. Referring to FIG. 35, in the modified example 2010 of the multilayer electronic component 2009 in an example embodiment, the first and second insulating layers 251-10 and 252-10 may extend to the fifth and sixth surfaces 5 and 6 and may be connected to each other, such that the insulating layers may be connected as an integrated insulating layer 253-10.

Figures 36, 37:
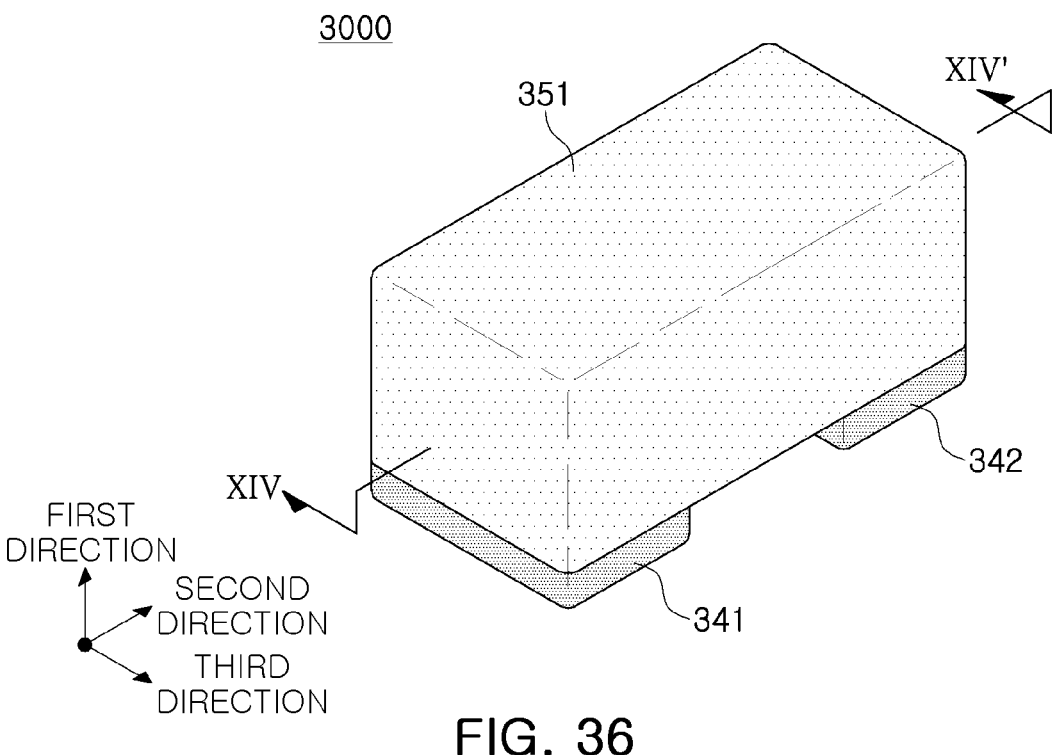
FIG. 36 is a perspective diagram illustrating a multilayer electronic component according to an example embodiment of the present disclosure.
FIG. 37 is a cross-sectional diagram taken along line XIV-XIV' in FIG. 36.
Figure 38:
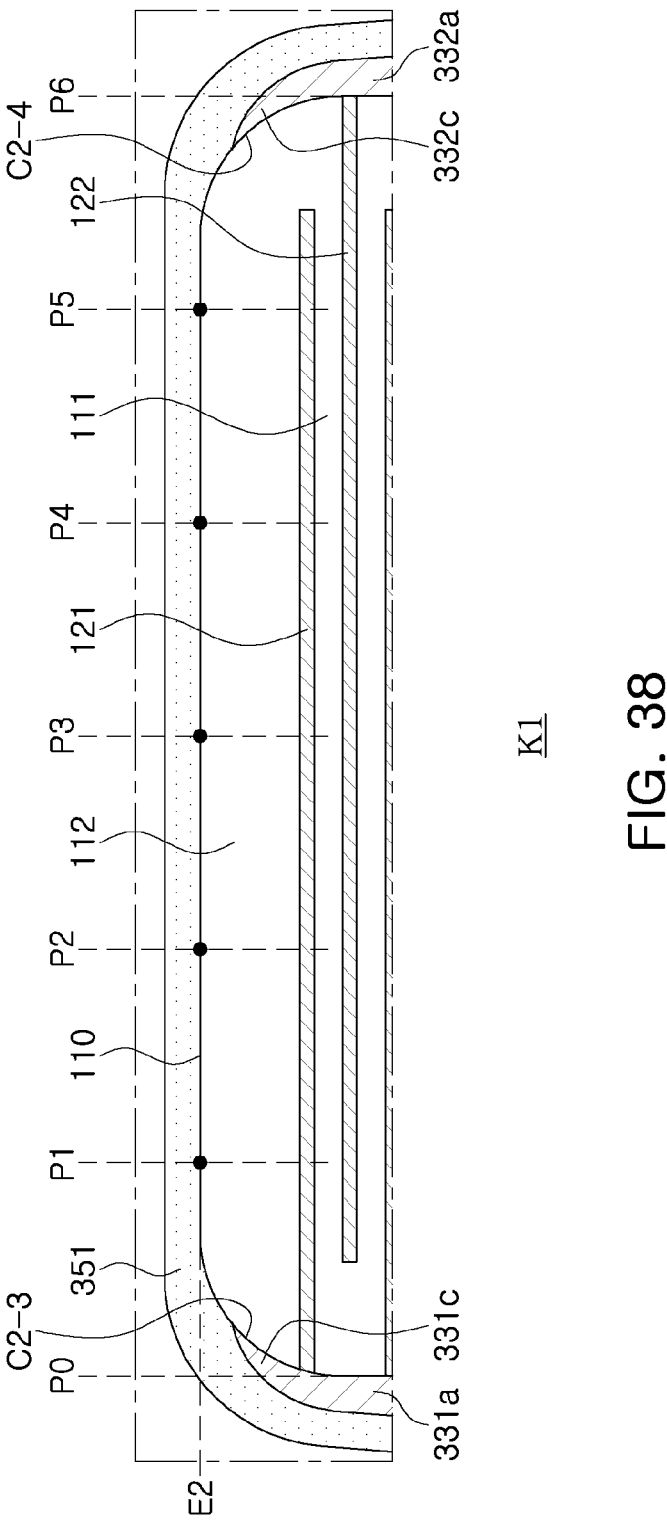
FIG. 38 is an enlarged diagram illustrating region K1 in FIG. 36.

FIG. 36 is a perspective diagram illustrating a multilayer electronic component 3000 according to an example embodiment. FIG. 37 is a cross-sectional diagram taken along line XIV-XIV' in FIG. 36. FIG. 38 is an enlarged diagram illustrating region K1 in FIG. 36.

Referring to FIGS. 36 to 42, in the multilayer electronic component 3000 in an example embodiment may include a dielectric layer 111 and first and second internal electrodes 121 and 122 alternately disposed with the dielectric layer interposed therebetween and may further include a body 110 including first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction; a first external electrode 331 including a first connection portion 331a disposed on the third surface of the body, a first band portion 331b extending from the first connection portion to a portion of the first surface, and a first corner portion 331c extending from the first connection portion to a corner connecting the second and third surfaces of the body to each other; a second external electrode 332 including second connection portion 332a disposed on the fourth surface of the body, a second band portion 332b extending from the second connection portion to a portion of the first surface, and a second corner portion 332c extending from the second connection portion to a corner connecting the second and fourth surfaces of the body to each other; an insulating layer 351 disposed on the first and second connection portions 331a and 332a and covering the second surface and the first and second corner portions; a first plating layer 341 disposed on the first band portion; and a second plating layer 342 disposed on the second band portion, wherein the first and second insulating layers may include a first glass, glass, and a first oxide, an oxide including aluminum (Al).

In an example embodiment, when an average distance in the second direction from an extension line of the third surface to an end of the first corner portion 331c is defined as B3, an average distance in the second direction from an extension line of the fourth surface to an end of the second corner portion 332c is defined as B4, the average size of the region in which the third surface and the second internal electrode are spaced apart from each other, taken in the second direction, is defined as G1, and an average size of the region in which the fourth surface and the first internal electrode are spaced apart from each other, taken in the second direction, is defined as G2, B3≤G1 and B4≤G2 may be satisfied. Accordingly, the volume occupied by the external electrodes 331 and 332 may be reduced, such that capacitance per unit volume of the multilayer electronic component 3000 may be increased.

In this case, when the average distance in the second direction from an extension line of the third surface to an end of the first band portion 331b is defined as B1, and the average size from the extension line of the fourth surface to an end of the second band portion 332b is defined as B2, B1≥G1 and B3≥G2 may be satisfied. Accordingly, the area in contact with the solder during mounting may increase, such that cohesion strength may improve.

The multilayer electronic component 3000 according to an example embodiment may include a dielectric layer 111 and first and second internal electrodes 121 and 122 alternately disposed with the dielectric layer interposed therebetween, and may further include a body 110 including first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction. The body 110 of the multilayer electronic component 3000 may have the same configuration as that of the body of the multilayer electronic component 1000 other than the configuration in which the ends of the first or second surface of the body has a reduced shape.

The external electrodes 331 and 332 may be disposed on the third surface 3 and the fourth surface 4 of the body 110. The external electrodes 331 and 332 may include the first and second external electrodes 331 and 332 disposed on the third and fourth surfaces 3 and 4 of the body 110, respectively, and connected to the first and second internal electrodes 121 and 122, respectively.

The external electrodes 331 and 332 may include a first external electrode 331 including a first connection portion 331a disposed on a third surface, a first band portion 331b extending from the first connection portion to a portion of the first surface, and a first corner portion 331c extending from the first connection portion to a corner connecting the second surface and the third surface to each other, and a second external electrode 132 including a second connection portion 332a disposed on the fourth surface, a second band portion 332b extending from the second connection portion to a portion of the first surface, and a second corner portion 332c extending from the second connection portion to a corner connecting the second and fourth surfaces to each other. The first connection portion 331a may be connected to the first internal electrode 121 on the third surface, and the second connection portion 332a may be connected to the second internal electrode 122 on the fourth surface.

In an example embodiment, the first and second connection portions 331a and 332a may be spaced apart from the fifth and sixth surfaces. Accordingly, the volume of the external electrodes 331 and 332 may be reduced, thereby reducing the size of the multilayer electronic component 3000.

As the margin region in which the internal electrodes 121 and 122 is not disposed overlaps the dielectric layer 111, a step difference may be formed due to the thickness of the internal electrodes 121 and 122, such that the corner connecting the first surface to the third to fifth surfaces and/or the corner connecting the second surface to the third to fifth surfaces may have a reduced shape in a direction of a center of the body 110 in the first direction with respect to the first surface or the second surface. Alternatively, the corner connecting the first surface 1 to the third to sixth surfaces 3, 4, 5, 6 and/or the corner connecting the second surface 2 to the third to sixth surfaces 3, 4, 5, and 6 may have a reduced shape in a direction of a center of the body 110 in the first direction with respect to the first surface or the second surface. Alternatively, as a separate process is performed to round the corners connecting the surfaces of the body 110 to prevent chipping defects, the corners connecting the first and third to sixth surfaces and/or the corner connecting the second surface and the third to sixth surfaces may have a rounded shape.

The corner may include a 1-3 corner C1-3 connecting the first surface and the third surface, a 1-4 corner C1-4 connecting the first surface and the fourth surface, a 2-3 corner C2-3 connecting the second surface and the third surface, and a 2-4 corner C2-4 connecting the second surface and the fourth surface. Also, the corners may include a 1-5 corner connecting the first and fifth surfaces, a 1-6 corner connecting the first and sixth surfaces, a 2-5 corner connecting the second and fifth surfaces, and a 2-6 corner connecting the second surface and the sixth surface. However, to prevent the step difference due to the internal electrodes 121 and 122, after lamination, when the internal electrodes may be cut to be exposed to the fifth and sixth surfaces 5 and 6 of the body, and a single dielectric layer or two or more dielectric layers may be laminated on both side surfaces of the capacitance formation portion Ac in the third direction (the width direction) to form the margin portions 114 and 115, the portion connecting the first surface to the fifth and sixth surfaces and the portion connecting the second surface to the fifth and sixth surfaces may not have a reduced shape.

The first to sixth surfaces of the body 110 may be almost flat surfaces, and non-flat regions may be viewed as corners. Also, a region disposed on a corner among the external electrodes 131 and 132 may be viewed as a corner portion.

In this regard, the first and second corner portions 331c and 332c may be disposed below the extension line E2 of the second surface, and the first and second corner portions 331c and 332c may be spaced apart from the second surface. That is, since the external electrodes 331 and 332 are not disposed on the second surface, the volume occupied by the external electrodes 331 and 332 may be further reduced, thereby increasing capacitance per unit volume of the multilayer electronic component 3000. Also, the first corner portion 331c may be disposed on a portion of a 2-3 corner C2-3 connecting the third surface and the second surface, and the second corner portion 332c may be formed on a portion of the 2-4 corner C2-4 connecting the fourth surface and the second surface.

The extension line E2 of the second surface may be defined as below.

Seven linear lines P0, P1, P2, P3, P4, P5, P6, and P7 spaced apart by an equal distance in the thickness direction may be drawn in the length direction from the third surface to the fourth surface on the length-thickness cross-section (L-T cross-section) in a center in the width direction, and the line crossing the point at which P2 meets the second surface and the point at which P4 meets the second surface may be defined as the extension line E2 of the second surface.

The external electrodes 331 and 332 may be formed using any having electrical conductivity, such as metal, and a specific material may be determined in consideration of electrical properties and structural stability, and the external electrodes 331 and 332 may have a multilayer structure.

The external electrodes 331 and 332 may be a fired electrode including a conductive metal and glass, or a resin-based electrode including a conductive metal and a resin.

Also, the external electrodes 331 and 332 may have a form in which a plastic electrode and a resin-based electrode may be formed in order on the body. Also, the external electrodes 331 and 332 may be formed by transferring a sheet including the conductive metal to the body or by transferring a sheet including a conductive metal to the fired electrode.

As the conductive metal included in the external electrodes 331 and 332, a material having excellent electrical conductivity may be used, and the material is not limited to any particular example. For example, the conductive metal may be one or more of Cu, Ni, Pd, Ag, Sn, Cr, and alloys thereof. Preferably, the external electrodes 331 and 332 may include at least one of Ni and a Ni alloy, and accordingly, connectivity with the internal electrodes 121 and 122 including Ni may improve.

The insulating layer 351 may be disposed on the first and second connection portions 331*a* and 332*a*.

Since the first and second connection portions 331*a* and 332*a* may be connected to the internal electrodes 121 and 122, the first and second connection portions 331*a* and 332*a* may be paths for permeation of a plating solution in a plating process or moisture permeation during actual use. In the example embodiment, since the insulating layer 351 is disposed on the connection portions 331*a* and 332*a*, permeation of external moisture or a plating solution may be prevented.

The insulating layer 351 may be disposed to be in contact with the first and second plating layers 341 and 342. In this case, the insulating layer 351 may be in contact with the ends of the first and second plating layers 341 and 342 by partially covering the ends, or the first and second plating layers 341 and 342 may be in contact with the ends of the insulating layer 351 by partially covering the ends.

The insulating layer 353 may be disposed on the first and second connection portions 331*a* and 332*a*, and may be disposed to cover the second surface and the first and second corner portions 331*c* and 332*c*. Also, the insulating layer 351 may cover the region in which the ends of the first and second corner portions 331*c* and 332*c* are in contact with the body 110 and may block the moisture permeation path, thereby improving moisture resistance reliability.

The insulating layer 351 may be disposed on the second surface and may extend to the first and second connection portions 331*a* and 332*a*. Also, when the external electrodes 331 and 332 are not disposed on the second surface, the insulating layer may be disposed to entirely cover the second surface. The insulating layer 351 may not necessarily have to be disposed on the second surface, and the insulating layer may not be disposed on a portion or an entirety of the second surface, and the insulating layer may be divided into two regions and the two regions may be disposed on the first and second connection portions 331*a* and 332*a*, respectively. However, even in this case, the insulating layer may be disposed to entirely cover the first and second corner portions 331*c* and 332*c*. When the insulating layer is not disposed on an entirety of the second surface, the insulating layer may be disposed below an extension line of the second surface. Also, the insulating layer is not disposed on the second surface, and may extend from the first and second connection portions 331*a* and 332*a* to the fifth and sixth surfaces and may form an integrated insulating layer.

In an example embodiment, the insulating layer 351 may be disposed to cover portions of the fifth and sixth surfaces and may improve reliability. In this case, portions of the fifth and sixth surfaces not covered by the insulating layer may be exposed.

Further, the insulating layer 351 may be disposed to cover an entirety of the fifth and sixth surfaces, and in this case, the fifth and sixth surfaces may not be exposed, thereby improving moisture resistance reliability.

The insulating layer 351 may prevent the plating layers 341 and 342 from being formed on the external electrodes 331 and 332 on which the insulating layer 351 is disposed, and may improve sealing properties and may reduce permeation of moisture or a plating solution. The components, composition, average thickness, and effects of the insulating layer 351 may be the same as the insulating layers 151, 251, 252, and 253 included in the multilayer electronic components 1000 and 2000 and various embodiments thereof, and accordingly, the descriptions thereof will not be provided.

The first and second plating layers 341 and 342 may be disposed on the first and second band portions 331*b* and 332*b*, respectively. The plating layers 341 and 342 may improve mounting properties, and as the plating layers 341 and 342 are disposed on the band portions 331*b* and 332*b*, the mounting space may be reduced, and permeation of a plating solution into the internal electrode may be reduced, thereby improving reliability. One end of the first and second plating layers 341 and 342 may be in contact with the first surface, and the other end may be in contact with the insulating layer 351.

The type of the plating layers 341 and 342 is not limited to any particular example, and may be a plating layer including at least one of Cu, Ni, Sn, Ag, Au, Pd, and alloys thereof, and may include a plurality of layers.

For example, the plating layers 341 and 342 may be a Ni plating layer or a Sn plating layer, and a Ni plating layer and the Sn plating layer and the Ni plating layer may be formed in order on the first and second band portions 331*b* and 332*b*.

In an example embodiment, the insulating layer 351 may be disposed to be in direct contact with the first and second external electrodes 331 and 332, and the first and second external electrodes 331 and 332 may include a conductive metal and glass. Accordingly, since the plating layers 341 and 342 may not be disposed in the region in which the insulating layer 351 is disposed among the external surfaces of the first and second external electrodes 331 and 332, erosion of the external electrodes caused by the plating solution may be effectively prevented.

In an example embodiment, the insulating layer 351 may be disposed to be in direct contact with the first and second external electrodes 331 and 332, and the first and second external electrodes 331 and 332 may include a conductive metal and glass. Accordingly, since the plating layers 341 and 342 may not be disposed in the region in which the insulating layer 351 is disposed among the external surfaces of the first and second external electrodes 331 and 332, erosion of the external electrodes caused by the plating solution may be effectively prevented.

In an example embodiment, the first plating layer 341 may be disposed to cover an end of the insulating layer 351 disposed on the first external electrode 331, and the second plating layer 342 may be disposed to cover an end of the insulating layer 351 disposed on the second external electrode 332. Accordingly, bonding force between the insulating layer 351 and the plating layers 341 and 342 may be strengthened, such that reliability of the multilayer electronic component 3000 may improve. Also, by first forming the insulating layer 351 before forming the plating layers 241 and 242 on the external electrodes 331 and 332, permeation of the plating solution in the process of forming a plating layer may be reliably prevented. As the insulating layer is formed before the plating layer, the plating layers 341 and 342 may have a shape covering the end of the insulating layer 351.

In an example embodiment, the insulating layer 351 may be disposed to cover the end of the first plating layer 341 disposed on the first external electrode 331, and the insulating layer 352 may be disposed to cover an end of the second plating layer 342 disposed on the second external electrode 332. Accordingly, bonding force between the insulating layer 351 and the plating layers 341 and 342 may be strengthened, such that reliability of the multilayer electronic component 3000 may improve.

In an example embodiment, the first and second plating layers 341 and 342 may be extended to partially cover the first and second connection portions 331$a$ and 332$a$, respectively. When an average distance in the first direction from the first surface 1 to an internal electrode disposed most adjacent (closest) to the first surface 1 among the internal electrodes 121 and 122 is defined as H1, and an average distance in the first direction from an extension line of the first surface 1 to ends of the plating layers 341 and 342 disposed on the first and second connection portions 331$a$ and 332$a$ is defined as H2, H1>H2 may be satisfied. Accordingly, permeation of the plating solution into the internal electrode during the plating process may be prevented, thereby improving reliability. In some embodiments, an average distance in the first direction from an extension line of the first surface 1 to an end of the first plating layer 341 disposed on the first connection portion 331$a$ or to an end of the second plating layer 342 disposed on the second connection portion 332$a$ is defined as H2.

In an example embodiment, when an average distance in the first direction from the first surface 1 to an internal electrode disposed most adjacent (closest) to the first surface 1 among the internal electrodes 121 and 122 is defined as H1, and an average distance in the first direction from an extension line of the first surface 1 to ends of the plating layers 341 and 342 disposed on the first and second connection portions 331$a$ and 332$a$ is defined as H2, H1<H2 may be satisfied. Accordingly, the area in contact with the solder during mounting may increase, thereby improving cohesion strength. More preferably, when the average size of the body 110 in the first direction is defined as T, H2<T/2 may be satisfied. That is, H1<H2<T/2 may be satisfied, which may be because, when H2 is T/2 or more, the effect of improving moisture resistance reliability by the insulating layer may degrade.

In an example embodiment, the first and second plating layers 341 and 342 may be disposed below an extension line of the first surface. Accordingly, the height of the solder may be reduced during mounting and the mounting space may be reduced. Also, the insulating layer 351 may extend to a region below the extension line of the first surface and may be in contact with the first and second plating layers 341 and 342.

In an example embodiment, the average size of the body in the second direction is defined as L, the average distance in the second direction from an extension line of the third surface to an end of the first band portion is defined as B1, the average size of the body in the second direction from an extension line of the fourth surface to an end of the second band portion is defined as B2, 0.2≤B1/L≤0.4 and 0.2≤B2/L≤0.4 may be satisfied.

When B1/L and B2/L are less than 0.2, it may be difficult to secure sufficient fixing strength. When B2/L is greater than 0.4, a leakage current may be generated between the first band portion 331$b$ and the second band portion 332$b$ under a high-voltage current, and the first band portion 331$b$ and the second band portion 332$b$ may be electrically connected due to plating spread.

In an example embodiment, an additional insulating layer disposed on the first surface and disposed between the first band portion 331$b$ and the second band portion 332$b$ may be further included. Accordingly, a leakage current which may occur between the first band portion 331$b$ and the second band portion 332$b$ under a high voltage current may be prevented.

The type of the additional insulating layer is not limited to any particular example. For example, the additional insulating layer may include the same component as those of the insulating layer 351. The additional insulating layer and the insulating layer 351 is not formed of the same material, but may be formed of different materials. For example, the additional insulating layer may include one or more selected from epoxy resin, acrylic resin, ethyl cellulose, and the like, or may include glass.

In an example embodiment, when the average distance in the second direction from an extension line of the third surface to an end of the first band portion is defined as B1, and the average distance in the second direction from an extension line of the fourth surface to an end of the second band portion is defined as B2, B3<B1 and B4<B2 may be satisfied. The average length B1 of the first band portion 331$b$ may be longer than the average length B3 of the first corner portion 331$c$, and the average length of the second band portion 332$b$ may be longer than the average length B4 of the second corner portion 332$c$. Accordingly, the region in contact with the solder during mounting may increase, thereby improving cohesion strength.

In greater detail, when the average distance in the second direction from an extension line of the third surface 3 to an end of the first band portion 331$b$ is defined as B1, the average distance in the second direction from an extension line of the fourth surface 4 to an end of the second band portion 332$b$ is defined as B2, the average distance in the second direction from an extension line of the third surface 3 to an end of the first corner portion 331$c$ is defined as B3, and the average distance in the second direction from an extension line of the fourth surface 4 to an end of the second corner portion 332$c$ is defined as B4, B3<B1 and B4<B2 may be satisfied.

In an example embodiment, an average thickness of the first and second plating layers 341 and 342 may be less than an average thickness of the insulating layer 351.

The insulating layer 351 may prevent permeation of external moisture or the plating solution, but connectivity with the plating layers 341 and 342 may be relatively weak, which may cause delamination of the plating layer. When the plating layer is delaminated, cohesion strength with the substrate may be reduced. Here, the delamination of the plating layer may refer to separation of a portion of the plating layer or physical separation of the plating layer from the external electrodes 331 and 332. Since the connection between the plated layer and the insulating layer is relatively weak, it may be highly likely that a gap between the insulating layer and the plated layer may be widened or foreign substances may enter, and the possibility of delamination may increase due to vulnerability to external impacts.

In an example embodiment, by reducing the average thickness of the plated layer to be less than the average thickness of the insulating layer, the contact area between the plated layer and the insulating layer may be reduced, thereby preventing delamination and improving cohesion strength of the multilayer electronic component 3000 with the components.

The size of the multilayer electronic component 3000 is not limited to any particular example.

However, to obtain both miniaturization and high capacitance, it may be necessary to increase the number of laminated layers by reducing the thicknesses of the dielectric layer and the internal electrode, and accordingly, in the multilayer electronic component 3000 having a size of 1005 (length×width, 1.0 mm×0.5 mm) or less, the effect of improving reliability and capacitance per unit volume in the example embodiment may be distinct.

Accordingly, when manufacturing errors, external electrode sizes, or the like are considered, and when the length of the multilayer electronic component 3000 is 1.1 mm or less and the width is 0.55 mm or less, the effect of improving reliability in the example embodiment may be distinct. Here, the length of the multilayer electronic component 3000 may refer to the maximum size of the multilayer electronic component 3000 in the second direction, and the width of the multilayer electronic component 3000 may refer to the maximum size of the multilayer electronic component 3000 in the third direction. For example, the measurements may be taken by characterizing the multilayer electronic component 3000 using an optical microscope. Other methods and/or tools appreciated by one of ordinary skill in the art, even if not described in the present disclosure, may also be used.

According to the aforementioned example embodiments, by disposing an insulating layer on the connection portion of the external electrode and a plating layer on the band portion of the external electrode, capacitance per unit volume of the multilayer electronic component may improve and reliability may improve.

Also, a mounting space of the multilayer electronic component may be reduced.

Also, as in the insulating layer includes glass and an oxide including aluminum (Al), moisture resistance reliability and acid resistance against a plating solution may improve, and cracks may be prevented.

While example embodiments have been illustrated and described above, it will be apparent to those skilled in the art that modifications and variations could be made without departing from the scope in the example embodiment as defined by the appended claims.

What is claimed is:

1. A multilayer electronic component, comprising:
a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
a first external electrode including a first connection portion disposed on the third surface, and a first band portion extending from the first connection portion to a portion of the first surface;
a second external electrode including a second connection portion disposed on the fourth surface, and a second band portion extending from the second connection portion to a portion of the first surface;
an insulating layer disposed on the first and second connection portions and covering the second surface, the insulating layer including a first glass and a first oxide including aluminum (Al);
a first plating layer disposed on the first band portion; and
a second plating layer disposed on the second band portion,
wherein the first glass comprises one or both of calcium (Ca) and magnesium (Mg).

2. The multilayer electronic component of claim 1, wherein the first glass includes at least one of an anorthite-based crystal phase and a diopside-based crystal phase.

3. The multilayer electronic component of claim 1, wherein the first oxide including aluminum (Al) is $Al_2O_3$.

4. The multilayer electronic component of claim 1, wherein a content of aluminum (Al) present in the insulating layer is 40 at % or more and 60 at % or less based on a total content of materials present in the insulating layer.

5. The multilayer electronic component of claim 1, wherein an average thickness of the insulating layer is 500 nm or more and 1000 nm or less.

6. The multilayer electronic component of claim 1, wherein, an average distance from the first surface to an internal electrode closest to the first surface in the first direction among the first and second internal electrodes is defined as H1, an average distance in the first direction from an extension line of the first surface to an end of the first plating layer disposed on the first connection portion or to an end of the second plating layer disposed on the second connection portion is defined as H2, and H1<H2 is satisfied.

7. The multilayer electronic component of claim 6, wherein, an average size of the body in the first direction is defined as T, and H2<T/2 is satisfied.

8. The multilayer electronic component of claim 1, wherein the first and second plating layers are disposed below an extension line of the first surface.

9. The multilayer electronic component of claim 1, wherein, an average size of the body in the second direction is defined as L, an average distance in the second direction from an extension line of the third surface to an end of the first band portion is defined as B1, an average distance in the second direction from an extension line of the fourth surface to an end of the second band portion is defined as B2, and 0.2≤B1/L≤0.4 and 0.2≤B2/L≤0.4 are satisfied.

10. The multilayer electronic component of claim 1, further comprising:
an additional insulating layer disposed on the first surface and disposed between the first band portion and the second band portion.

11. The multilayer electronic component of claim 1, wherein a maximum size of the multilayer electronic component in the second direction is 1.1 mm or less, and a maximum size of the multilayer electronic component in the third direction is 0.55 mm or less.

12. The multilayer electronic component of claim 1, wherein an average thickness of the dielectric layer is 0.35 μm or less.

13. The multilayer electronic component of claim 1, wherein an average thickness of the first and second internal electrodes is 0.35 μm or less.

14. The multilayer electronic component of claim 1, wherein the body comprises:
a capacitance formation portion including the first and second internal electrodes alternately disposed with the dielectric layer interposed therebetween and a cover portion disposed on both end surfaces of the capacitance formation portion in the first direction,
wherein an average size of the cover portion in the first direction is 15 μm or less.

15. The multilayer electronic component of claim 1, wherein an average thickness of the first and second plating layers is less than an average thickness of the insulating layer.

16. The multilayer electronic component of claim 1, wherein the first plating layer is disposed to cover one end close to the first surface of the insulating layer, and the second plating layer is disposed to cover an other end close to the first surface of the insulating layer.

17. The multilayer electronic component of claim 1, wherein the insulating layer is disposed to cover one end disposed on the first external electrode of the first plating layer and an other end disposed on the second external electrode of the second plating layer.

18. The multilayer electronic component of claim 1, wherein the first external electrode further includes a first side band portion extending from the first connection portion to portions of the fifth and sixth surfaces and the second external electrode further includes a second side band portion extending from the second connection portion to portions of the fifth and sixth surfaces, and wherein sizes of the first and second side band portions in the second direction gradually increase toward the first surface.

19. The multilayer electronic component of claim 1, wherein the first and second external electrodes are spaced apart from the fifth and sixth surfaces.

20. The multilayer electronic component of claim 1, wherein the insulating layer is disposed to extend from the first and second connection portions on to the fifth and sixth surfaces.

21. The multilayer electronic component of claim 1, wherein the body further includes a 1-3 corner connecting the first surface to the third surface, a 1-4 corner connecting the first surface to the fourth surface, a 2-3 corner connecting the second surface to the third surface, and a 2-4 corner connecting the second surface to the fourth surface, wherein the 1-3 corner and the 2-3 corner have a form reducing in a direction of a center of the body taken in the first direction toward the third surface, and the 1-4 corner and the 2-4 corner have a form reducing in a direction of the center of the body taken in the first direction toward the fourth surface, and wherein the first external electrode further includes a corner portion disposed on the 1-3 corner and a first corner portion extending from the first connection portion to the 2-3 corner, and the second external electrode further includes a corner portion disposed on the 1-4 corner and a second corner portion extending from the second connection portion to the 2-4 corner.

22. The multilayer electronic component of claim 21, wherein B3≤G1 and B4≤G2 are satisfied, in which B3 is an average distance in the second direction from an extension line of the third surface to an end of the first corner portion, B4 is an average distance in the second direction from an extension line of the fourth surface to an end of the second corner portion, G1 is an average size of a region in which the third surface and the second internal electrode are spaced apart from each other, taken in the second direction, and G2 is an average size of a region in which the fourth surface and the first internal electrode are spaced apart from each other, taken in the second direction.

23. The multilayer electronic component of claim 1, wherein the first external electrode includes a first connection electrode disposed on the third surface and a first band electrode disposed on the first surface and connected to the first connection electrode, and wherein the second external electrode includes a second connection electrode disposed on the fourth surface and a second band electrode disposed on the first surface and connected to the second connection electrode.

24. The multilayer electronic component of claim 23, wherein the first and second connection electrodes are spaced apart from the fifth and sixth surfaces.

25. The multilayer electronic component of claim 23, wherein the first and second connection electrodes are spaced apart from the first and second surfaces.

26. The multilayer electronic component of claim 23, wherein the first external electrode further includes a third band electrode disposed on the second surface and connected to the first connection electrode, and the second external electrode further includes a fourth band electrode disposed on the second surface and connected to the second connection electrode.

27. The multilayer electronic component of claim 23, wherein the first connection electrode and the second connection electrode include the same metal as a metal included in the first and second internal electrodes.

28. The multilayer electronic component of claim 23, wherein the first connection electrode and the second connection electrode include fired electrodes including a conductive metal and a glass.

29. The multilayer electronic component of claim 23, wherein the first band electrode and the second band electrode include fired electrodes including a conductive metal and a glass.

30. The multilayer electronic component of claim 23, wherein the first connection electrode and the second connection electrode include plating layers.

31. The multilayer electronic component of claim 23, wherein the first band electrode and the second band electrode include plating layers.

32. The multilayer electronic component of claim 1, wherein the first external electrode further includes a third band portion extending from the first connection portion to a portion of the second surface, and the second external electrode further includes a fourth band portion extending from the second connection portion to a portion of the second surface.

33. The multilayer electronic component of claim 1, wherein the first and second external electrodes are spaced apart from the second surfaces.

34. The multilayer electronic component of claim 1, wherein the insulating layer is disposed to extend from the first and second connection portions onto the second surface.

35. A multilayer electronic component, comprising:
a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
a first external electrode including a first connection portion disposed on the third surface, and a first band portion extending from the first connection portion to a portion of the first surface;
a second external electrode including a second connection portion disposed on the fourth surface, and a second band portion extending from the second connection portion to a portion of the first surface;
an insulating layer disposed on the first and second connection portions and covering the second surface, the insulating layer including a first glass and a first oxide including aluminum (Al);
a first plating layer disposed on the first band portion; and a second plating layer disposed on the second band
    portion,
wherein a portion of each of the first and second plating
    layers is disposed on the first surface, and
the first glass comprises one or both of aluminum and
    magnesium.

* * * * *